United States Patent [19]

Balint et al.

[11] Patent Number: 5,542,024
[45] Date of Patent: Jul. 30, 1996

[54] GRAPHICALLY USED EXPERT SYSTEM TOOL BACKGROUND OF THE INVENTION

[75] Inventors: George G. Balint, Neshanic Station; Douglas W. Hood, Edison, both of N.J.

[73] Assignee: Johnson & Johnson, N.J.

[21] Appl. No.: 910,814

[22] Filed: Jul. 9, 1992

[51] Int. Cl.⁶ ..................................... G06F 17/30
[52] U.S. Cl. .......................... 395/161; 395/155
[58] Field of Search .................. 395/155, 156, 395/157, 158, 161, 50, 52, 54, 60

[56] References Cited

U.S. PATENT DOCUMENTS

| | | | |
|---|---|---|---|
| 5,043,915 | 8/1991 | Suwa et al. | 395/60 X |
| 5,235,509 | 8/1993 | Mueller et al. | 395/156 X |
| 5,241,655 | 8/1993 | Mineki et al. | 395/156 X |
| 5,271,091 | 12/1993 | Highland et al. | 395/50 |
| 5,285,387 | 2/1994 | Kurahara et al. | 395/156 X |
| 5,287,514 | 2/1994 | Gram | 395/156 X |
| 5,367,619 | 11/1994 | DiPaolo et al. | 395/50 X |

OTHER PUBLICATIONS

Microsoft Windows User's Guide (Trademark of Microsoft Corporation), 1990, pp. 101–142.
Norton Desktop for Windows (Trademark of Sybex Inc.), 1991, pp. 143–144.

*Primary Examiner*—Heather R. Herndon
*Assistant Examiner*—Cliff N. Vo

[57] ABSTRACT

The specification describes a Graphically Used Expert System Tool, which is a computer program which enables a non-computer literate expert (the developer) to develop an expert system for non-expert users. A plurality of standardized data records and screen displays are linked together by the developer using simplified entry blanks and standardized icons which implement program functions. The developer enters segments of knowledge, which may be statements or questions on each data record, and links it to one to six other data records to form a disjoin logic set. The plurality of knowledge segments and the way in which they are linked together as exit option actions form a cognitive map which represents the natural thought process of the expert developer, thus eliminating the need for traditional deep thought analysis or "if then" inference rules and logic. By providing DOS commands, ARC commands, ARC variables or List processing at each exit option, the developer is provided with a tool which will invoke one or more of a plurality of functional program objects in response to a single user selection.

67 Claims, 61 Drawing Sheets

Microfiche Appendix Included
(10 Microfiche, 971 Pages)

FIG. 7(a)

| | |
|---|---|
| ANS1: | HELP MAINTENANCE |
| ANS2: | NOTEBOOK MAINTENANCE |
| ANS3: | DATABASE MAINTENANCE |
| ANS4: | CHANGE ANY SCREEN |
| ANS5: | EZ DATABASE |
| ANS6: | MORE |
| SCREENNUMBER: | 8 |
| ANSWIN1: | 3 |
| ANSWIN2: | 4 |
| ANSWIN3: | 3 |
| ANSWIN4: | 3 |
| ANSWIN5: | 3 |
| ANSWIN6: | 7 |
| WINDOW HEADING: | SOFTWARE MAINTENANCE SCREEN |
| WINDOW HEADING 1: | |
| WINDOW HEADING 2: | |
| WINDOW HEADING 3: | |
| WINDOW HEADING 4: | |
| WINDOW HEADING 5: | |
| PREVIOUS WINDOW: | 50 |
| SCORE BOX 1 ON: | 0 |
| SCORE BOX 2 ON: | 0 |
| KNOT: | 1 |
| ANCHOR: | 0 |
| NOTES OFF: | 0 |
| ROUTE NUMBER: | 2106 |
| COLOR1: | 13 |
| COLOR2: | 13 |
| COLOR3: | 13 |
| COLOR4: | 13 |
| COLOR5: | 13 |
| COLOR6: | 13 |
| LABELCOLOR1: | -2 |
| LABELCOLOR2: | -2 |
| LABELCOLOR3: | -2 |
| LABELCOLOR4: | -2 |
| LABELCOLOR5: | -2 |
| LABELCOLOR6: | -2 |
| WINDOW NUMBER: | 0 |
| FROM WINDOW NUMBER: | 0 |
| SCORE BOX 1 NEXT SCREEN: | 1 |
| SCORE BOX 2 NEXT SCREEN: | 1 |
| ROUTE LABEL: | NO LABEL AVAILABLE |
| SCORE BOX 1 LABEL: | |
| SCORE BOX 2 LABEL: | |

| | |
|---|---|
| NOTE PAGE ON: | 0 |
| DUPLICATE OF: | 0 |
| RETURN TO SCREENNUMBER: | 1 |
| TYPE_LIST_BOX: | NO |
| BOX_1_MENU: | YES |
| B1 UPPER: | 0 |
| B1 LOWER: | 0 |
| BOX_2_MENU: | YES |
| B2 UPPER: | 0 |
| B2 LOWER: | 0 |
| BOX_3_MENU: | YES |
| B3 UPPER: | 0 |
| B3 LOWER: | 0 |
| BOX_4_MENU: | YES |
| B4 UPPER: | 0 |
| B4 LOWER: | 0 |
| BOX_5_MENU: | YES |
| B5 UPPER: | 0 |
| B5 LOWER: | 0 |
| BOX_6_MENU: | YES |
| B6 UPPER: | 0 |
| B6 LOWER: | 0 |
| XDATE: | JULY 11, 1991 |
| XTIME: | 10 : 26 AM |
| DO_DOS: | NO |
| DOS_LINE_1: | |
| DOS_LINE_2: | |
| DOS_LINE_3: | DIR C: |
| DOS_LINE_4: | |
| DOS_LINE_5: | |
| DOS_LINE_6: | |

FIG. 12 (b)

```
═══ CHANGE SCREEN #1 INFO  (ADVANCED) ═══════════════════════════  08:04:15
  USED SCREENS  (1,2147483647)   "E:\TURBOGST\BOX31\GUEST,USD"
 1 | S:2 | 2,5 | 2/27/92 | BOX 31 DETAILED DESIGN | IS THE DOS CMD FIELD OF THE
 2 | S:2 | 5,6 | 1/23/92 | ARE THE L-MIN & MAX EQUAL TO 0 ? ||
 3 | B:0 || 1/23/92 | CREATED BY: 1""" [OK TO DELETE THIS LINE!] ||
 4 | B:1 | 35 | 2/27/92 | EXECUTE CURRENT COMMAND & REMOVE IT FROM THE QUEUE |
 5 | B:1 | 1 | 1/23/92 | GO TO SCREEN 15 OF GUEST CORE PROCEDURES ||
 6 | S:2 | 7,8 | 1/23/92 | ARE L-MIN AND MAX VALID? ||
 7 | S:2 | 11,12 | 1/23/92 | IS THIS A "ASK" LIST? ||
 8 | B:1 | 5 | 1/23/92 | SHOW LIST PROCESSING ERROR ||
 9 | B:0 | 1 | 1/23/92 | CREATED BY: 7 "YES"  [OK TO DELETE THIS LINE!] ||
10 | B:0 | 11 | 1/23/92 | CREATED BY: 7 "NO"   [OK TO DELETE THIS LINE!] ||
11 | B:1 | 13 | 1/23/92 | INPUT SEARCH STRING AND STORE AS SEARCH VARIABLE. ||
12 | B:1 | 13 | 1/23/92 | SET SEARCH VARIABLE AS WILD CARD | SO THAT EVERYTHING
13 | B:1 | 14 | 1/23/92 | SEARCH FOR ALL LINES IN FILE "POINTER | CSU" | WHICH MA
14 | B:1 | 15 | 2/25/92 | STORE ALL LINES THAT HAVE MATCHES WITH SEARCH VARIA
15 | S:2 | 18,20 | 1/23/92 | IS THERE ANY DATA TO DISPLAY? ||
16 | B:0 || 1/23/92 | CREATED BY: 15 "YES"  [OK TO DELETE THIS LINE!] ||

OK▮
```

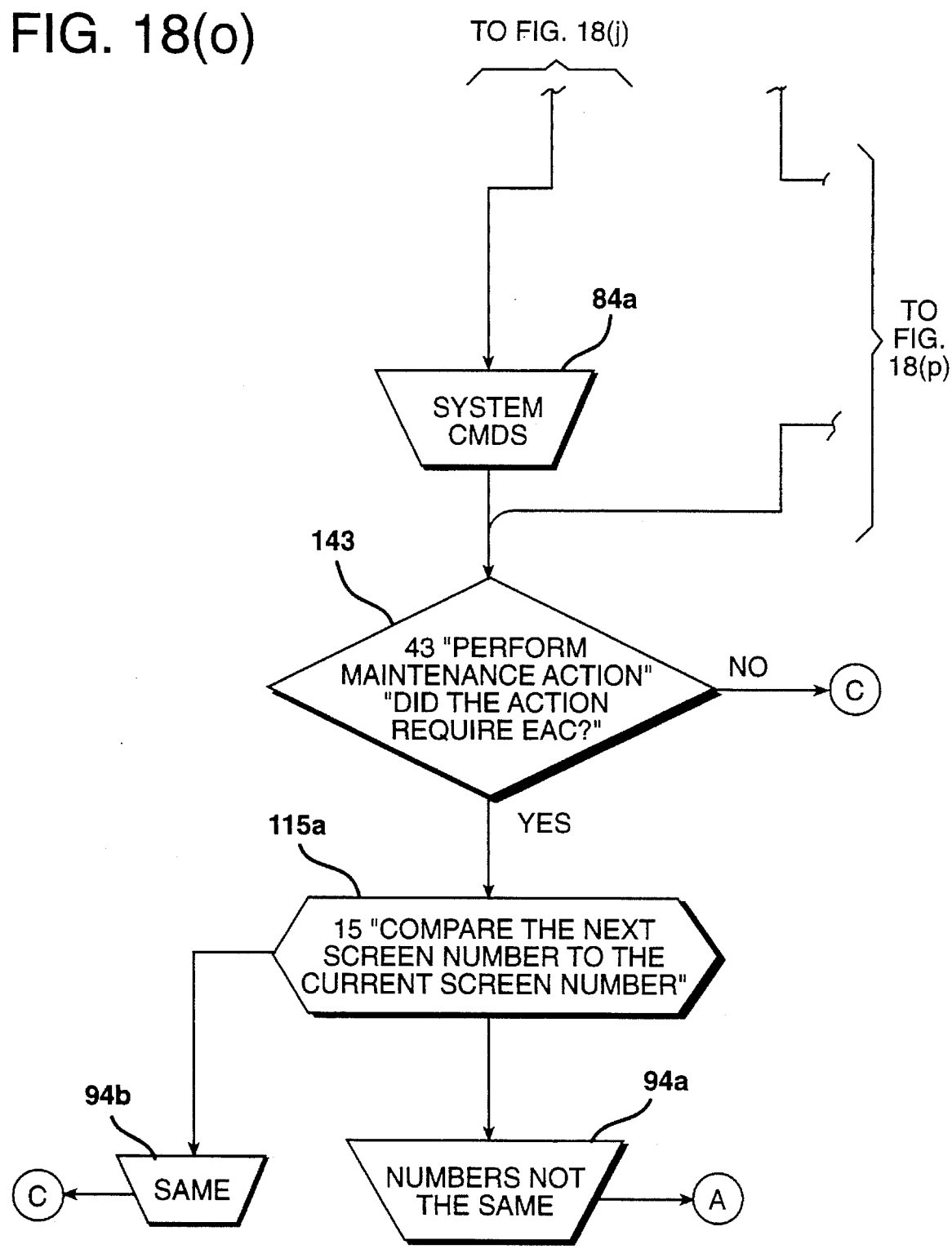

FIG. 18(u)

| | FIG. 18(a) | FIG. 18(b) |
|---|---|---|
| | FIG. 18(c) | |
| | FIG. 18(d) | |
| | FIG. 18(f) | FIG. 18(e) | |
| | FIG. 18(i) | FIG. 18(h) | FIG. 18(g) |
| FIG. 18(n) | FIG. 18(m) | FIG. 18(l) | FIG. 18(j) | FIG. 18(k) |

| FIG. 18(o) | FIG. 18(p) | FIG. 18(q) | FIG. 18(r) | FIG. 18(s) | FIG. 18(t) |

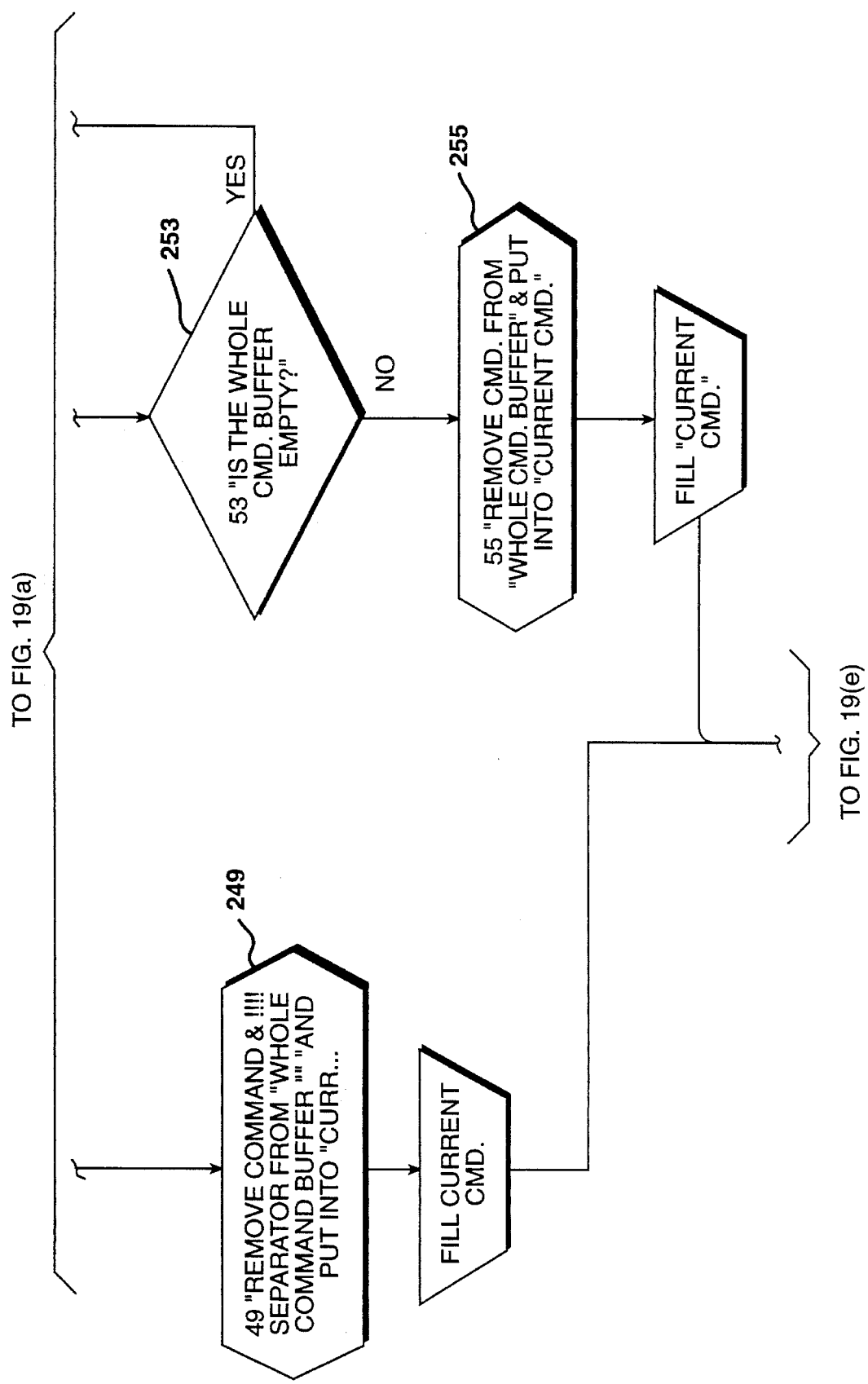

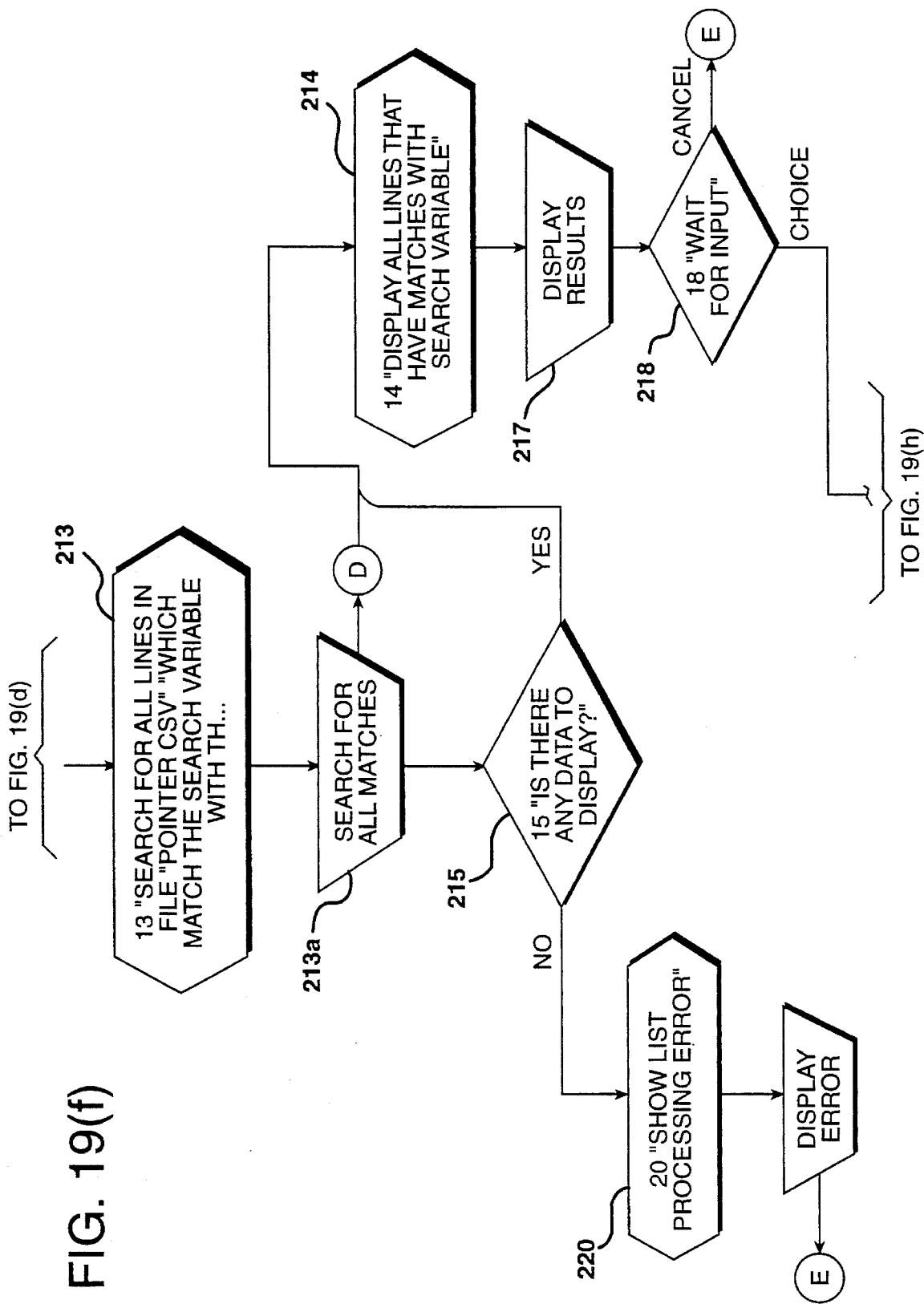

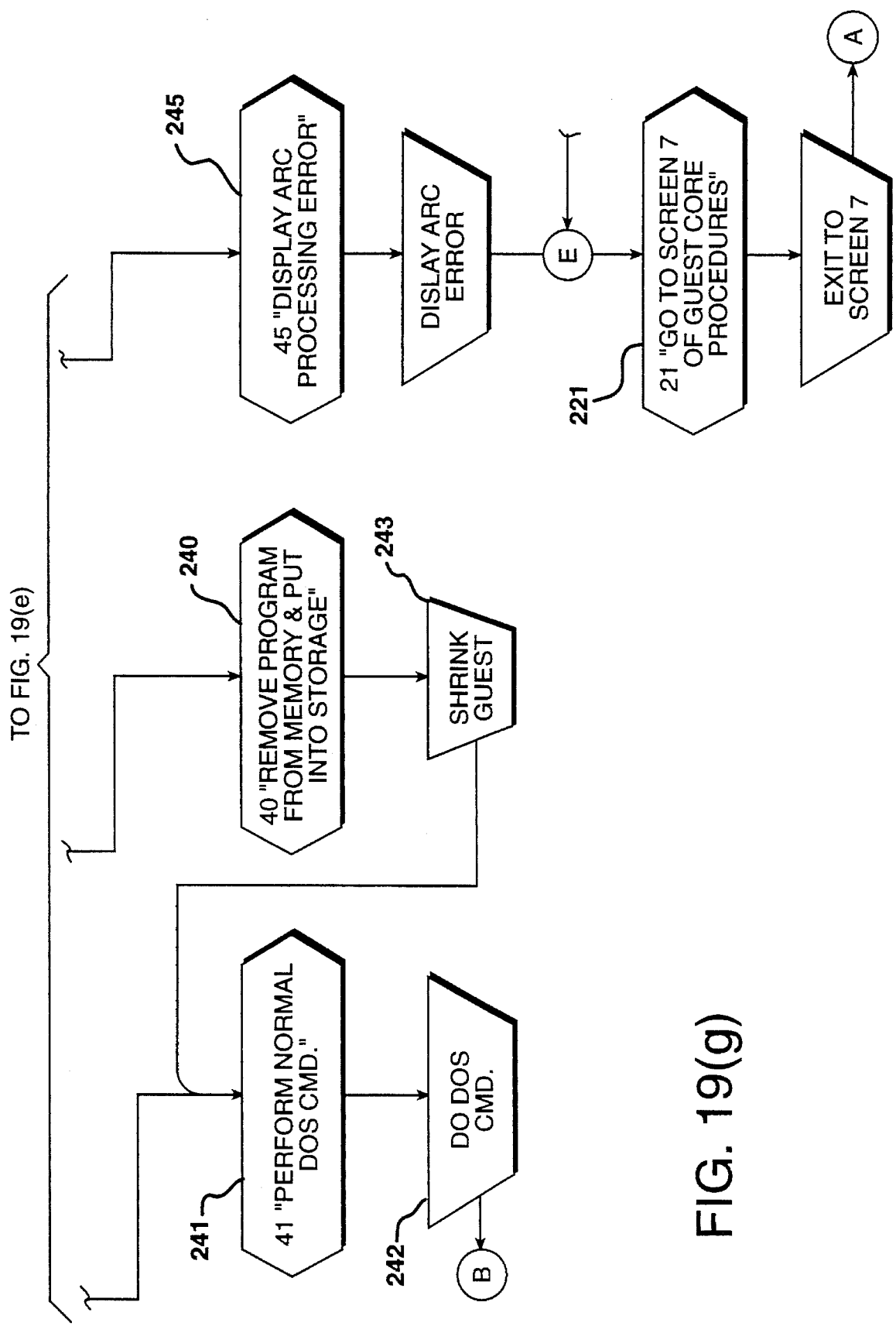

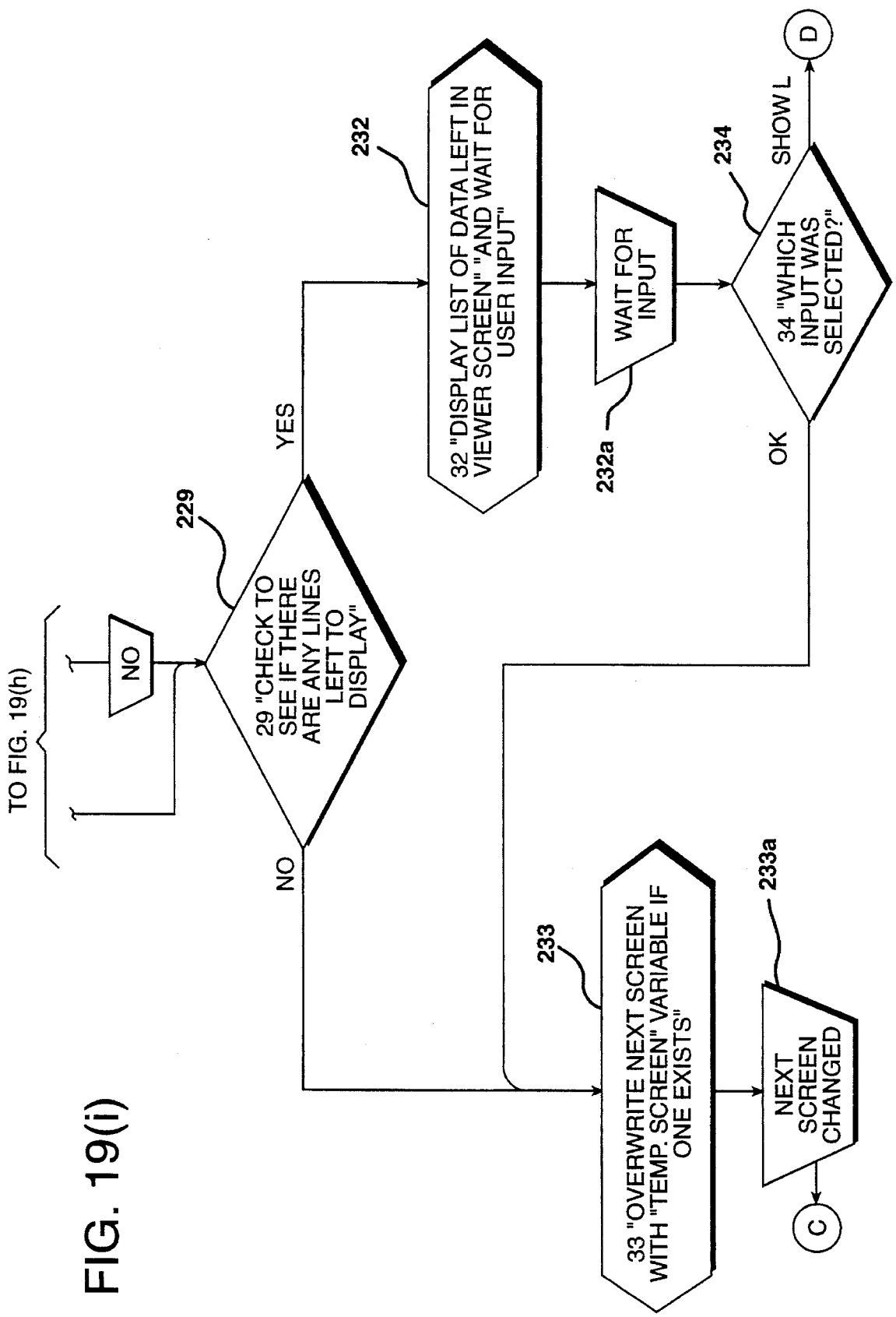

FIG. 19( j )

| FIG. 19(a) | FIG. 19(b) |
|---|---|
| FIG. 19(c) | FIG. 19(d) |
| FIG. 19(e) | FIG. 19(f) |
| FIG. 19(g) | FIG. 19(h) |
| | FIG. 19(i) |

GRAPHICALLY USED EXPERT SYSTEM TOOL BACKGROUND OF THE INVENTION

BACKGROUND OF THE INVENTION

A microfiche appendix consisting of 10 microfiche and 971 frames, which sets forth source code for the Turbo Vision®/Turbo Pascal® embodiment of the program is attached as a microfiche appendix to this specification, and the code of this program is incorporated in this application by reference thereto.

1. Field of the Invention

This invention relates to expert systems, as implemented on general purpose computers. More particularly, the invention relates to a computer program having an object oriented and graphic user-interface that enables a non-computer literate expert to build an expert system quickly, efficiently, and in accordance with the expert's own thought patterns and thinking processes, without need to conduct extensive interviews of the expert or to analyze the data summaries obtained therefrom.

2. Description of the Prior Art

Expert systems have been developed which enable many users, at diverse times and locations, to utilize the knowledge of an expert in the field of the user's endeavor.

Traditionally, these systems are developed through extensive interviews of the expert, which interviews are then transcribed and their content analyzed by one skilled in knowledge engineering. The content is formatted into a knowledge map which is then logically formatted into formal logic or a decision tree. Following the logical analysis of the data, the knowledge must then be converted to a computer accessible format, which often requires a computer programmer.

While there is great advantage in disseminating an expert's knowledge in a given area to a wide number of users, the cost of extracting the knowledge, formatting for computer storage and retrieval, and maintaining the knowledge to reflect current understandings is prohibitive for all but the largest applications, wherein the cost is amortized over a large number of users.

The expert system, when presented to a typical user, consists of a knowledge base and at least a database management program for displaying and updating the data which forms the knowledge base. One such system which uses an object oriented program language, and which manipulates and stores the objects in a common data format is disclosed in U.S. Pat. No. 4,989,132. In this disclosure, automatic management of the database is provided which is transparent to the user.

U.S. Pat. No. 4,945,476 discloses a knowledge based expert system having a plurality of case records with pointer linkages to pictorial files (pictures) stored in a separate database.

U.S. Pat. No. 4,972,343 discloses an updating technique for a knowledge base system which optimizes data searching after changes have been made to the database.

In recent years, particularly in the field of artificial intelligence, there have been developed expert systems which are able to utilize inferences, rules and objects to duplicate the expert's reasoning in factual circumstances not actually encountered by the expert, or to update the knowledge base as the expert system "learns" which solutions are correct. Typical examples of this type of system are disclosed in U.S. Pat. Nos. 4,970,658; 4,970,657 and 4,931,926. These references disclose a knowledge base containing "if-then-action" rules and an inference engine that includes an application interface means and a plurality of object processors. In these systems, each object processor has access to a set of variables defining an object. Rules are selected from the knowledge base and routed to the object processors having access to the objects referenced in the rule. In parallel processing configurations, each object processor executes on a processing unit and the rules are passed as messages.

However efficient these expert systems may be, they have not eliminated the high cost and delay inherent in structured formal interviews, and the preparation of a knowledge map by one skilled in knowledge engineering.

To date, there has not been available an expert system development tool that provides a convenient methodology for storing and retrieving information and that obviates the need for a knowledge engineer or computer literate interpreter to obtain and abstract the knowledge from the expert in the form of data and logic rules. The existing systems also require the services of a computer programmer to create a custom interface for the user of the expert system that will enable a non-sophisticated user to retrieve the knowledge contained therein.

SUMMARY OF THE INVENTION

It has been discovered that 80% to 90% of the expertise used in a typical office or factory expert system may be reduced to written and logical form by the expert alone, if the expert is provided with a tool for sequentially recording segments of alpha-numeric text descriptions, and a series of logic options that are based on the segment of knowledge recorded therein. The remaining 10% to 20% may be captured by empirical learning over time, or by the application of "deep expert" reasoning using traditional knowledge engineering methods.

The present invention provides an intuitive graphical interface and object oriented program that allows a non-computer literate expert to enter his or her knowledge directly into a computer with a mouse and keyboard with only minimal computer training, which normally averages 2 to 3 hours.

The expert system development tool of the present invention enables the expert to represent knowledge in accordance with his or her own thinking patterns and thought processes, and allows the expert to enter his knowledge in a non-binary decision network format, i.e., in a series of interconnected nodes wherein each node is capable of multiple entry points and multiple exit points. Each node is stored as a separate database record in a computer system having a database manager. The knowledge presented in each database record is presented to a subsequent user in a manner as dictated by the user's needs.

The invention is a computer program for use in a computer system having:

(a) a Graphical User Interface means for graphically displaying a data record, said record including at least one alphanumeric display area for displaying questions or instructions entered by the developer, and a plurality of options which may be selected by the developer or user in response thereto. In allowing the non-computer literate expert (the developer) to select the options to be presented to the user in response to the alphanumeric text entered by the developer, the system allows the decision nodes to be interconnected along the lines of the developers natural logic or reasoning. Further, the multiple entry and exit node format allows the developer to go back and easily add a chain of logic that may have been inadvertently omitted during the initial development of the system;

(b) a plurality of interconnected data records, each record representing a decision node in the expert system, with each record including alphanumeric text entered by the developer and a plurality of options to be selected by the user. The reduction of the expert system to a plurality of standard data records and logical interconnects provides excellent portability, and allows the system and its records to be ported to a wide variety of operating systems and database management systems;

(c) the use of standardized data records, with selective linking allows human logical thought patterns to be represented in a simple flat file format;

(d) a database manager for retrieving, adding, deleting, and updating said data records. The database manager is nominally transparent to both the developer and the user, thereby avoiding the need for a computer programmer to translate the developers knowledge and logic structure into a useable system;

(e) an object oriented command means for reading a selection by the developer or user at the displayed interface, and generating an instruction command for the database manager or the GUI in response thereto. This feature of the invention allows the non-computer literate expert to create a relatively complex relational database structure with forward and backwards chaining with no knowledge of the script commands or code needed to create the data file structure or the pointers to be used.

In the present invention, knowledge is entered by the developer on a plurality of displayed screens in the form of alphanumeric text and sequential user options which represent the natural thought pattern(s) of the developer. This obviates the need for a knowledge engineer or computer literate developer to analyze the experts knowledge and logic, and restructure it to fit an existing expert system.

While the present invention does not provide inferential "learning" on the part of the system, it does provide means for empirical "learning" by statistically evaluating use and response, and highlighting areas which need further refinement. In addition, knowledge developed through "deep thought" analysis and traditional knowledge engineering techniques may also be entered into the existing expert system easily and efficiently.

As the developer expert completes each sequential screen, the system forms a network of branching screens, with each screen forming a logic node in the developer's natural logic pattern. This enables the developer expert to map out both the knowledge and the logic necessary to represent the experts knowledge of the subject.

The present invention is particularly well suited to environments which have to deal with a rapidly evolving knowledge base, since updates and changes may be easily entered by the developer-expert in response to changes in the environment. Typical environments well suited for application of the present invention are:

Rapidly changing production machinery design.

Machine operator training, where large numbers of operators or a high operator turnover rate is encountered.

The training of maintenance technicians to perform either routine and trouble shooting maintenance.

Fast growing environments which use production machinery that implements rapidly changing technology.

The management of the production of new products or changes to existing products.

Limited access to knowledge engineering personnel to perform knowledge acquisitions.

Limited computer experience among the potential users and developers of any planned expert system.

The management of fast changing knowledge systems, including documentation, policies, methods, and up-to-date communications.

If not controlled, each of the above environments lead to an explosion of information and procedures. The present invention is designed to help manage and control these environments through the use of expert systems.

The present invention is also capable of presenting and disseminating information to a wide number of users over a computer network as fast as the developer-expert or development team/experts can enter the knowledge into the system. This reduces the typical time frame for implementation of a large useful expert system from several months to a couple of weeks.

Finally, the present invention provides a means for interconnecting the work of disparate developers-experts who are needed to implement a multi-disciplinary system, by enabling an expert in each of the disciplines to simultaneously develop their branch of the system from one or more nodes which they have in common. Each branch can be manifested as a stand alone expert system, or it can be transparently interconnected to other GUEST expert systems.

DESCRIPTION OF THE DRAWINGS

FIG. 7 is a listing of a typical data record or knowledge record used as a decision node in the system;

FIG. 12(b) is a representative example of a listing displayed to the developer when he desires to "show used screens" with the Turbo Vision® GUI;

DESCRIPTION OF THE PREFERRED EMBODIMENT

The present invention is a Graphically Used Expert System Tool (GUEST) that may be used by a non-computer literate expert (the developer) to develop expert systems for industry. The present invention differs from the prior art inasmuch as the traditional methods of developing an expert system requires structured interviews, transcription of the interviews, analysis of the content, preparation of a knowledge map, and subsequently coding the knowledge and map into a system by a computer programmer. Through the use of the present invention, these steps are no longer necessary. The GUEST tool enables a skilled auto-mechanic, maintenance foreman, machine operator, MIS director, or office manager to prepare an expert system directly on a small personal computer with a minimal amount of instruction, normally on the order of 2 to 3 hours. The need for structured interviews and transcripts is eliminated inasmuch as the developer types the segments of his or her knowledge directly into alphanumeric sections of GUEST to create a plurality of knowledge records. The content analysis and knowledge map steps are avoided since the developer is able to link the various knowledge segments or records together in a straightforward and intuitive manner which forms a cognitive map which is reflective of the developers own internal natural logic pattern.

System Overview

The GUEST program is a computer program intended to function on top of an operating system between a Graphical User Interface (GUI) and a database manager. In addition, the use of object oriented program modules enables the program to be portable across a wide variety of processors, operating systems, database managers, and GUI'S. While the program can be constructed with procedural coding methodology, it is most efficient when implemented with object oriented code.

Figure 1:
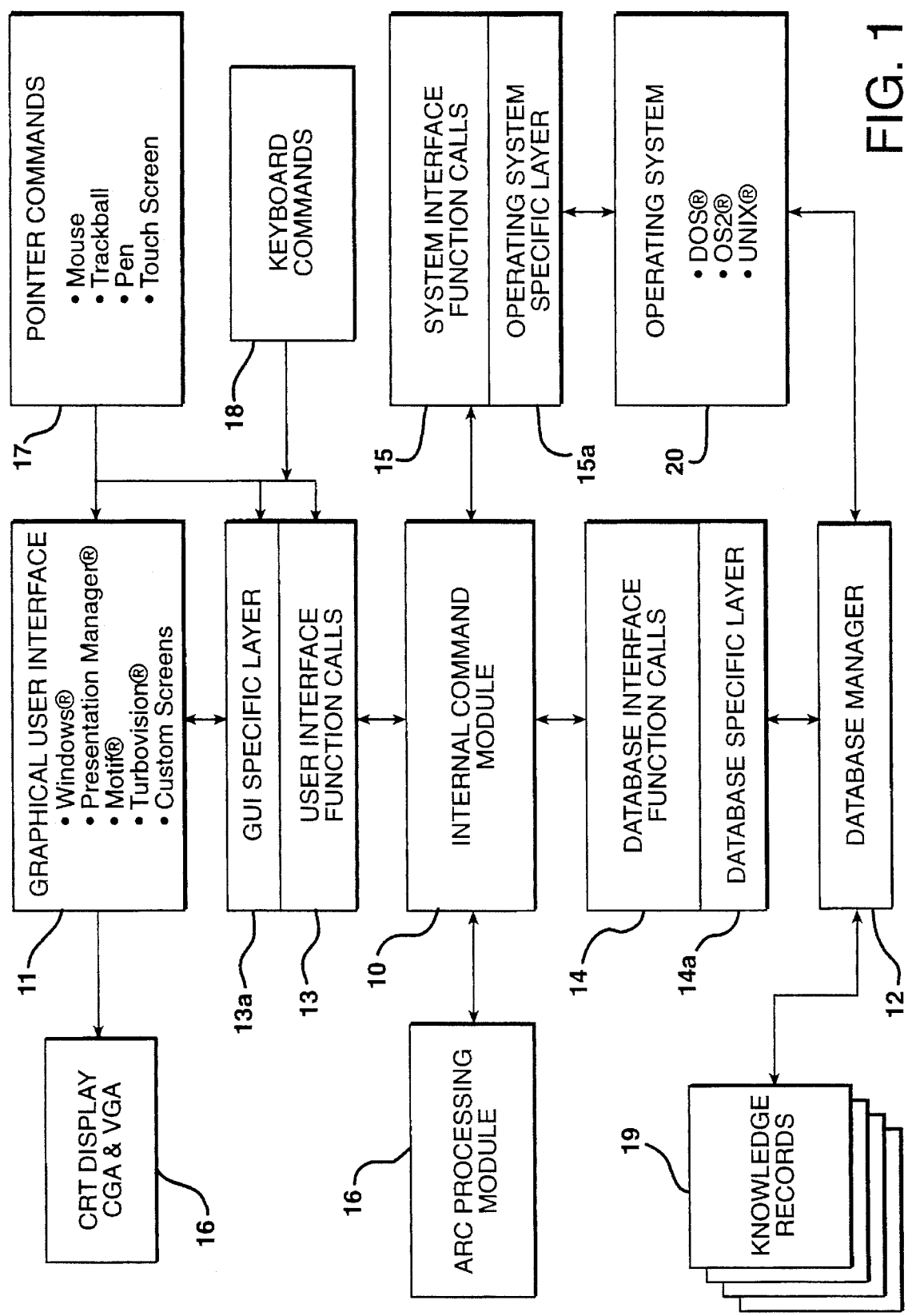
FIG. 1 is a diagrammatic overview of the GUEST tool and its environment illustrating the principle components thereof.

As illustrated in FIG. 1, the GUEST program includes an internal command module 10 which communicates and works through a GUI 11 and a database manager 12. The GUI may be any graphically oriented, and preferably object oriented display interface such as Windows® for DOS® based systems, Presentation Manager® for OS2® based systems, Turbo Vision® for DOS®, or a Motif® for UNIX® based systems. In addition, for minimal overhead and compact program execution, a series of custom screens may be developed as will be hereinafter subsequently explained.

The database manager 12 is preferably a relational database, but may also be a B-tree database, a network database, a hierarchal database, a series of seeks, or a flat file database. A relational database will provide the smallest and most compact data structure.

Through the use of object oriented programming techniques, the GUEST program is constructed in a series of objects or modules such as the internal command module 10, the user interface module 13, the database interface module 14, an operating system interface module 15 and may be optionally equipped with an ARC command module 16 for the automatic generation of system commands. Each of the interface modules 13–16 responds to a specific function call from the internal command module such as "display screen XXXX" for the user interface, or "retrieve record XXXX" for the database interface call. The internal command module 10 doesn't need to know the specifics of the GUI or database manager in order to formulate the proper commands syntax to carry out or execute the instruction given to the user interface modules 13–16.

The function of the interface modules 13–16 is to translate the commands from the internal command module into specific calls that will be carried out by the specific GUI, database manager, or operating system installed on the system. For example, with respect to user interface module 13, the module includes a section for interpreting the command from the internal command module, and a second layer 13a for translating that command into the specific "hooks" or data format required by the GUI to effectively display any given screen. The GUI specific layer 13a is different for each GUI used inasmuch as the command syntax and data structure required for Windows®, Presentation Managere, Motif®, Turbo Vision® and the like are all somewhat different. After the data object to be displayed has been formatted into the specific format required by the GUI specific layer 13a, it is then displayed on the CRT display 16 by the GUI 11.

Inasmuch as GUEST contemplates the normal use of a pointer device 17 such as a mouse, trackball, pen, touch screen or the like, the response from the developer or user of the expert system is normally entered through the pointer command module 17 to the GUI 11, or the user interface module 13 depending upon the type of command and the type of GUI installed on the system. In addition, the present invention is usable without a pointer device by the entry of keyboard commands, indicated at module 18 for entry directly into the user interface module 13.

In a similar manner, a directive to retrieve, edit, update, add or delete a record in the database is formulated by the database interface module 14 into the database specific command script or syntax by database specific layer 14a. The database interface module essentially formulates command syntax for the database manager 12 in response to a given instruction from the internal command module 10. After receiving the command syntax, the database manager 12 accesses the knowledge records 19 from the operating system 20, as needed, to carry out the instruction formulated by the database interface module 14.

In a similar matter, any required access to the operating system by GUEST is formulated by the system interface module 15 which has an operating system specific layer 15a which formulates the command in the proper protocol for the given operating system resident in the processor.

The GUEST system may also includes an ARC processing module 16 for use by the internal command module 10 which provides the capability of taking and parsing specific text strings displayed by the GUI to form a command which is initialed by selection of an option box. These are processing commands which can be used for database retrievals or other inside command strings, such as a DOS® function call. Information stored as a variable from a text string is called an ARC variable, and the term ARC refers to linkage between the nodes (or records or knowledge records) of the expert system. Therefore, an ARC variable is a variable which is used to transmit information between nodes or knowledge records of the expert system, as will be hereinafter explained in greater detail.

The object oriented nature of the program enables adaptation to a variety of platforms and operating systems with need only to reformulate the application specific layers 13a, 14a and 15a to adapt the program to a new platform or system. For example, the system has been implemented in the OS2® operating system environment (on any 80386 plus or compatible processor) using Presentation Manager® for the GUI and Knowledge Base Management System® as the database manager with application specific flat files. A second system was implemented on a DOS® operating system (Intel 80286 plus or compatible processors) using Windows® as the GUI and DBASE® as the database manager. A third system has been implemented, intended for the DOS operating environment (in 80286 plus notebooks or portables) using custom screens generated by Turbo Vision® and Paradox® for the database manager. At the present time, the application is being developed for the UNIX$_R$ operating environment using Motif® as the GUI and ALLBASE® as the database manager.

By maintaining each database record as a uniform object, with a common data structure, regardless of the syntax of the database manager, it is possible to make the data and interconnecting pointers portable from platform to platform. This means that an expert system written on one platform, with a specific operating system and GUI, can be ported directly to a different platform, operating system and GUI with only minor data filtering or minor format processing involved.

Further, by maintaining all of the knowledge in a set of uniform data objects, the knowledge may be easily secured by an encryption algorithm which encodes the data records as they are stored. This algorithm may be part of the database specific layer 14a, or be incorporated in the operating system, in which case it will reside between the database manager and the disc drive which contains the records.

User Interface Overview

The GUEST program uses a plurality of linked database records which are used to create linked software screens in both the user and developer mode. The format of the records and screens is essentially unchanged, but various options that are available to the developer are not available to the user. In this respect, the user screens are a subset of the developer screens. Representative screens for the developer and user are illustrated in FIGS. 2, 3 and 4, 5 respectively.

Figure 2:
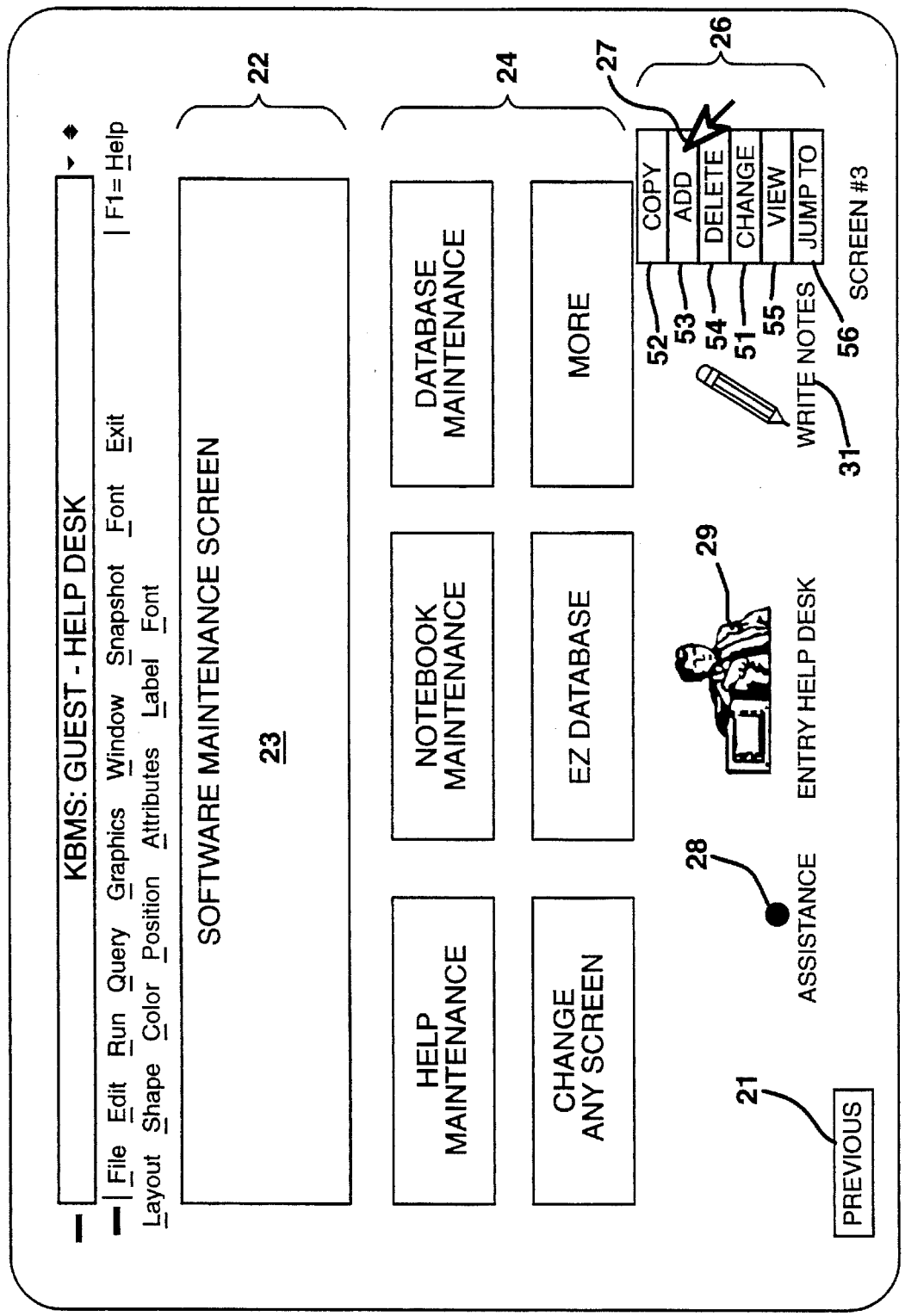
FIG. 2 is a representative example of a typical developer screen using the OS2® operating system and the Knowledge Base Management System® as a database manager.
Figure 4:
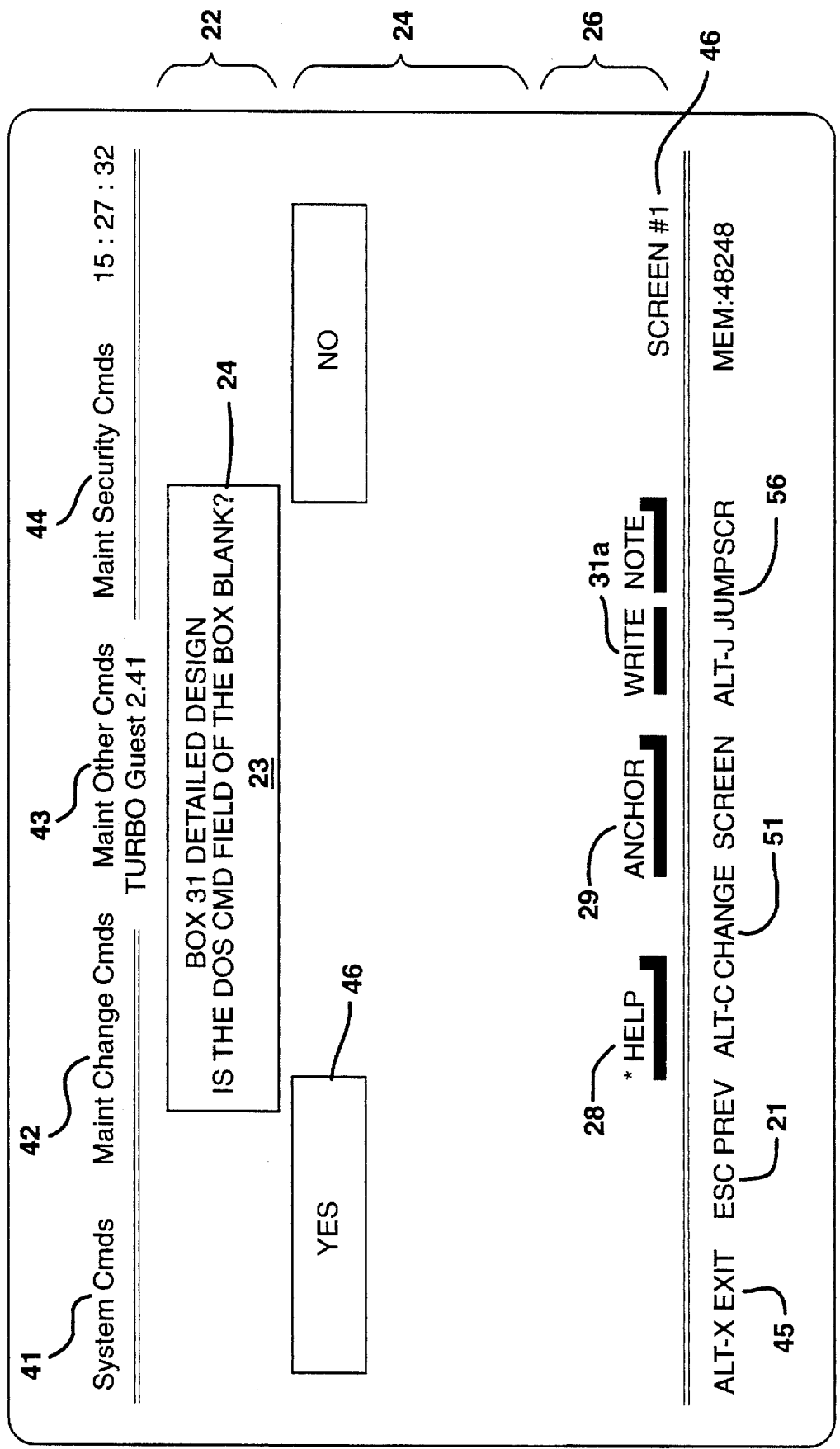
FIG. 4 is a representative example of a typical developer screen using the DOS® operating system and a Turbo Vision® screen display.

FIG. 2 is an illustration of a typical developer screen, when implemented with Presentation Manager® GUI and the Knowledge Base Management System® database manager. FIG. 4 is an illustration of a typical developer screen when implemented using a Turbo Vision® GUI and Paradox® database. The screens include a first text entry zone generally indicated at 22 with a specific title line of alphanumeric text 24 entered therein. The remaining space 23 is available for comments, direction or questions.

Zone 24 illustrates six option or decision boxes that may be selected using a pointer device by the developer. The selection of one of these boxes by the developer in preparing the user program provides a disjoin set for each option selected. As illustrated in FIG. 2, five options are illustrated with a pull down menu, which options appear in response to the selection of the "more" box indicating that a second frame of additional choices is available if one chooses the "more" option box. Zone 26 illustrates a space for navigational icons that may be common to both the developer and the user mode. As illustrated in FIG. 2, a pull down menu having various choices 52–56 is illustrated with a pointer 27 selecting the "add" function. The function "add" varies as the selected option in selection zone 25 varies, as will be hereinafter described in detail.

FIG. 4 illustrates, in zone 24, two option or decision boxes that may be selected using a pointer device by the developer. While only two have been implemented, six are possible with the screen design and database design implemented in this embodiment. In the Turbo Vision® GUI, many of the developer choices are implemented as text items, that are pointer selectable. These developer options are also keyboard selectable, since this version was created for use on Intel® 80286 based portable or laptop systems, which may not have a pointer device.

The developer options 45, 21, 51, and 56 along the bottom of the screen illustrated in FIG. 4 are a single command deep and may be executed as illustrated. For example, command 45 may be executed with a pointer device and mouse click or enter key, or by entering an "ALT" and "X" combination from the keyboard. This command provides an easy way to exit the program from any point in the expert system.

Similarly, in this version, "ALT" and "C" will provide immediate developer access to a screen display (to be hereafter described with respect to FIGS. 9 and 10) and that will change the visual appearance of the screen, while "ALT" and "J" will enable the developer to jump to any other existing screen in the expert system. The current screen number is displayed in the lower right as indicated at 46.

The developer commands 41-44 arranged across the top of the screen are multi-level commands.

Selection of one of these commands with a pointer device provides a pull down sub-menu with pointer and keyboard selectable sub-commands. The commands available in this version are discussed in some detail with respect to FIG. 18, however, for the purpose of illustration, selection of menu item 42 "Maint Change Cmds", symbolic for "maintenance change commands", provides a pull down menu similar the pull down menu illustrated in FIG. 4(b), which is similar in function to items 51-56 in FIG. 2, but with the following choices: Change Current Screen, Copy and Change Screen . . . , Delete Current Screen. . . , Add/Change/Delete/Copy Box Help . . . , Add/Change/Delete/Copy Screen Help, Add/Change/Delete/Copy Developer Help, Delete this Screen's Notes . . . , Add/Change/System TITLE Info., Change Box Color Globally . . . , Jump to Screen # and Quit Maintenance Mode. Each of the commands may be entered in a variety of ways, for example, the command " Change current screen" may be implemented by typing the highlighted letter C in the word Change, by entering the previously displayed "ALT" and "C" key combination, by using the arrow keys to move a highlighting bar to this command, and selecting Enter on the keyboard, or finally by using a mouse pointer and single click anywhere on the command line.

Figure 4A:
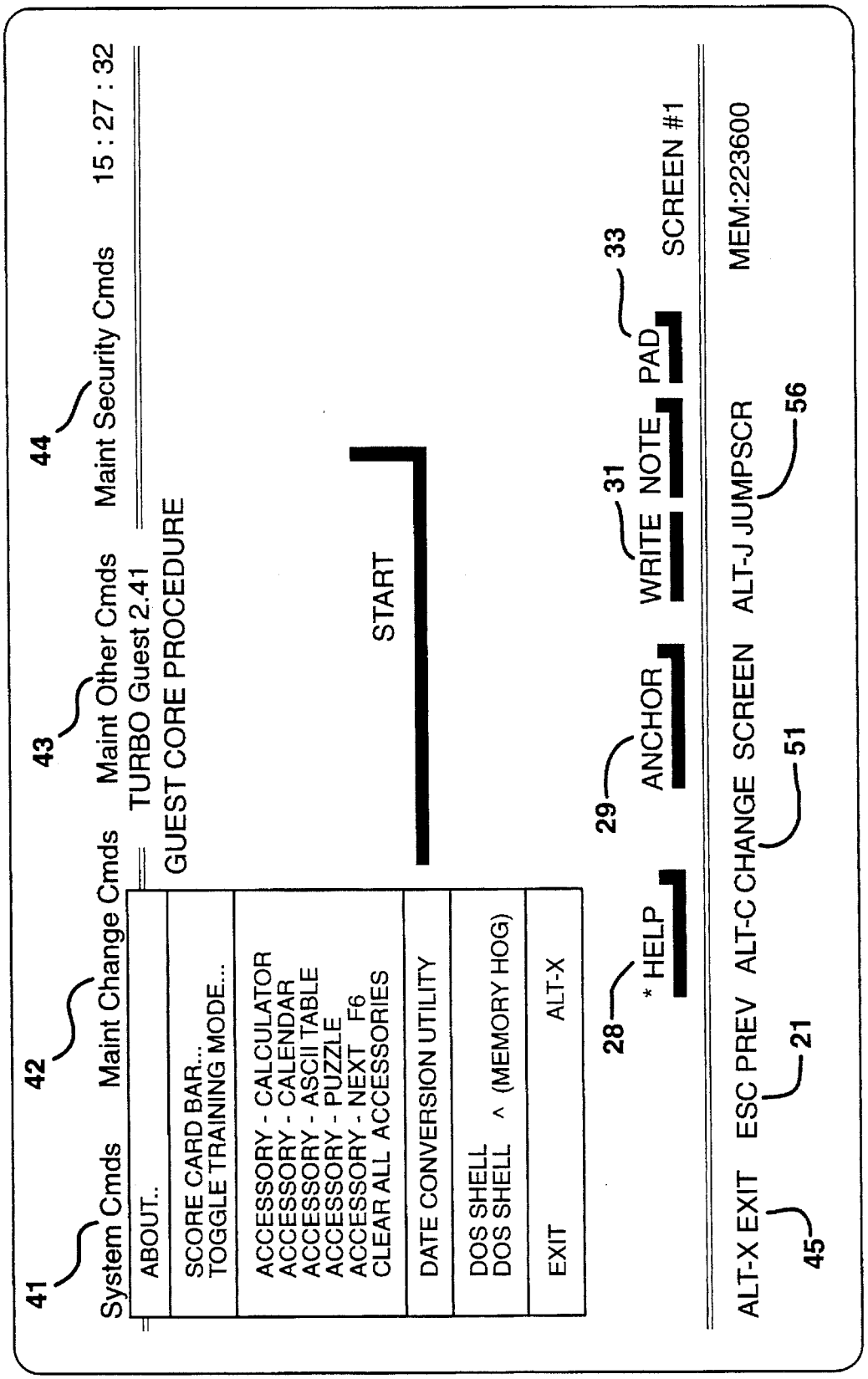
FIGS. 4(a)–(d) are a representative examples of typical pull-down menus that are provided in response to the selection of the developer options, as illustrated in FIG. 4.
Figure 4B:
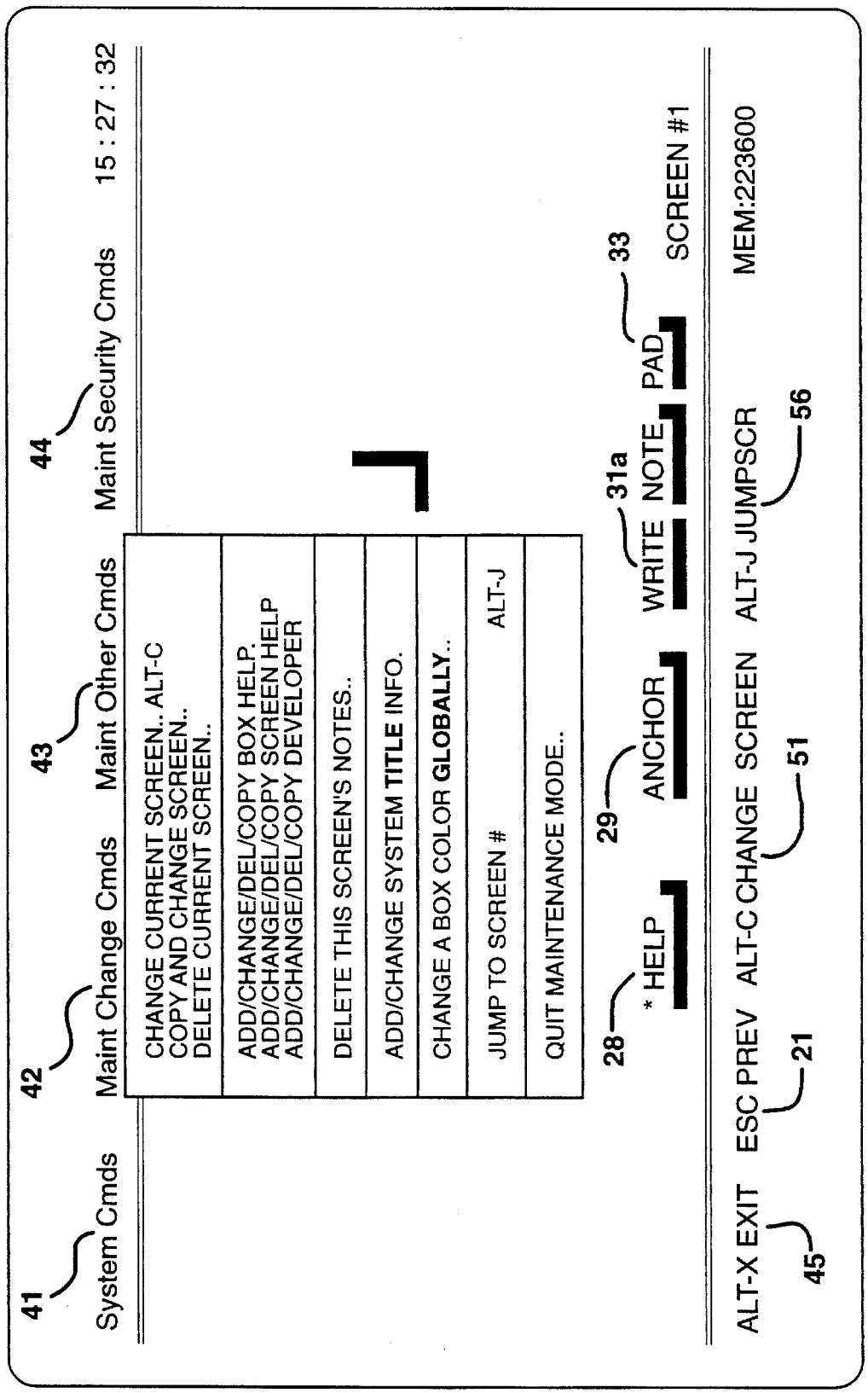
Figure 4C:
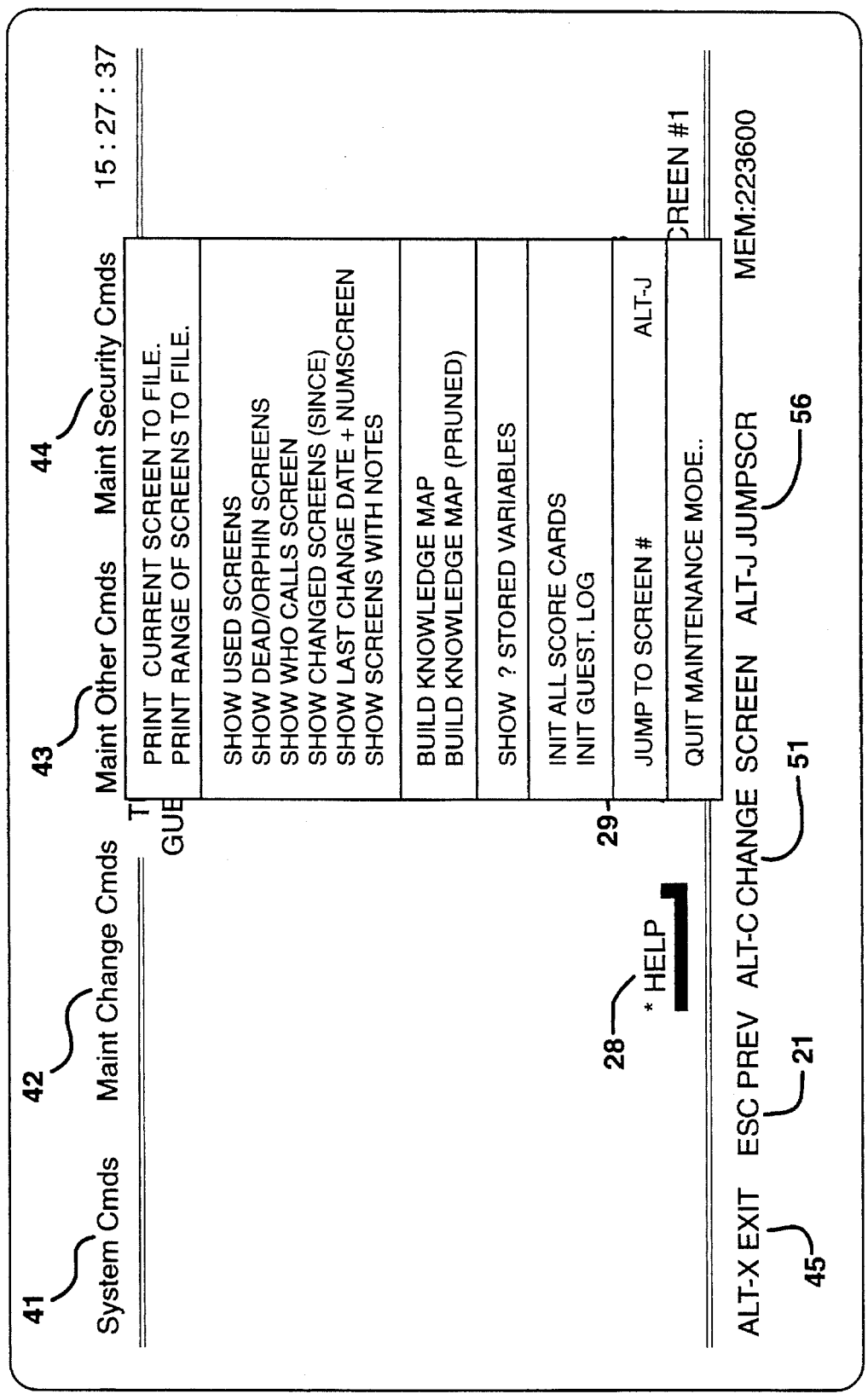
Figure 4D:
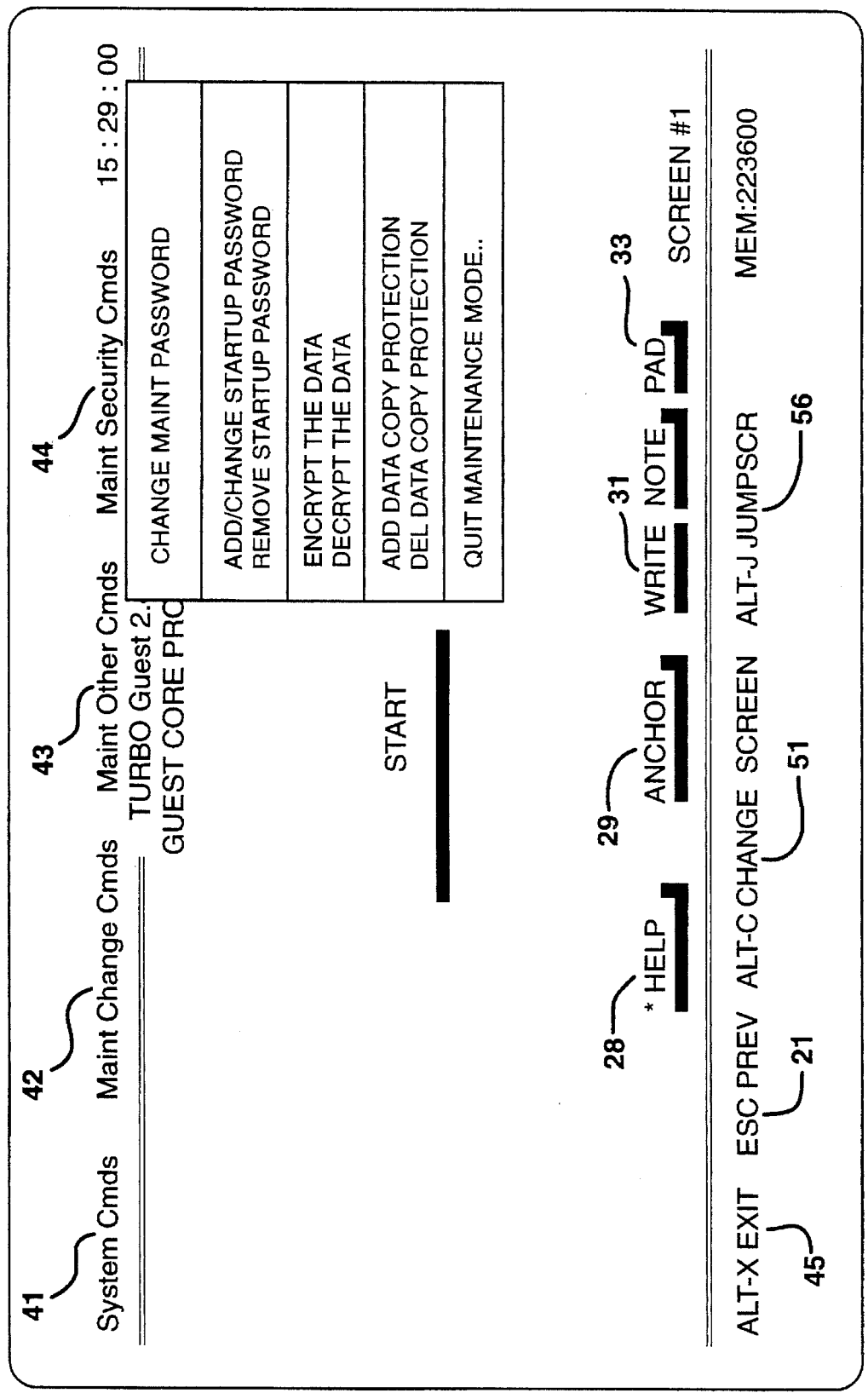
Figure 5:
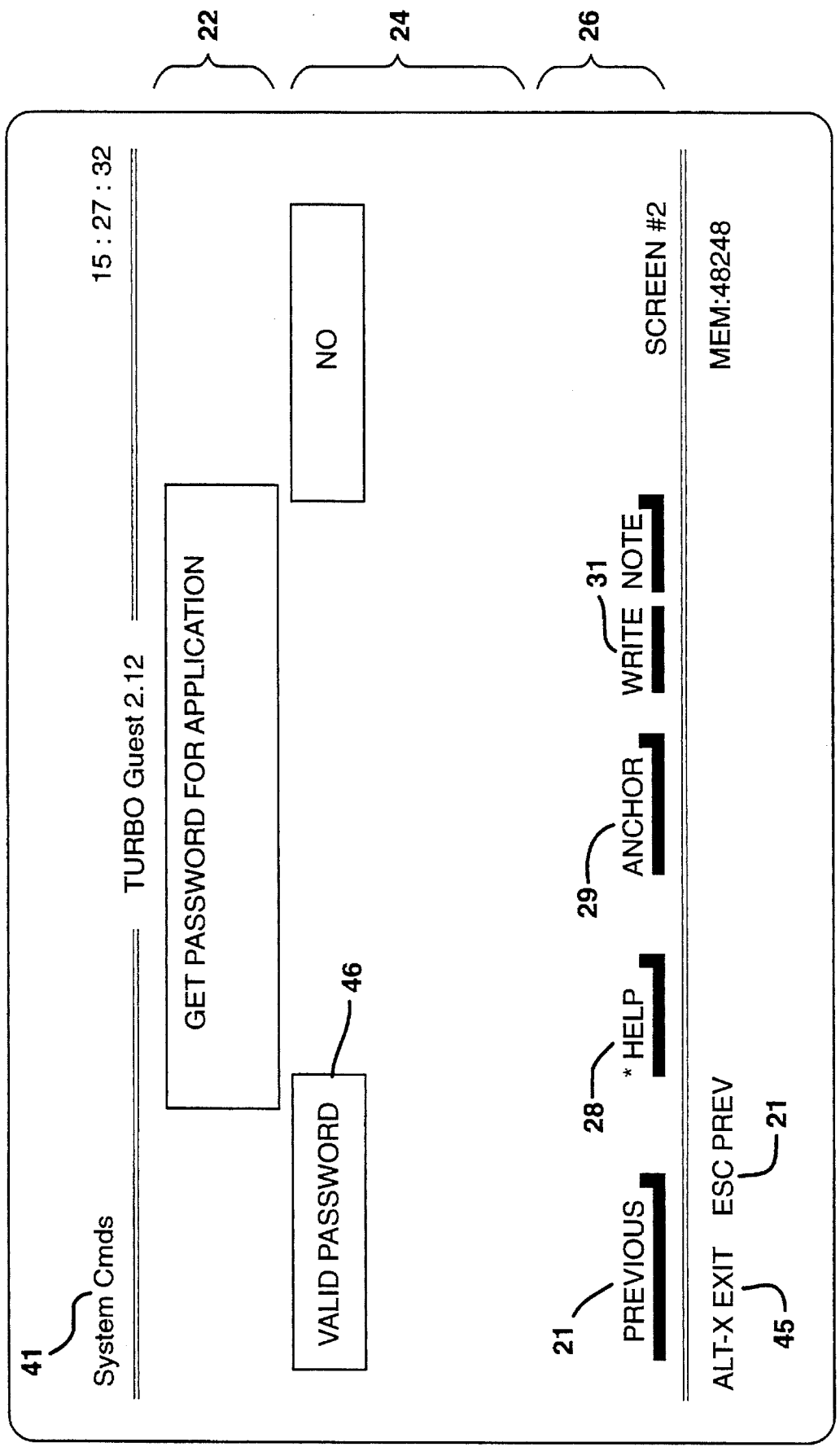
FIG. 5 is a representative example of a typical user screen, using operating system and Graphic User Interface illustrated in FIG. 4.

In a similar manner, in the Turbo® GUEST embodiment, each of the developer commands 41-44 illustrated in FIG. 4, and the user system command 41, illustrated in FIG. 5 are equipped with a pull down menu, with System Cmds 41 illustrated in FIG. 4(a); Maint Change Cmds illustrated in FIG. 4(b); Maint Other Cmds 43 illustrated in FIG. 4(c) and Maint Security Cmds illustrated in FIG. 4(d). The specific function of each of the sub-menu items will be hereinafter described with respect to FIG. 18.

Context sensitive "On-Line" help may also be provided by the developer for each of these commands in the form of a full page of alphanumeric text for each command.

The developer screen illustrated in FIG. 4 will also display navigation icons in zone 26 that are common to both the user and developer nodes of operation. When one of the icons or decision boxes, such as the help icon 28 or the "yes" decision box 47, illustrated in 24 is selected or has help available for it, the text therein may be highlighted. If supported by the GUI, the icons, such as button 28, may be visually depressed and/or the text highlighted when selected by a pointer, to tell the developer or user that his selection has indeed been received by the system.

Description of a Typical User Screen

Figure 3:
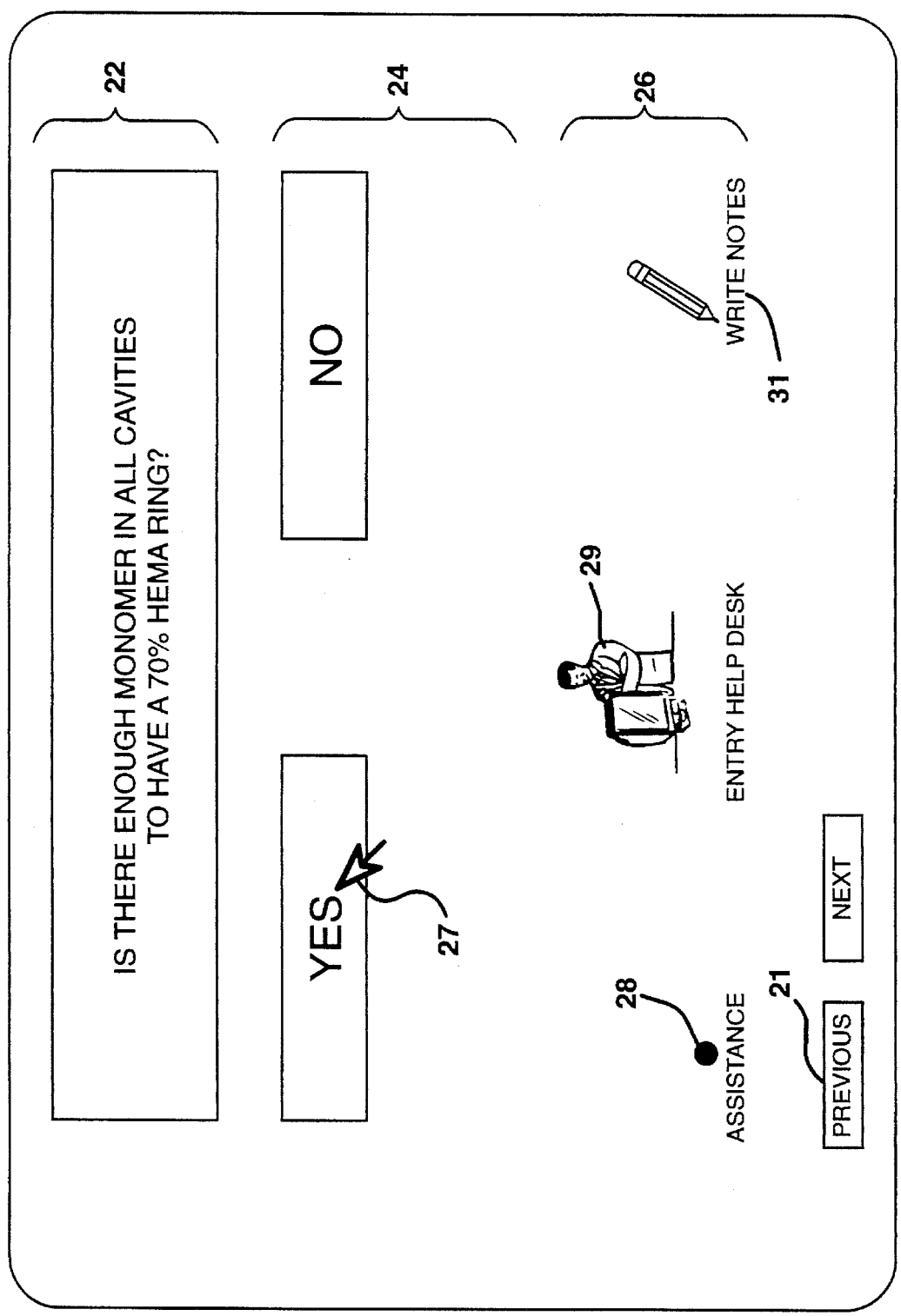
FIG. 3 is a representative example of a typical user screen using the operating system and database manager illustrated in FIG. 2.
Figure 3A:
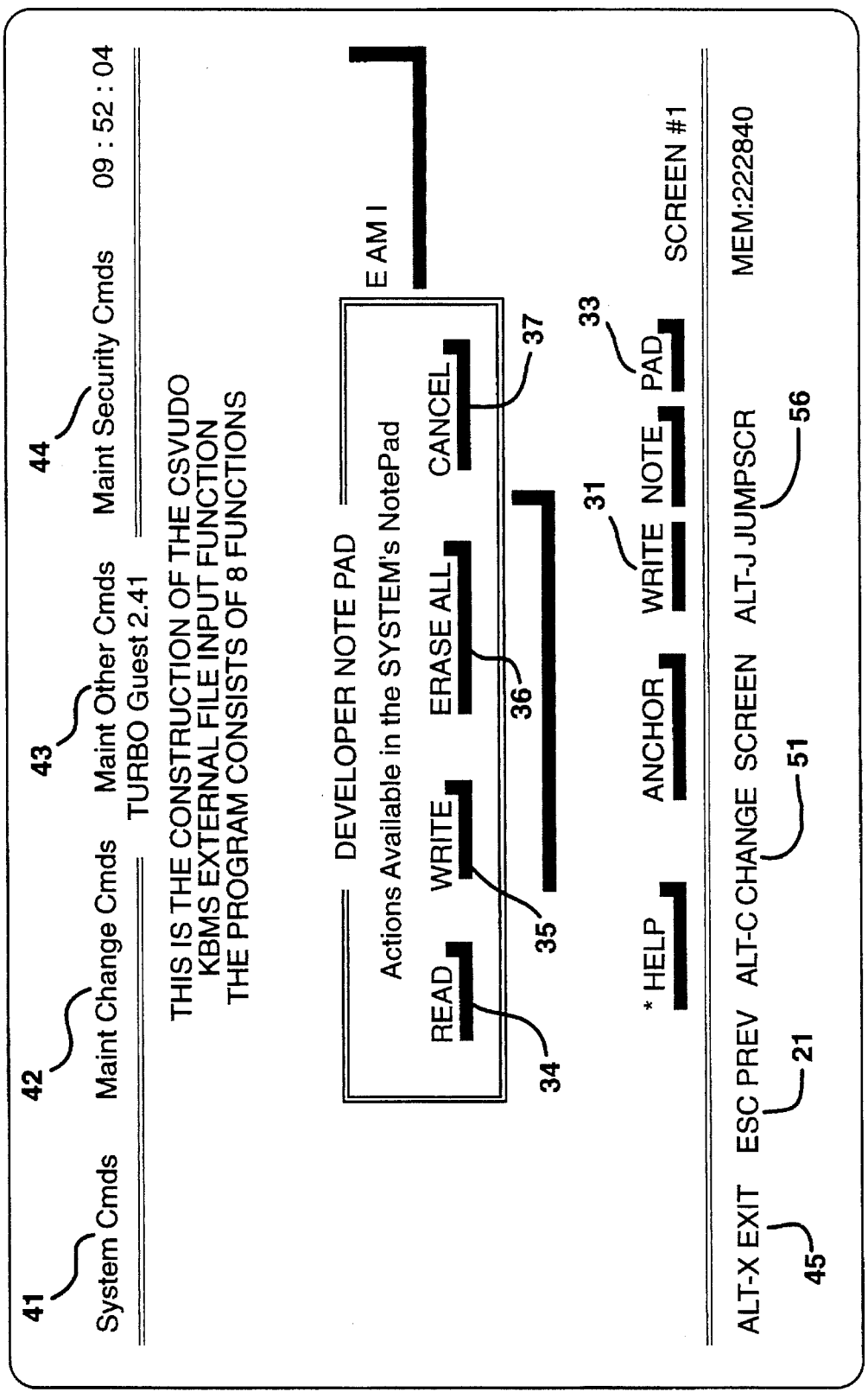
FIG. 3(a) is a representative example of a typical developer screen using the DOS® operating system and a Turbo Vision® screen display to illustrate a Developer Note Pad option.

Typical user screens are illustrated in FIGS. 3 and 5, wherein the text entry area 22 in FIG. 3 has two lines of alphanumeric text therein which poses a question to the user. As entered by the developer, the answer to this question is capable of a yes or no resolution and the pointer 27 is selecting yes. The user screen illustrated in FIG. 3 could have up to six option boxes arranged as illustrated in FIG. 2 for the user to select from. These option boxes may be used as menu items for dis-join branches of the expert system, or they could be used to enter ranges appropriate to an observation to be made by the user, i.e., cavity is empty, cavity is full, cavity is one half full, cavity is 75% full or cavity is 25% full.

Alternately, photographs stored as graphics which may be linked to the data record with a DOS command may be displayed via an external graphics program through the selection of a decision box. This enables the user to select a condition or to evaluate the appearance of an object, that is a subject of the GUEST system.

The user screen illustrated in FIG. 2 also has a navigational icon zone 26. When a navigation icon is selected by the pointer screen cursor 27, a particular system navigation function is performed. For instance, when the entry help desk icon 29 is selected, the developer or user is returned to the beginning of the system. The database interface module 10 instructs the database manager 12 to retrieve the contents of a knowledge record 19 that corresponds to the entry point node of the particular application, known as the anchor node. The screen that is presented to the user at the beginning of the expert application program is called the anchor screen.

Figure 14:
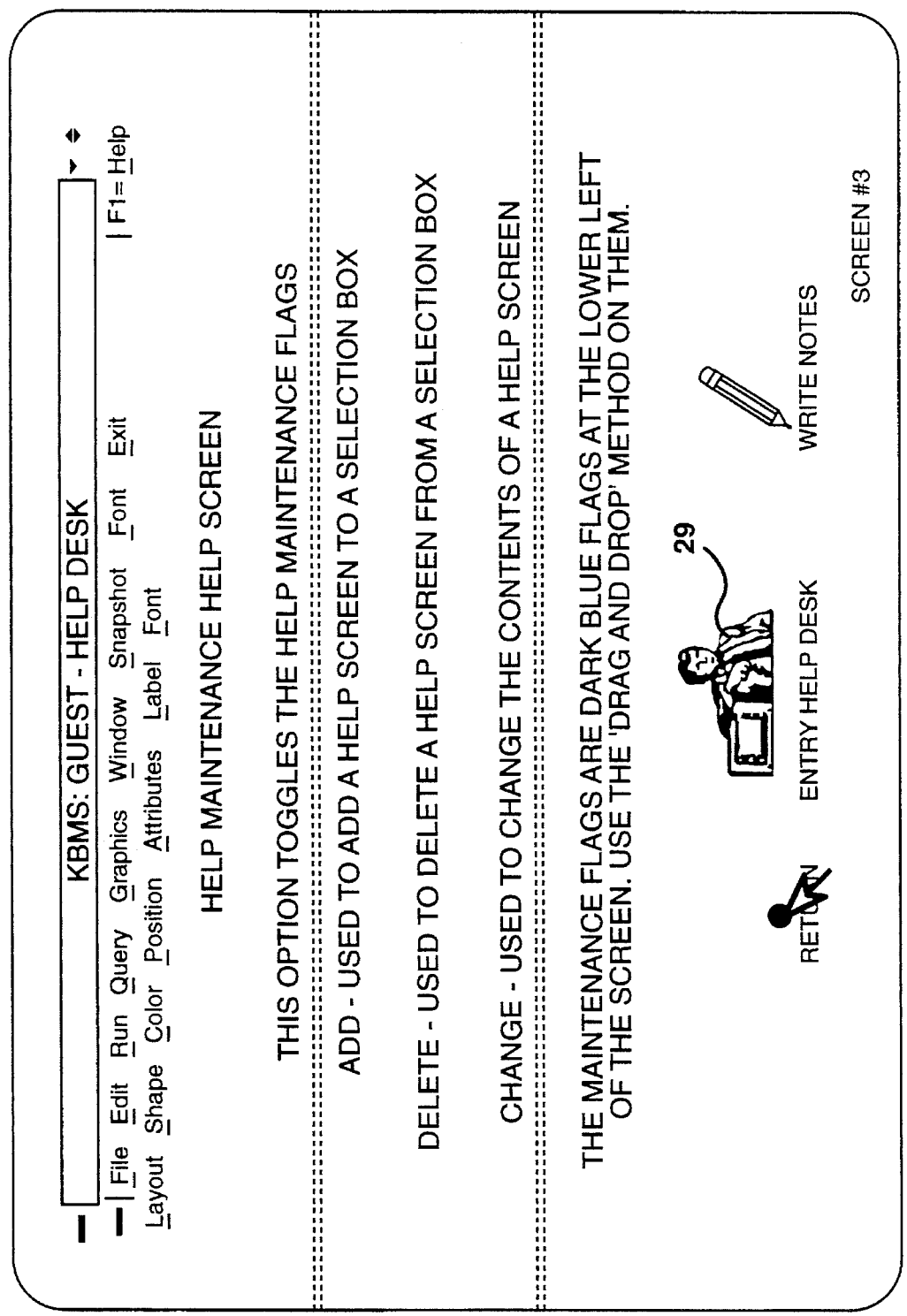
FIG. 14 represents a typical help screen, and in particular for the option box labeled "Help Maintenance"

The Help assistance icon 28 allows the user to access particular database records having screen help information. Help assistance is available by first selecting the assistance icon 28 and then selecting either a navigation icon or one of the decision boxes displayed in zone 25. In FIG. 4, additional help is available for zones 21, 41-45, 51 and 56. Once this is done, a paragraph of text will be displayed which describes or explains, in detail, what the particular graphical icon will do before it is selected. Alternately, if supported by the GUI on the system, the assistance icon 28 may be selected, and "dragged" via a mouse or trackball to the icon for which help is requested and then dropped. For instance, FIG. 14 illustrates a screen display of a page of help text available when the assistance icon 28 is selected, followed by selection of the "Help Maintenance" box. Functionally, the internal command module 10 instructs the database manager to retrieve, for display, the portion of the help database record having a paragraph of help text that has been previously entered by the developer. The help text is stored in a separate knowledge record file and linked to the currently displayed screen by a pointer. On-line help is also available for the developer for all the inherent system functions. As will be described below, the developer may generate, delete, add, or update the help text which appears on a particular screen display. In the Turbo Vision®/Turbo Pascal® version of the invention illustrated in FIG. 5, a help screen navigation icon may be created for a particular screen. When selected, help text linked to the database record itself and not to any particular option box present in the database record, will be displayed.

Another navigation icon, the read/write notes icon 31 allows the user to toggle between the read and write note function. When running or developing an application, the user may want to enter notes or leave comments or questions for a supervisor, the next shift operator, or the developer of the GUEST system. Any given screen may have multiple notes linked to it. Alternatively, the user may want to read notes entered by a previous user that pertain to a particular screen or function. A note consists of a limited number of alphanumeric characters that pertain to the subject matter of the displayed screen. When there are no notes written for a particular screen, the user can only select the write notes icon 31. The icon 31 is shown in FIG. 2 as a graphical icon in the shape of a pencil while the icon in FIG. 5 is a depressible button. When selected, the command module accepts a data object, that is, the note entered by the user and links that note to the knowledge record file with a pointer which corresponds to the currently displayed screen. Each note may be automatically date and time stamped. If there are any notes for a particular screen, the read/write note icon 31 will be displayed as an open notebook shown as icon 31*a* in FIG. 6. This option indicates that notes are available for display that have been entered by a previous user. If there are no notes for a particular screen, then the user will not be able to toggle the write notes icon 31 to the read notes icon 31*a*. It will be appreciated that the developer will view and maintain the notes entered on a regular basis to strengthen the user/developer relationship. The read/write note icon 31 of the OS2® version illustrated in FIGS. 2 and 3 is a graphical icon, with a representation image. In the Turbo® GUEST embodiment, a simple button 31*a*, illustrated in FIG. 4 provides the same function. In addition, a Developer Note Pad option may be provided, as button 33, illustrated in FIG. 4(*a*). Selection of this icon will bring a Developer Note Pad menu, illustrated in FIG. 3(*a*), which provides similar read 34, write 35, erase 36 and cancel 37 options. The developer created notes are treated by the system in a manner similar to the user notes previously described, except that the Developer Note Pad is not visible in the user mode. More on notebook maintenance will be described hereinbelow.

A fourth navigation object icon is the previous icon 21, shown in FIG. 2–5. It also is displayed on every screen except that it is not visible when the anchor screen is displayed. Selection of this icon allows the user or developer to return to the previous screen that was displayed. As the user or developer proceeds through the expert system, the internal command module creates and maintains a screen queue temp file which maintains a listing of the screen numbers accessed the chosen route from the anchor screen. Thus, when selected from the current display, the internal command module 14 obtains the previous screen number from the temp screen queue, and directs the database manager to retrieve the contents of the previously displayed knowledge record 19. The Graphical User Interface (GUI) then presents for display the knowledge in the retrieved knowledge record. In summary, the previous icon 21 allows the user to trace back, over his original path, one screen at a time until the anchor screen is displayed. At any mode along the original path, the developer or user may then select a different path in the forward direction. In the OS2® version, the developer may select the "knot" option. This option selects a predetermined previous screen that is used instead of the actual previous screen number selected. This allows the developer the option to select the previous path to be followed for optimization or training. The "knot" option will be discussed in detail later.

Description of the Developer Mode of Operation

When the developer is creating a new application, then the anchor screen will present for selection the option boxes illustrated in FIG. 2. Development of the expert system by the developer is preferably done through use of one of the single object icons in zone 24. In the preferred embodiment, this screen is called the software maintenance screen. Selection of one of the options on this screen will cause the internal command module 10 to instruct the GUI to display a pull-down menu of object oriented software maintenance icons in zone 26 as shown in FIG. 2. In addition, once the system is developed, the screen number of software maintenance screen illustrated in FIG. 2 is changed and will no longer be the anchor screen, but will be called by selecting a maintenance option box. The maintenance option box does not have to appear on the anchor screen. For instance, as will be described below, the developer can create a path from the anchor screen to another screen having the maintenance option. In addition, after the development of the expert system is completed, the maintenance option may be hidden from the user's view, or may be password protected if desired.

For purposes of illustration, FIG. 2 illustrates a displayed screen having a software maintenance option box labeled "Database Maintenance." Selection of this option box by cursor 27 toggles the program into the developer mode. As part of the security features of the present invention, a user will be asked to enter a password before the pull-down menu of maintenance icons are displayed. When the developer correctly enters a password, a maintenance flag is set and the developer may perform any database maintenance option he chooses. For the Turbo Vision® version illustrated in FIG. 5, the command lines 41–44 across the top of the screen appear or disappear as one enters maintenance mode or exits maintenance mode. Additionally, the maintenance mode can be triggered through the use of the -m option evoked during the GUEST start up DOS® command.

Database Maintenance Icons

As illustrated in FIG. 2, selection of the change icon 51, by cursor 27, will enable the developer to perform detailed maintenance of the information contained in any selected knowledge record. Entry of the developer's knowledge can be done in several ways. In the most comprehensive approach, a complete knowledge database record presented to the developer for entry of knowledge. A formatted and completed record is illustrated in FIG. 7. The contents of this database record consists of all of the attributes that make up the formatted (displayed) user screen illustrated in FIG. 2. A second way of entering knowledge is via selection of the "EZ" database option from the maintenance screen illustrated in FIG. 2. When the "EZ Database" option is selected in FIG. 2 and the developer enters the correct password, the contents of the knowledge database record will be presented to the developer in the manner illustrated in FIG. 8. Similarly, in the Turbo Vision® version, a similar "simple" set of entry options, as depicted in FIG. 9, appear. If the developer maintenance option is set to "advanced", the options available in FIG. 10 will appear. As can be seen from a comparison of FIGS. 2 and 8, the presentation of the database record to the developer in the EZ database maintenance mode (FIG. 8), corresponds graphically to the format in which the knowledge is displayed to the user (FIG. 2). Similarly, FIGS. 9 and 10 depict the screen record used to create the developer screen illustrated in FIG. 2. Once in the maintenance mode, the developer can alter or enter knowledge in the areas designated on the screen display of FIGS. 7, 8 or 9, 10 as will be explained in detail below.

When the copy menu item 52 is selected from the pull down menu illustrated in FIG. 2, the developer may duplicate the contents of any knowledge record 19 into another knowledge database record while leaving the original knowledge database record unchanged. Any displayed screen can be duplicated and the newly created screen is copied with the database pointer location specified by the developer. This maintenance function is useful when the new display screen to be created has similar option structure or colors as a previous screen display. In one embodiment, the system defaults to the currently displayed screen after the duplication is effected. In the preferred embodiment, the maintenance function will automatically be enabled so the developer may enter changes in the newly copied knowledge record.

The add menu item 53 when selected, provides the developer with the ability to add the first available screen starting at a given pointer number. If the developer wants to add a screen but does not know where the next available knowledge database record number is, then the developer will select this option and will be prompted to enter a screen number, e.g. the number thirty-three (33). If the developer supplies the internal command module with a number for the database manager to use, then the program will use the number supplied as a pointer and the command module will develop the next empty record and screen display from it. In cases where the developer would like the software to select the next unused number, a '*' or '>#' (where #=any number, i.e., >1000) can be used in place of a number. The '*' will select the next available empty knowledge record starting from the current record. The '>' will select the next unused record starting from that numbered record.

The delete menu item 54 when selected, will delete the currently displayed screen and erase the knowledge contained in its corresponding knowledge record 19. The developer will be returned to the previously viewed screen. A request to delete will always provide a choice to confirm the deletion or about the deletion process. A completed deletion process will free the knowledge record number, helps and notes so that they can be reused. The knowledge record, corresponding to the anchor screen cannot be deleted. It can only be modified by selecting the change menu item 51.

Figure 11:
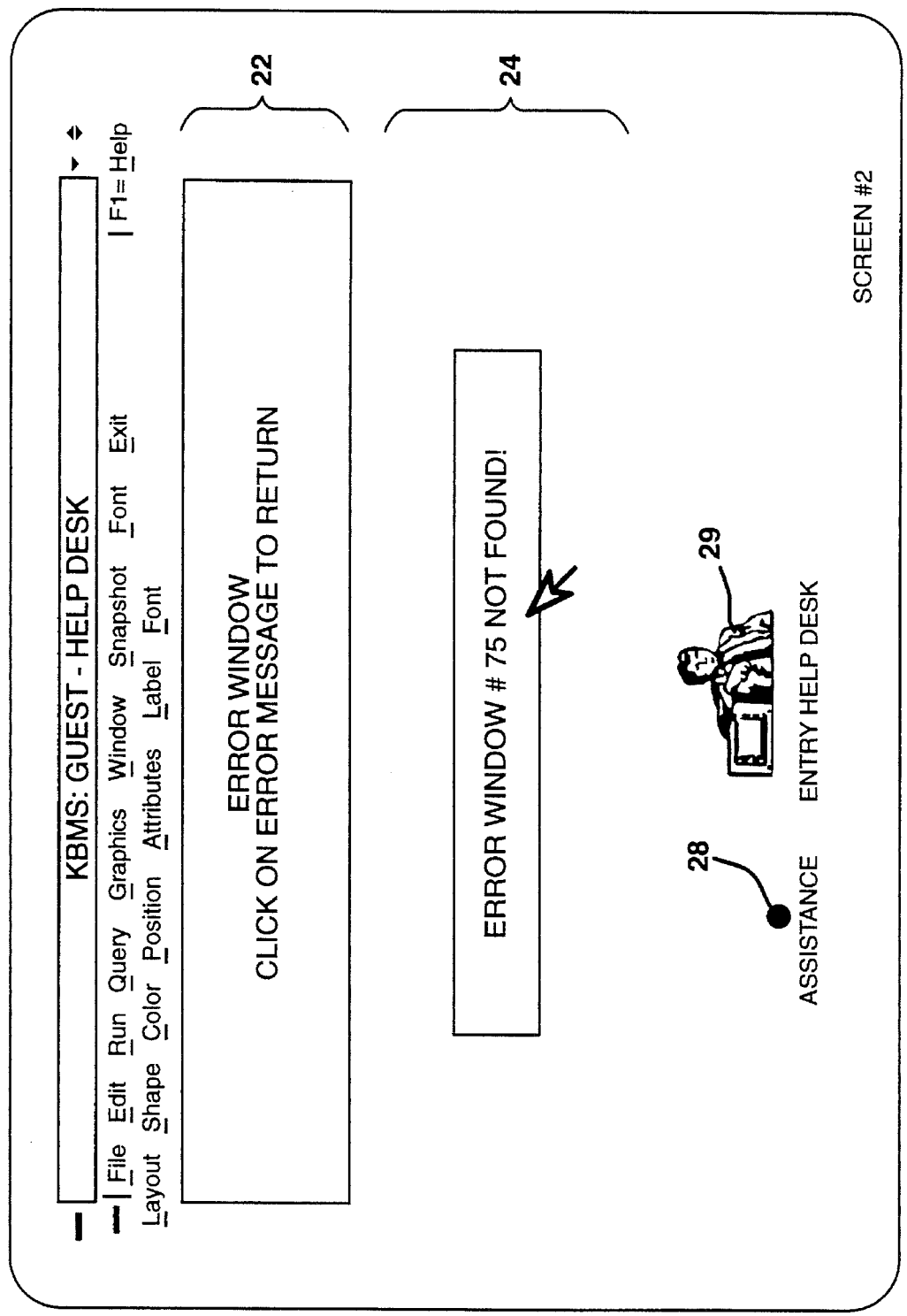
FIG. 11 is a representative example of an error message.

In the OS2® version, the view menu item 55, when selected, will request the developer to enter the pointer number of the formatted knowledge record to be examined. If no number is entered, the program will take no action and the previously displayed screen will be returned. If an invalid screen number is entered, then the program will generate an error screen such as the one shown in FIG. 11. The developer may return to the original screen by selecting the error box of FIG. 15. If a valid screen number is entered, then the internal command module 10 will instruct the database manager 12 to retrieve the database record corresponding to the screen number entered.

Figure 12A:
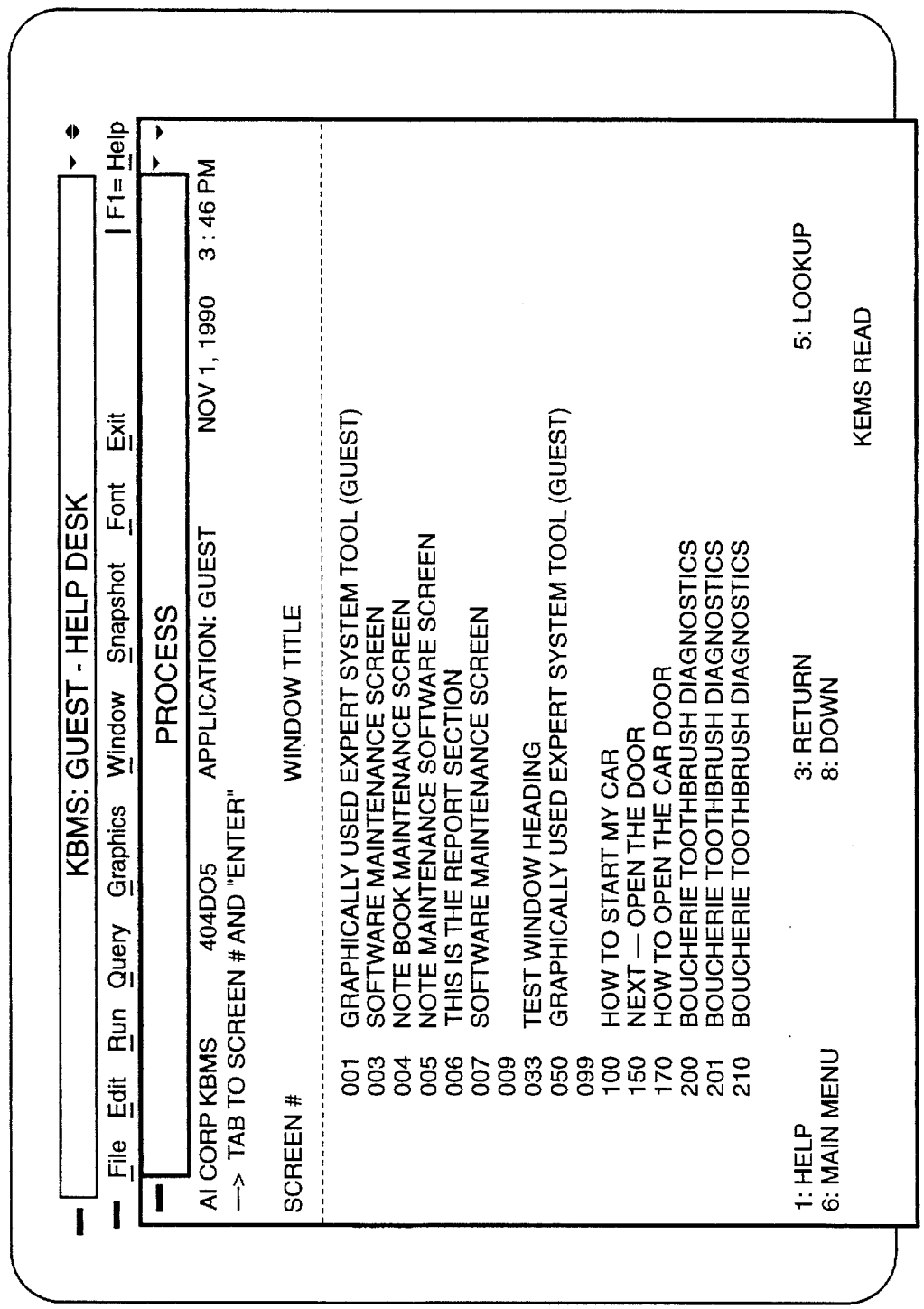
FIG. 12(a) is a representative example of a listing displayed to the developer when he desires to "show used screens" with the OS2® Presentation Manger® GUI.

The jump to icon 56, when selected, allows the developer to enter the application at any screen number. The developer will be prompted on the display to enter a database record pointer number in the manner as illustrated in FIG. 12. Once a screen number is entered, the internal command module will interpret the request and instruct the database manager to retrieve for display, the contents of the knowledge record corresponding to the requested screen number.

Each of the commands discussed above with respect to FIG. 2 is provided in pull down form in the version illustrated in FIG. 4, by selection of one of the multiple level menu items 41–44 as was previously discussed.

Entering Knowledge

When a knowledge record is requested to be updated, the developer will display it as a current screen. Then the developer will select the change icon 51 to enter text or change the attributes associated with the display of the screen to the user—like the color of an option box in zone 25 or the descriptive text label situated within the option box. Similarly, in the Turbo® version illustrated in FIG. 4, entry of the change screen command will present the developer with one of the screens illustrated in FIGS. 9 and 10 wherein similar changes are made.

Figure 8:
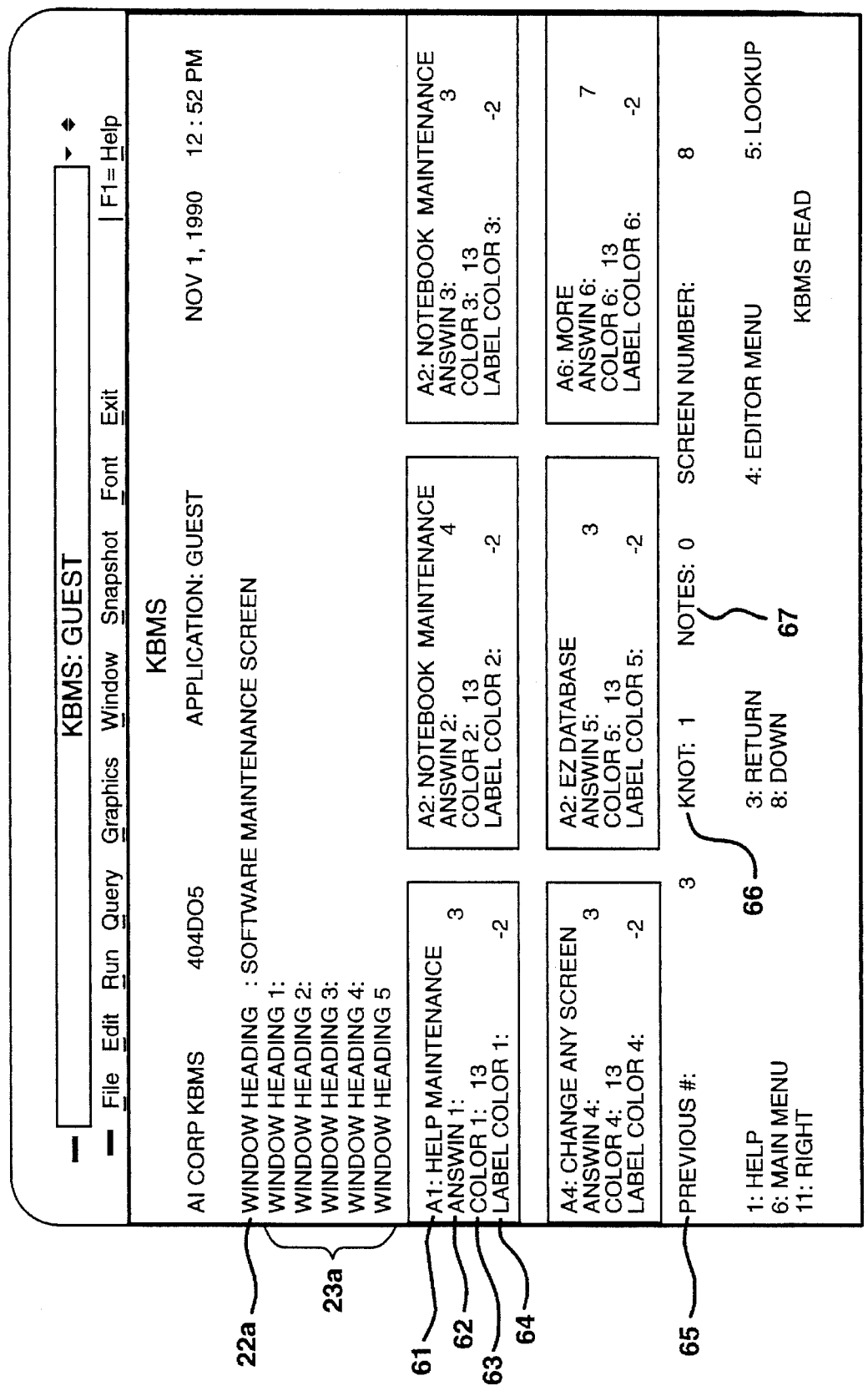
FIG. 8 is a simplified entry screen for use by the developer in creating a new screen, including alphanumeric text, options and attributes, or for editing an existing screens alphanumeric text, options or attributes when the Knowledge Base Management System® database is used.
Figure 9:
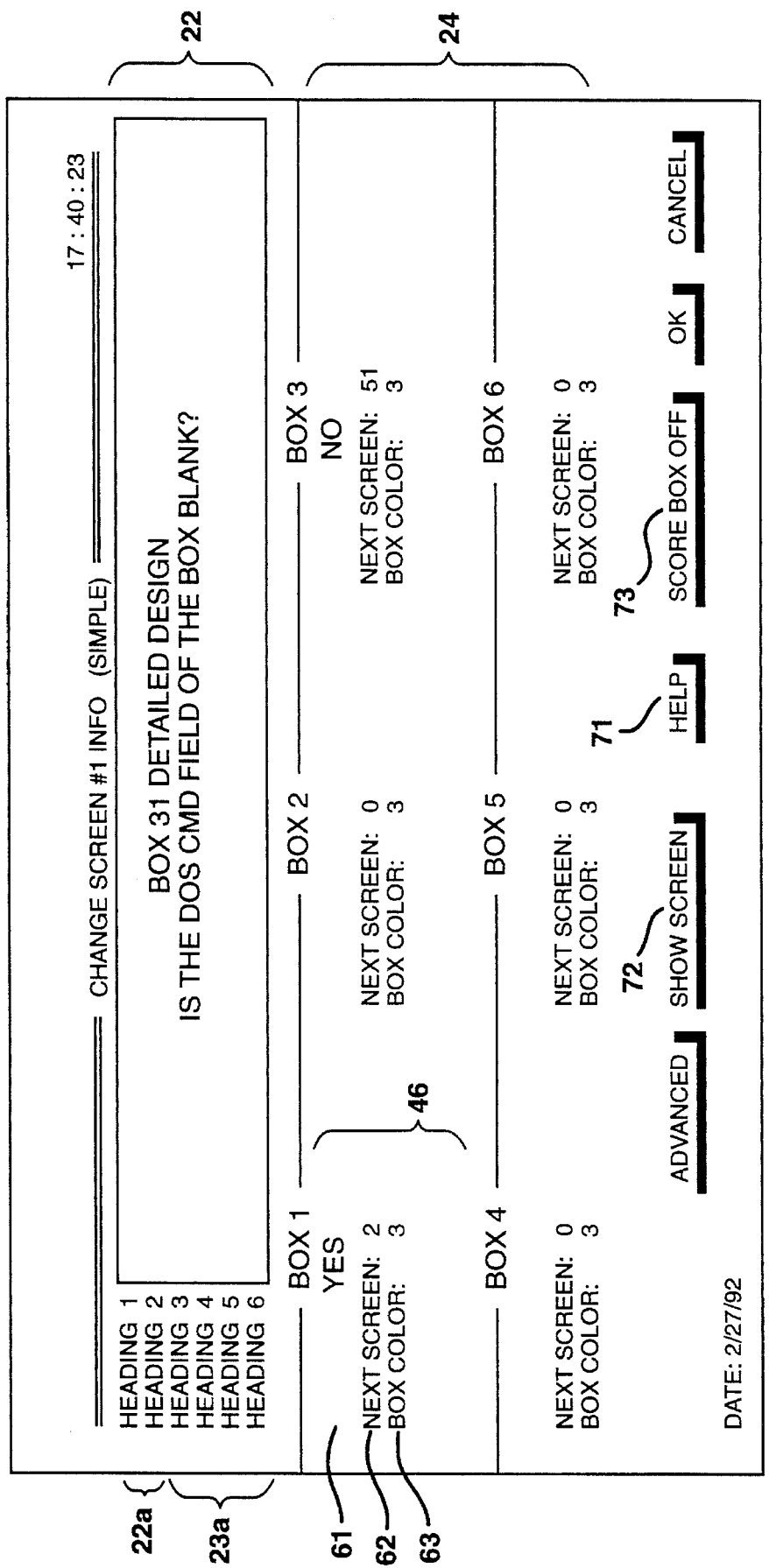
FIG. 9 is a simplified entry screen for use by the developer in creating a new screen, including alphanumeric text, options and attributes, or for editing an existing screens alphanumeric text, options or attributes when a Paradox® database is used.
Figure 10:
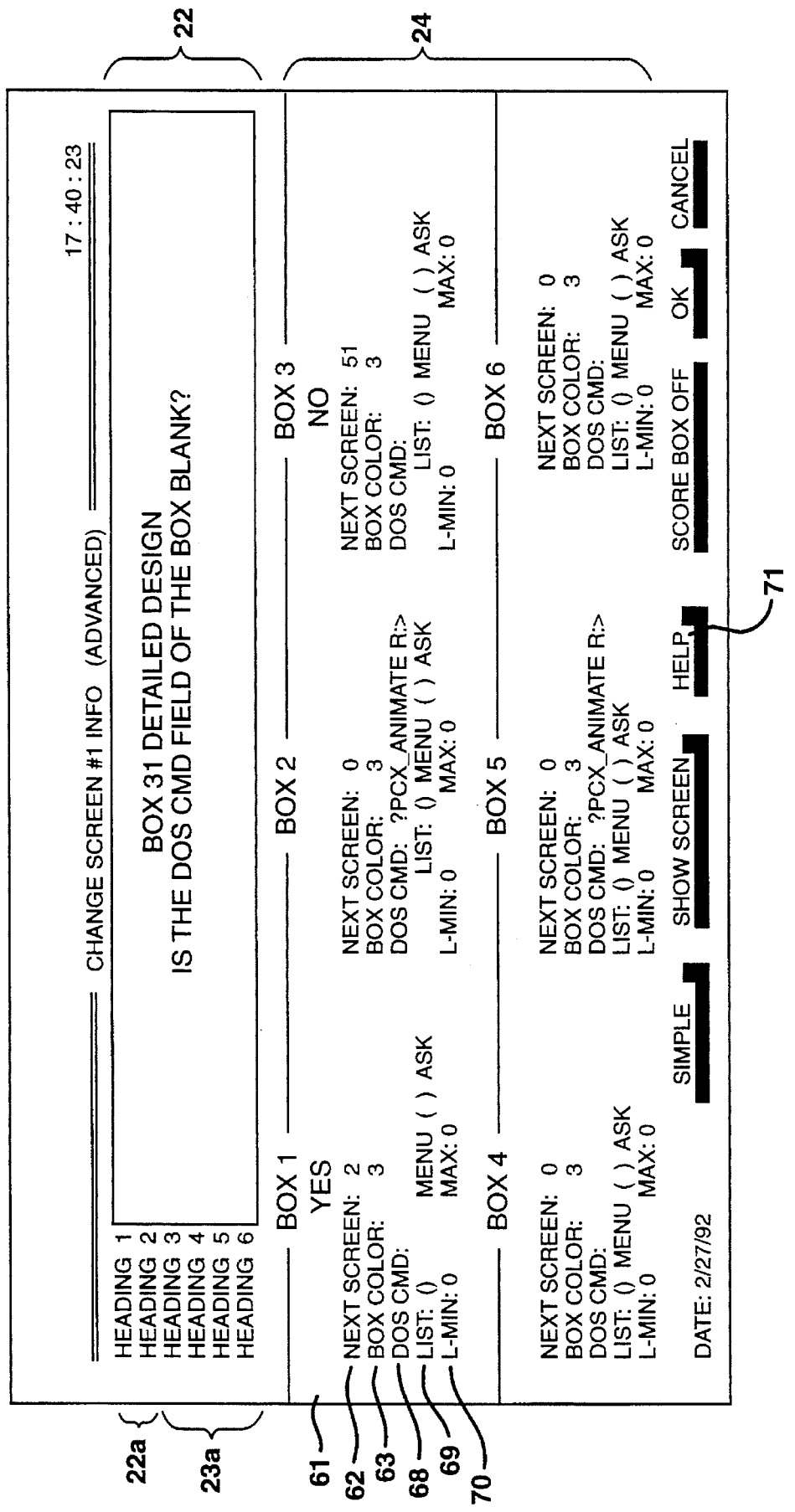
FIG. 10 is an advanced entry screen for use by the developer in creating a new screen, including alphanumeric text, options and attributes, or for editing an existing screens alphanumeric text, options or attributes when a Paradox® database is used.

The attributes associated with the entering and display of alphanumeric text is displayed with reference to FIGS. 7, 8 and 9, 10. With reference to FIG. 8 and 9, the developer must direct the screen cursor 27 to the line in the area where he wishes to enter text. When the area is selected, he enters his alphanumeric text.

In the Turbo Vision® version, a line of help text appears as each attribute is selected. With reference to FIGS. 7, 8 and 9, 10, the WINDOW HEADING attribute 22a will contain a short summary of the alphanumeric text to be displayed. The WINDOW HEADING attribute 23a comprise other lines for entry of questions or instructions or other meaningful description of the screen or application. Each option box in zone 24 consists of a line for an answer label 61 (e.g. "A1:"), an answer window attribute 62 (e.g. "ANSWIN1:"), an object color 63 (e.g. COLOR 1:) and an object label color attribute 64 (e.g. LABEL COLOR 1:). In the version illustrated in FIGS. 9 and 10, the label colors are automatically determined by the software based upon the color chosen by the individual box itself. The answer label 61 presents to the user the alphanumeric text which represents the options or answers for the user to select in response to the question or instruction displayed on the screen in zone 23. The answer window 62 is an integer value that specifies the screen number or pointer of the next database record to be displayed when that option box is selected by the user or developer. From a functional point of view, when the user selects an option box, the internal command module will interpret the action and instruct the database manager to retrieve the contents of the database record designated by the number present in the answer window attribute 62. This number, in essence, points to the next node of the decision network. Thus, in the preferred embodiment, every display can have up to six exit points forming new paths and decision nodes in each direction. If more exit points are required, each of the six exit points can calls the list processing software to allow for any number of exit options per display. List processing will be discussed in detail later.

The data base record illustrated in FIGS. 7, 8 and 9, 10 also contains data for the user interface module 13 and the GUI resident on the system. The object color attribute 63 is a whole number which identifies, via a look-up table, the color of the object box to be displayed. If the number zero (0) appears in the answer window 62, the option box will not be displayed regardless of the information contained in the answer label 61. Thus, if the developer wishes to keep an option box, for e.g., the maintenance option box, disabled from the user, he can implement this method. For the OS2® version illustrated in FIG. 8, the object label color attribute 64 is a whole number which identifies, via the same look-up table, the color of the alphanumeric text in answer label 61 when it is displayed.

Other attributes associated with the database maintenance change icon 51 of FIGS. 7 and 8 include the PREVIOUS WINDOW 65, the KNOT attribute 66, and the notes attribute 67. The PREVIOUS WINDOW 65 is the integer number which specifies the number of the screen which calls or points to the immediately preceding or reverse chained screen. Normally, this attribute is updated and displayed automatically by the internal command module.

In the OS2® version, the KNOT attribute 66 is a number having a value of more than (1). The default value is zero (0) and this value instructs the program to automatically set the previous window attribute—thus allowing the user to navigate backwards along the path he has chosen to take. If the developer enters a value of 1 for the knot attribute, the previous window feature is disabled. Thus, a knot value of 1 may be used if the previous screen would otherwise close a loop and trap the user in an endless circle of screen displays.

In the OS2® version, the ANCHOR attribute shown in FIG. 7 is a number having a value of "0" or "1". This attribute allows the anchor screen to be changed during the course of program development. A number "1" indicates that the presently displayed screen is the anchor screen. Thus, the user will be returned to this screen when the entry help disk icon 29 is selected. The default value is "0". The Turbo Vision® version does not allow renumbering of the anchor screen, and for that reason, in the Turbo Vision® version the anchor screen is always screen number 1.

With reference to FIG. 7, there are a number of system attributes that may be set in the data file, that are not displayed in the EZ entry forms, illustrated in FIG. 8, 9 and 10. For example, In the OS2® version, the NOTES OFF attribute enables the developer to suspend the read and write notes option for a particular screen. The number of "0", which is the default value, indicates that the user can read and write notes for the displayed screen when the read/write notes icon 31 is selected. A value of "1" will instruct the internal command module to suspend the read/write notes option for that particular screen.

The SCREEN NUMBER and FROM SCREEN NUMBER attributes respectively tell the program command module on the database interface module which database record the currently displayed screen belongs to and which previous database record the current displayed screen was linked from. In the Turbo Vision® version, the FROM SCREEN number is dynamic and cannot be altered by the developer.

The NOTE PAGE ON attribute is an integer having a value of "1" or "0" wherein a "1" instructs the user interface module that the notebook maintenance icons should appear. A "0" indicates that the notebook maintenance icons should not appear for a given screen. The default value is "0". In Turbo Vision, there is no attribute like this and the notes are always on.

In the OS2® version, the DUPLICATE attribute is an integer that is displayed below the entry help disk 29 (anchor) icon. It is an integer value that tells the developer that this screen is a duplicate of the integer listed in this field. The default value is "0" and indicates to the developer that it is not a duplicate.

Also illustrated in FIG. 7 are several other attributes that can be changed or updated by the developer. The graphical object of the type SCORE BOX 1 ON allows the system to keep track of whether or not a particular decision path in a particular application brought about a successful resolution to a problem. This attribute is a number having a value of 0 or 1 and is entered in the data record by the internal command module and database interface module in response to a user selection of a designated option box. A value of "1" will make a Score Box object appear in zone 25 of the display, and a "0" will make it disappear. This Score Box, when selected, indicates a positive result or "YES" to a question, and its results are tied to a screen number previous to the appearance of this object. The results of the Score Box 1 On may be summed by the database manager and requested as a Score Card Report, to be described below. The graphical object SCORE BOX 2 ON is also a number attribute having a value of zero "0" or "1", wherein a "1" will make a Score Box object appear in zone 25 of the display, and a "0" will make it disappear. This Score Box is the answer indicating a negative result or "NO" to a question, and its results are summed with the last non-zero route number recorded. Again, as will be described below, the results of the Score Box 2 On may be summed by the database manager, and the results displayed with the Score Card Report's positive tally in a graphical representation, such as that illustrated in FIG. 16.

The SCORE BOX 1 NEXT SCREEN and SCORE BOX 2 NEXT SCREEN are attributes each containing up to a 10 digit number. Score Box 1 Next Screen indicates the next screen of knowledge to be displayed once the user has selected a YES option box in response to a developer posed question. Score Box 2 Next Screen indicates the next screen to be displayed once the user has selected the NO answer to a developer posed question.

In the OS2® version, the data object of the type "ROUTE NUMBER" is an attribute containing up to a 10-digit number which identifies the value of the path taken before a score is checked, including the value of the last screen displayed as a result of following a particular decision path. In the Turbo Vision® version, this number is set to the current screen number.

In the OS2® version, the graphical object "ROUTE LABEL" is an alphanumeric text attribute identifying the text that the developer wants to appear in the Score Card Report.

The "SCORE BOX 1 LABEL" and "SCORE BOX 2 LABEL" are attributes each containing up to 80 alphanumeric characters that the developer wants to appear on the positive and negative results answer, respectively, for a particular evaluation session. Each label respectively appears on the Score Box object which appears when the developer provides a "1" in the Score Box 1 On or Score Box 2 On attributes of the screen database record.

Figure 16:
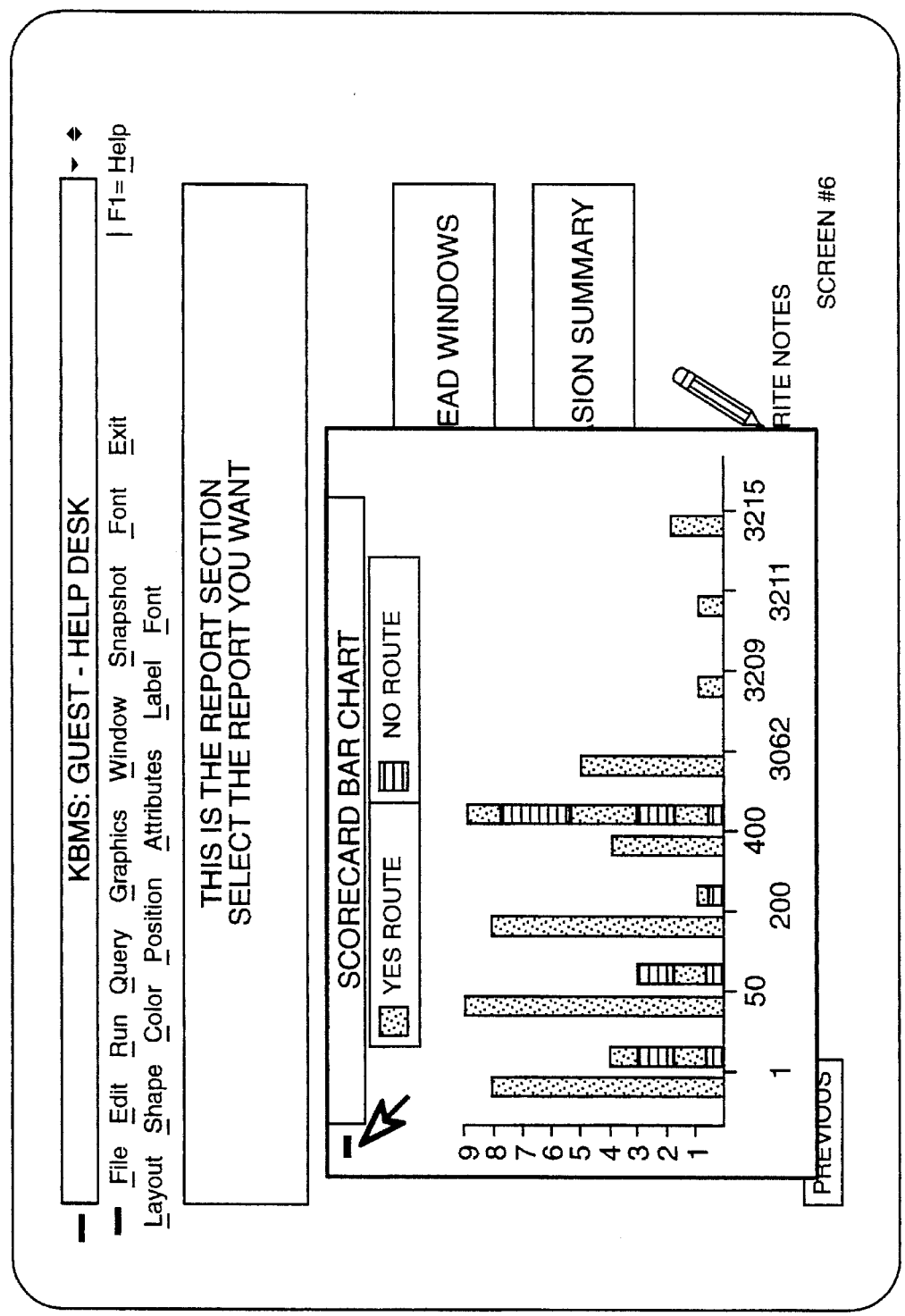
FIG. 16 is representative of a score card bar chart showing the results of an empirical evaluation of an expert system.

Information resulting from entries stored in the Score Box 1, 2 On are summarized in the Score Card Report shown in FIG. 16. This report shows the path taken (last screen number displayed to resolve a problem, the number of YES answers, and the number of NO answers. From this, it would be possible to determine either the correctness or responsiveness of the answers given by the expert system.

In the OS2® version the "XDATE" and "XTIME" attributes listed in FIG. 7 are automatically updated with the computer system's date and time whenever a record is changed.

ARC, DOS and LIST Processing

As will be hereinafter explained in greater detail in connection with FIGS. 18 and 19, the present invention enables the developer to use ARC, DOS and List processing commands as exit actions to be invoked at the selection of any given decision box by a user. As noted in FIGS. 9 and 10, each decision box 46 as associated therewith not only an answer label 61, an answer window (next screen) attribute 62 and object color (box color) 63, but also a provision for insertion of a DOS command line at 68, which command may be a mix of DOS or ARC commands, separated by a ! ! ! ! separator. List processing may be invoked through the selection of the menu line 69 and an appropriate range of menu options, specified in L-Min and L-Max at entry line 70 or as an ARC command. In addition, the developer can request the entry of alphanumeric text, such as a machine's serial number, by choosing the ASK option on line 69, wherein the serial number can be entered in a list of serial numbers, or range of serial numbers, if desired, which can then be used to select the appropriate branch of logic for the expert system to follow, by providing the appropriate next screen number in a list processing command line. List processing in essence is a pair of ASCII files that form a flat database with a single line number for each pointer entry followed by a linked text string in a message file. The text string in the message file can be used as a menu item, as text information to the user, or it can be used to embed the following ARC. For example, embedding the ARC command ^26, B:3 would instruct the command module to jump to screen 26 and simulate selection of button 3, which would in turn invoke any further action contemplated by the developer for that decision box selection. ARC and List processing is more fully explained with respect to FIG. 19.

Help and Notebook Maintenance

Figure 6:
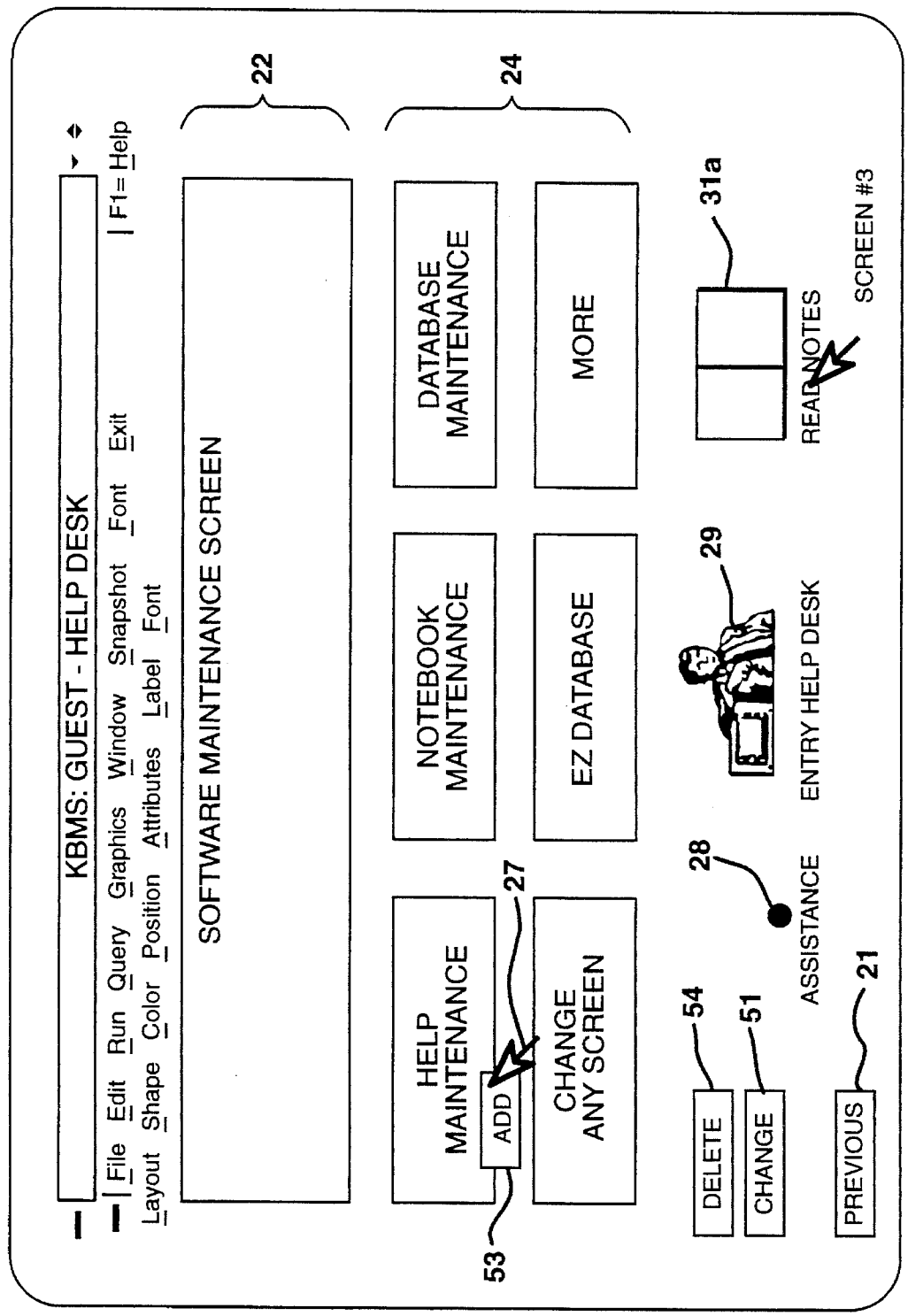
FIG. 6 is a representative example of the developer screen illustrating selections of various ICON.

There are options for the developer or user to maintain the text written into a help database record corresponding to a screen display. These are the HELP Maintenance Options. These options appear on the screen as a pull down menu of icons when the HELP MAINTENANCE option box in zone 25 of FIG. 2 is selected. The Help maintenance icons shown in FIG. 6 as ADD, CHANGE and DELETE, perform identical maintenance functions as the database maintenance icons described previously except they act upon help database records. For example, an ADD icon when selected by the cursor and "dragged and dropped" on an option box via mouse or trackball as shown in FIG. 6, allows the developer to create a help record for the particular option box selected. Note that the "drop and drag" method of selection is an alternative method than the double selection method described previously in reference to the help assistance icon 28. In the Turbo Vision® embodiment illustrated in FIGS. 4, 9 and 10, developer help is accessed in screens 9 and 10 by clicking on Help icon 71. Adding, changing or deleting the Help record is accomplished through maintenance change commands 42 previously discussed with respect to FIG. 4. The methods available will be determined by the methods supported by the resident GUI.

Figure 15:
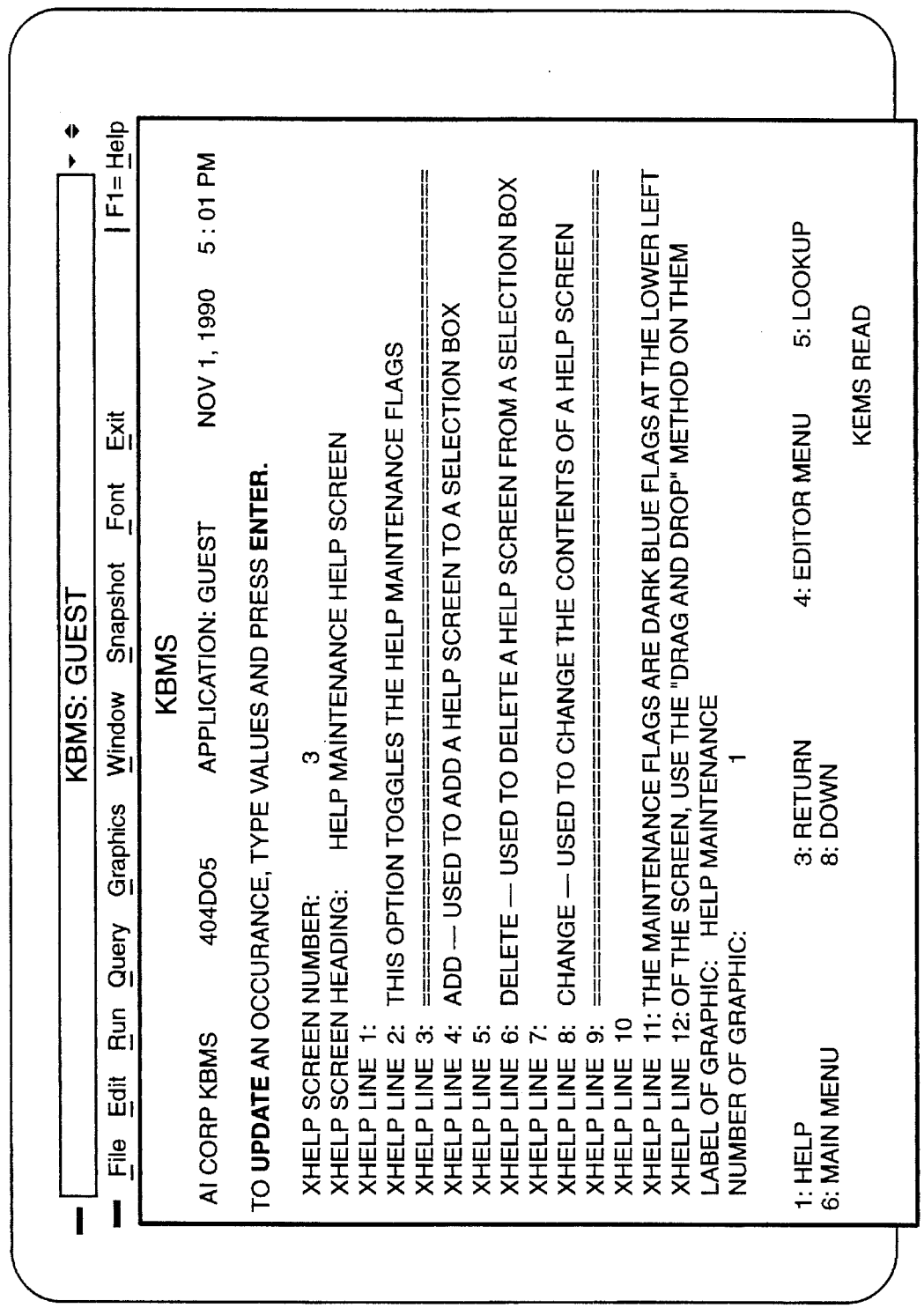
FIG. 15 is representative of a formatted help data base record corresponding to the help maintenance screen of FIG. 14.

FIG. 15 shows the complete Help screen database record and the screen attributes associated therewith. Specifically, FIG. 15 shows the data in the help database record corresponding to the Help Maintenance option box help screen illustrated in FIGS. 2 and 6. The "X HELP SCREEN NUMBER" attribute is a number assigned to the corresponding database screen number. The "X HELP SCREEN HEADING" attribute is a string of alphanumeric characters that describes what type of help information to be described. "X HELP LINE" attributes are the series of up to 12 lines that will contain the help information for a particular screen. The "LABEL OF GRAPHIC" attribute is particular to the OS2® version of the program, and is an alphanumeric string of characters which is the label of the graphics option that is desired to be attached to a help screen. The "NUMBER OF GRAPHIC" attribute is a number which is used to separate object boxes if the same labels are used on the same screen but for different objects.

The NOTEBOOK MAINTENANCE option illustrated in zone 25 of FIGS. 2 and 6 provides a set of options that allows the developer to examine, archive and delete previously created notes. It should be kept in mind that notes are entered into the system via the read/write option. Under the Knowledge Base Management System,® when the Notebook Maintenance option is selected, a NOTEBOOK MAINTENANCE SCREEN is displayed with an option box VIEW/DELETE NOTES. Selection of this option allows the developer to view and delete each note entered in the system. Entry into this part of the database manager will allow the developer to "rewind" the notebook to the first note. The developer will then select the NEXT NOTE option box to open the notebook and begin editing. Selection of a DELETE THIS NOTE option instructs the database manager to remove the note from the system. This option enables either the user or the developer to prevent the storage of incorrect or out-of-date information and to shorten the response time when deleting notes from the notebook. Notebook maintenance may be implemented by a menu of maintenance icons or by option boxes in zone 25 of the developer's display screen.

It may be appreciated that the help database and notebook maintenance options described herein are a separate set of icons or options that are performed in response to a developer selection and are identical to the functions performed by the database manager in response to selection if the database maintenance menu items illustrated in FIG. 2. This separation of maintenance functions is unique to the embodiment of the invention implemented with the Presentation Manager® GUI and the Knowledge Base Management System® as the database manager. In the embodiment illustrated in FIGS. 4, 5 and 9, 10 which implement Turbo Vision® as the GUI and the Paradox® database manager, only one set of menu maintenance selections is supplied for the developer to choose when desiring to add, update or edit any formatted database record whether it be a knowledge record, a help database record, or a read/write notes text file.

Knowledge Records representing screen information can be used as starting, continuation and concluding points in a user construction session. An example of a concluding point is the RECOMMENDATION SCREEN shown for a particular application in FIG. 17. This screen is the concluding screen of a particular branch of logic in a consultation session. It contains information which instructs the user how to solve a particular problem based upon the path that the user has taken and provides an option for the user to select to indicate the user's action in the field. It is developed similar to any other screen except it should offer the user only one option which, when selected will call a "Tally" Screen. In the OS2® version, the ROUTE NUMBER and ROUTE LABEL attributes of this "Tally" screen are necessary to create this special purpose screen.

The program of the present invention allows the developer to create screens which have special purposes. For instance, a Tally Screen may be provided to requests the user to comment on the correctness of a consultation. The attributes of the screen database record used to form the tally screen include the WINDOW HEADING and WINDOW HEADING 1–5, SCORE BOX 1,2, NEXT SCREEN and SCORE BOX 1,2 LABEL (all previously described). These attributes are then used to construct the score card screen illustrated in FIG. 16. In the Turbo Vision® version an icon selection in zone 73 of FIG. 9 will select the "SCORE BOXES" screen.

Miscellaneous Utilities

Several utilities are automatically available to help the developer document and maintain his work. These utilities can be accessed by selecting the option boxes with their labels. For example, when the Knowledge Based Management System® is implemented, the option box CHANGE ANY SCREEN shown in FIG. 2 allows the developer to change the data contents of the currently displayed screen's knowledge record 19. The developer must first activate the database maintenance option before he can select this option.

The SHOW SCREENS option box 72 shown in FIG. 9 allows the developer to quickly locate any screen in the system. When selected, a screen report will appear listing the number and title of every screen created in the system. An example of a display screen report for an OS2® embodiment and a Turbo Vision® embodiment listing screen numbers and window titles are shown in FIGS. 12 and 12(b), respectively.

The UPDATE RELEASE # option may be provided to allow the developer to update the version number of the particular application. When selected, the current version number of the expert system application will be displayed. Additionally, the developer may be prompted to enter the new version number. This is accomplished in the Turbo Vision® version via the "update title" command.

A DUMP DATABASE option may be provided which will print the contents of the screen database record to the computer's system printer. This utility provides the developer with a detailed listing of every item of information associated with every screen (knowledge record) in the system. The developer can select the range of the database that he wants printed by overwriting a default stop and start number provided by the database report prompt screen. Similarly, the DUMP HELP DATABASE option will provide the developer with a detailed listing of every item of information associated with every help screen created in the system. This is called "PRINT ALL RECORDS" in Turbo Vision® version.

A REPORTS option may be provided to provide general information about the system for, e.g., current state of development, the number of unused screens, the consultation success tally, and the screen summary.

Referring to FIG. 16, the SCORE CARD BAR CHART report generates a bar chart which will tally the consultation success rate on a per decision path or branch basis as displayed for a particular application. On the horizontal axis of the bar chart there is displayed the screen number of the end of branch recommendation screen. The vertical axis displays whether or not that advice or recommendation solved the problem at hand. The numbers on the vertical axis correspond to the number of times the consultation resulted in a yes or no response for a particular path. The SCORE CARD DATA option presents a tabular listing of the score card bar chart report instead of the bar chart.

In the OS2® version of the program, the VERSION SUMMARY option provides, for display, a listing of all the versions recorded by the version update option.

The UNLINKED WINDOWS option report produces, for display, a list of screens that are listed by a particular screen's attribute ANSWIN (1–6), but do not exist, i.e., those screens are linked by virtue of the attribute (pointer) but have no screen created there. (Note, that if that particular option box was selected with a pointer linking an unexisting screen, the program will cause the error screen (see FIG. 11) to appear.) This report is a tool which will show the developer where there are deficiencies in the knowledge tree structure. If all paths are completed, then no report will be produced. This option is not needed in the Turbo Vision® version since all required screens are automatically created.

The DEAD WINDOWS or DEAD/ORPHAN options provide, for display, a list of screens which are not requested by any branch in the knowledge tree structure, but which exist as screens. Thus, this report is the opposite of the unlinked windows report. A dead window is a screen that the user cannot display by using any path from the anchor screen. These screens do not affect the normal flow of knowledge. A dead screen may be created when, for example, a developer has a new machine to add to the knowledge structure. The developer creates the path to take, but does not offer it to the user because the machine is not ready for use by the user. Thus, the dead window report would show that this branch exists but cannot be reached by the user. This report is useful when the developer needs to check that all screens are in the knowledge structure and can be accessed by the user.

The SCREEN SUMMARY report provides, for display, a list of all the screens in the knowledge structure sorted by screen number, or alternatively, a range of screens may be displayed. Each screen number displayed may be followed by the description contained in the WINDOW HEADING attribute of the particular screen. This report is useful when the developer needs to navigate the system during maintenance and application development. This report is generated in the Turbo Vision® embodiment by selection of the show used screens command.

Other Features

Several other features of the expert system building tool of the present invention are available. The List Processing feature allows the user to access a flat-file ASCII based database whether it already exists or is separately created by the expert or other person. An ASCII based database is a database that uses a regular ASCII file to store information.

As previously mentioned, the user or developer may want to store different types of information in a database. The major concerns associated with creating the ASCII database is to decide how much of each type of information desired to be stored. Thus, the developer would create sections of knowledge wherein each section would comprise a number of records. To create an ASCII database file is well-known to a skilled programmer or knowledge expert and need not be explained here. The List attribute, having a value of 0 or 1, indicates to the internal command module which method of query into the created ASCII based database it is to use. The options are MENU, when list manager attribute equals 1, or ASK, when list manager attribute equals 0. The MENU option creates a list of options from which the user can choose. The ASK option provides an entry option that allows the user to enter text to limit the choices displayed on the menu. The attributes associated with list processing provides the internal command module with the display data for the list processing function. The "L-MIN" attribute is a number that provides the database manager with the lower limit of the list record number from where the list processing will begin to display or search for choices provided to the user. The "L-MAX" attribute is a number that provides the upper limit of the list record number from where the list processing will stop the display or search. The entry of the values is illustrated in FIG. 10 at zones 69 and 70.

The feature of UPLOADING and DOWNLOADING data allows the user to upload or download a new database of information while within any application. Uploading allows the user to upload a new database of information from within the application, so he can access up-to-the-minute knowledge when desired. Downloading enables the developer to save, in the database, all the screens he might have changed when running a particular application. Once the database is saved, it can be copied to a tape or floppy disk or otherwise stored off-line. By storing the expert systems information in a common data file structure, usable by all data base managers, the GUEST system provides true portability across all platforms, operating systems, GUI's and database managers. Thus, a GUEST expert system developed on a 32 bit OS2® operating system, using Presentation Manager® and the Knowledge Base Management System database, may be transported as a set of data files, and opened on a 80286, portable running DOS and the Turbo Vision®, Paradox® version of GUEST. The use of a common data file structure also facilitates the use of common encryption algorithms such as the DES, data encryption standard, or other algorithms as discussed in Privacy and Authentication: An Introduction to Cryptography by Diffie and Hellman, IEEE, Vol. 67, No. 3 March, 1979.

The DOS® COMMAND LINE feature enables the developer to execute DOS® commands from within an application. The entry of text into the attribute "DOS_CMD" will provide the internal command module with DOS® or any other operating system commands. For example, the developer may want a directory of a disk drive labelled C. The corresponding text entered into the attribute DOS_CMD would be: DIR C: File.tmp. The "file.tmp" is a predefined file and it is loaded with the directory output of the DIR C: command. The interface module software will automatically display the data. The Turbo Vision® version command would be: DIR C:>File.tmp.

Other types of commands, the ARC processing commands, may also be used by the internal command module. These commands, as previously described, allow the developer to access the internal command module processing functions. An ARC command is interpreted to perform some action that may involve the use of ARC variables or static values embedded within the command. For example, the developer may request that the user enter a text string representation of a particular piece of equipment or state of machine operation.

Other options available to the developer include: the ability to create a flow chart of the entire application or a particular section thereof; the ability to change the value of the maintenance password which permits the program to change to the Maintenance mode from the user mode, and the start-up password which permits the user to begin an application.

Guest Command Module Flow Chart

The flow charts of FIGS. 18(a) through (h) depict the typical operational sequences of the program when a developer or user is, respectively, creating an expert system application or executing the developer's application.

At program initialization, the program command module reviews the command line entry to determine if any special start up options should be invoked, as indicated at step 101.

In the preferred embodiment of the Turbo® GUEST program, a series of command line switches are provided to assist the developer in resuming work on the GUEST module, testing the module, changing the database profile, or the like. These command line switches may also be used as part of an ARC command to transparently move the user from one GUEST expert system to another.

For example:

| | |
|---|---|
| GUEST-M | starts GUEST in the maintenance mode; |
| GUEST-B | starts GUEST with a blank database; |
| GUEST-R | restarts GUEST from the developers last exit; |
| GUEST A# | will start GUEST by activating the # box, where # is a number from 1 to 6; |
| GUEST-Q | will start GUEST and bypass the title and copyright screen; |
| GUEST-S | removes any existing data copy or security protection when GUEST is started; |
| GUESTTSR | starts GUEST as a terminate and stay resident program which may be activated by a hot key sequence; |
| GUESTTSR-U | will unload the GUEST TSR; |
| GUESTTSR-TD | will force the TSR portion of GUEST to disk, rather than memory. |

Using the command GUEST, without any of the foregoing switches will start Turbo® GUEST with the currently specified Turbo® knowledge base, as last specified in the directory identified in the GUEST profile.

The command module then checks a profile file to determine if a password is required for initialization, as indicated at 177. If not, the program proceeds to initialize as indicated at step 103.

Figure 13:
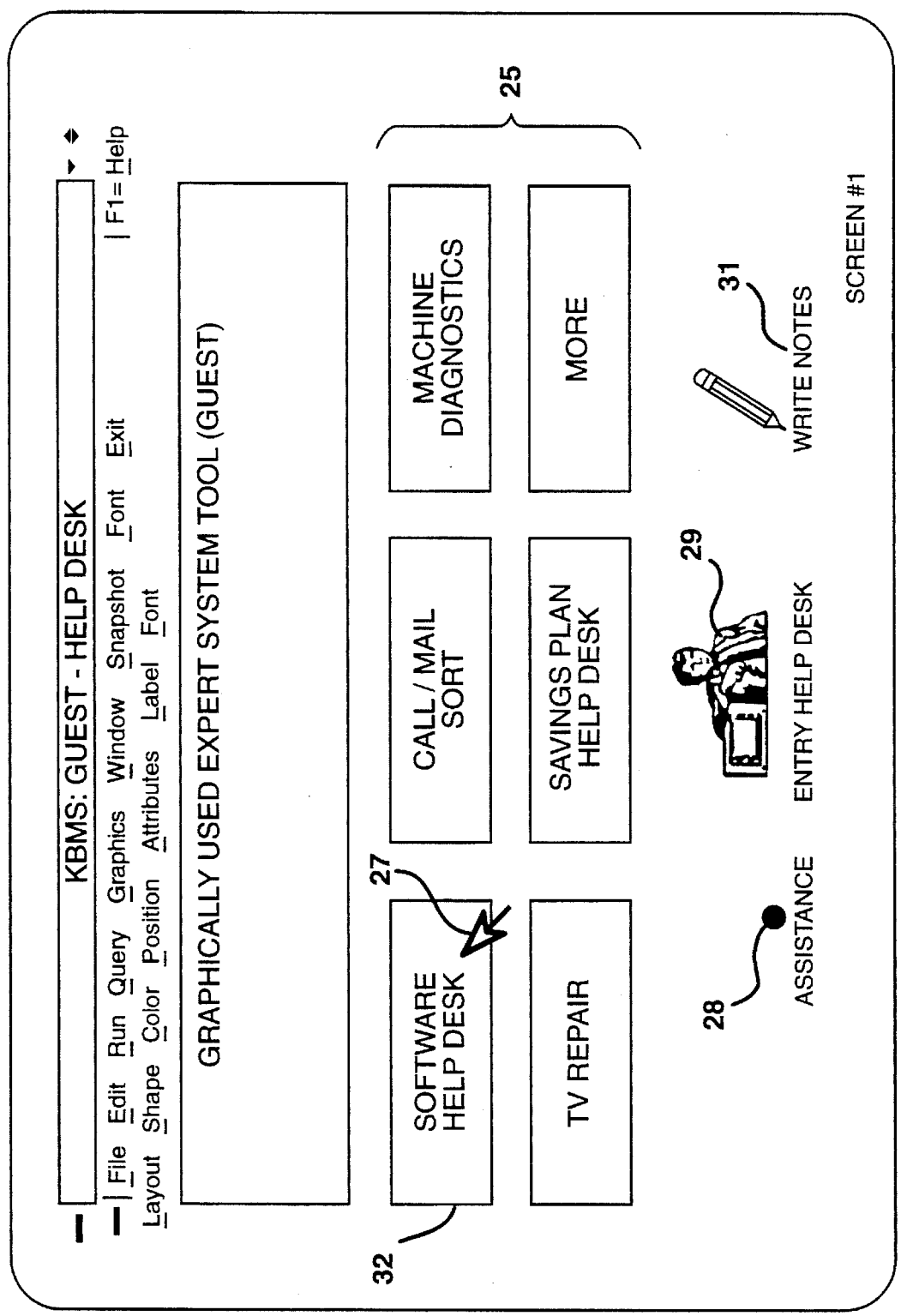
FIG. 13 is a representative example of a user anchor screen;.

The developer (user) may be asked at step 102 to enter his password before entering into an application. This is a security feature to prevent unauthorized users from accessing portions of the application as designated by the developer. The password can be an alphanumeric word of any length up to 255 characters. If the password entered is invalid as indicated at run box 104, the program is directed to terminate at step 74. If the password entered is valid, the program is initialized, illustrated as step 103 in FIG. 18(a), which consists of the loading and compiling sequences necessary to run the program. The internal command module 10 directs, in step 132, the database manager 12 to retrieve the data contained in the first database record for display as the first screen such as the anchor display shown in FIG. 13. The program sequence that accomplishes this is as follows: first, the database manager 12 automatically retrieves the data contained in the first database record, shown as step 132 in FIG. 18(a); next, the internal command module decodes the data therein (step 105 in FIG. 18(b)). Then, the interface module then formats the data for display by the GUI (step 106) on the CRT display monitor.

Figure 18A:
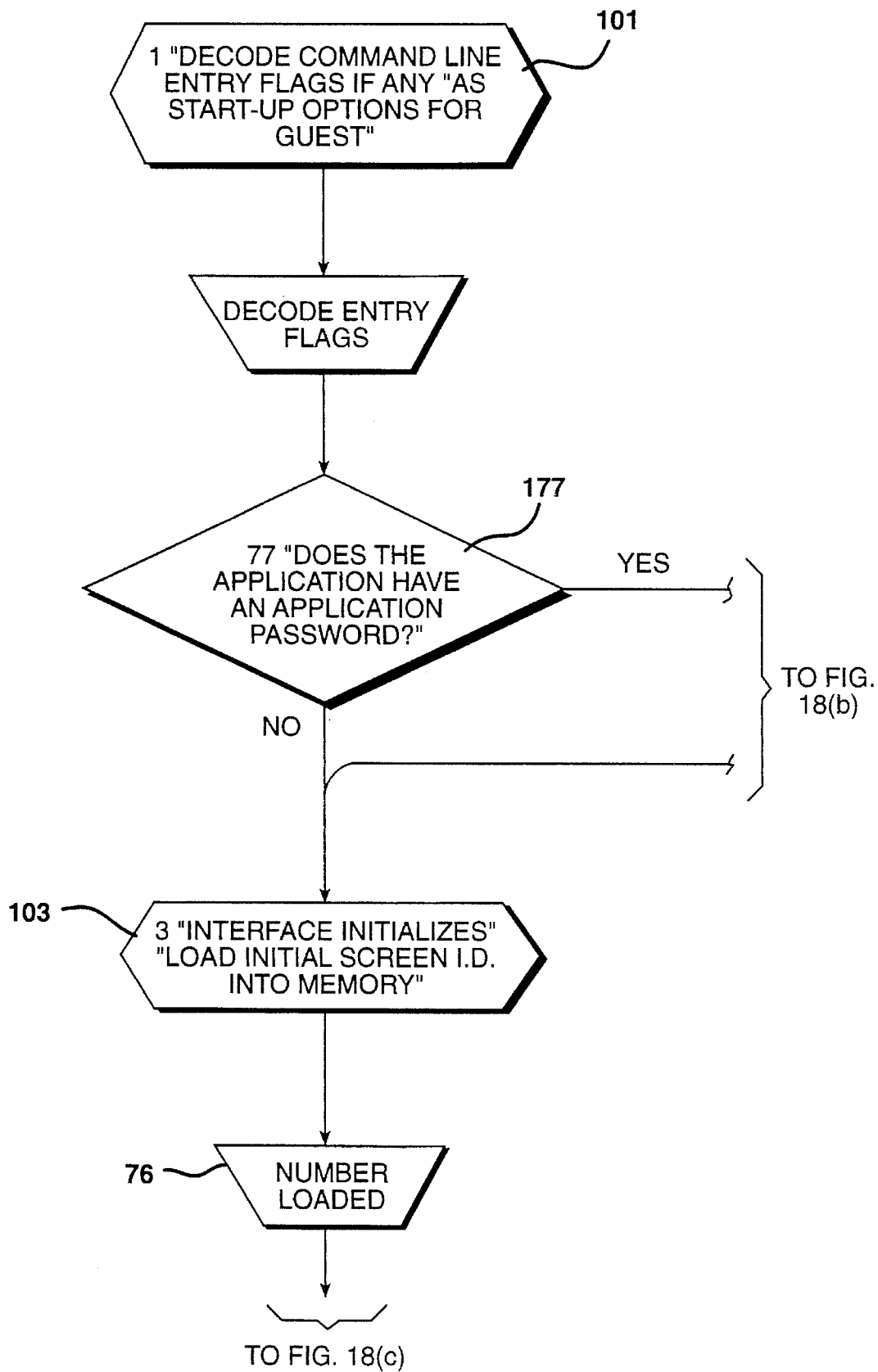
FIGS. 18(a)–(e) and (g–h) illustrate the modular components of a single program flow chart illustrating the operation of the command module of the present invention.
Figure 18B:
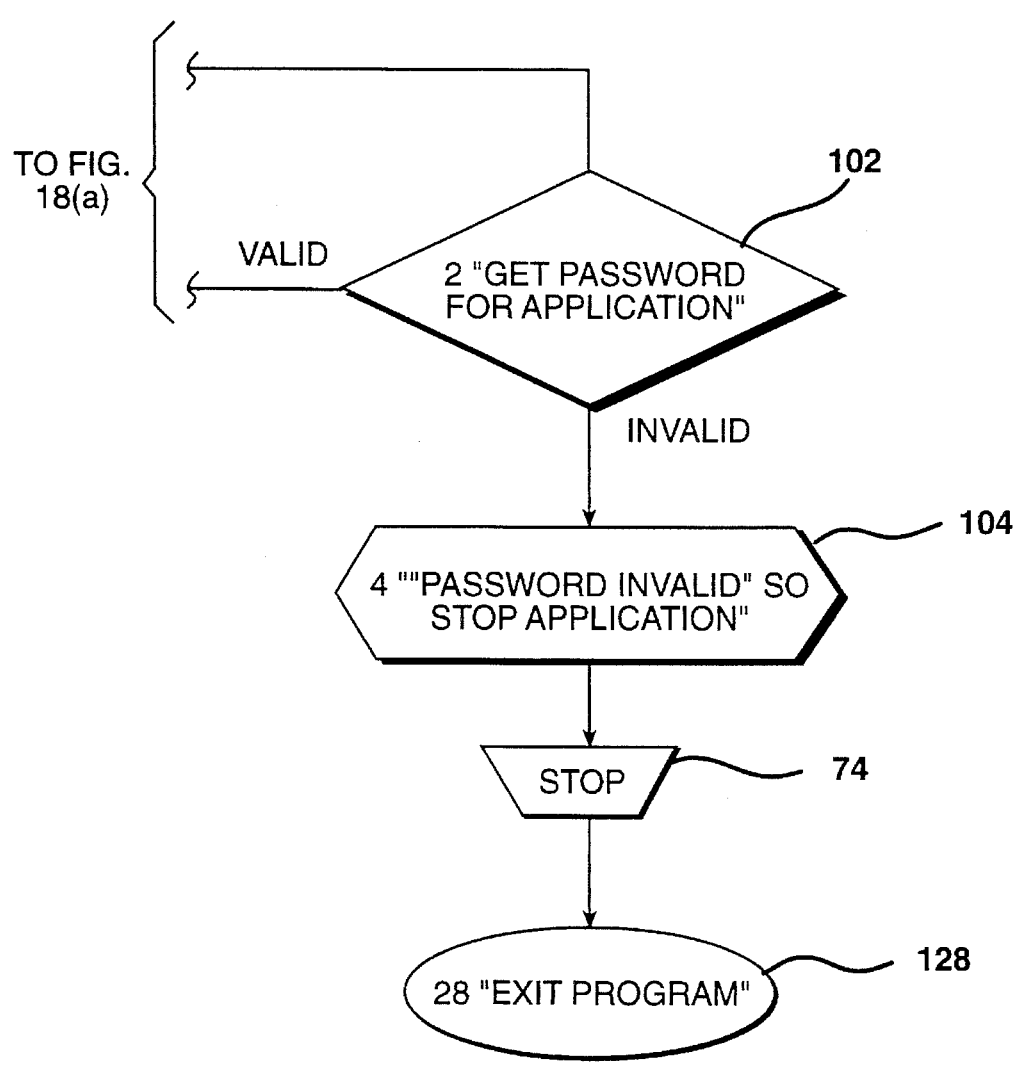
Figure 18C:
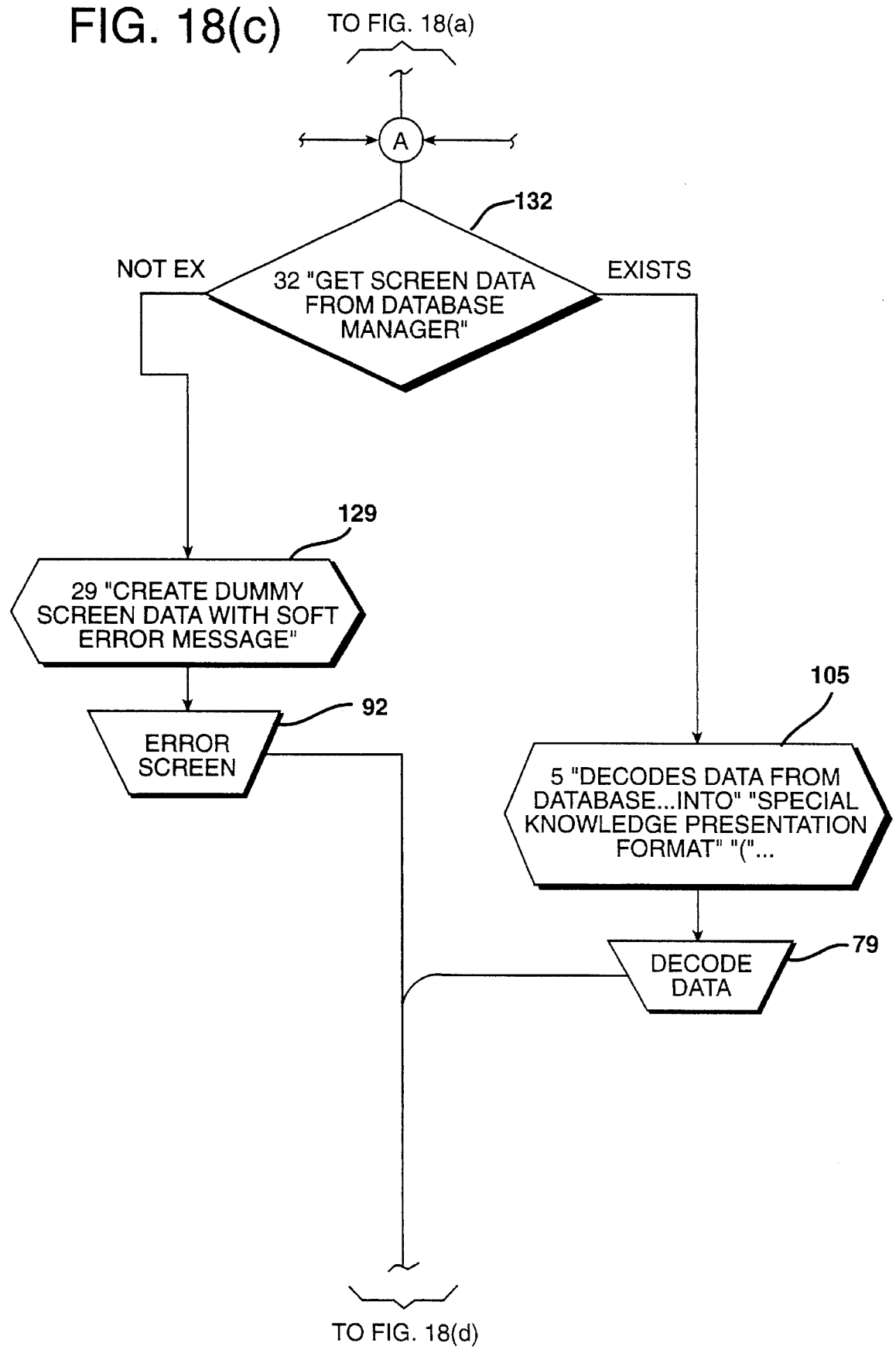

The formatted data is then displayed on the CRT screen, as indicated at step 70 in FIG. 18(b). At step 107, the interface command module waits for input from the user. This is a central node to which various action options available to the program return when action is completed. When input is received, via a pointer device, the icon selection is decoded by the Graphical User Interface, in various manners well known to the art which vary according to the GUI in use. The GUI then passes the code string representative of that icon to the internal command module at 81. The internal command module then decodes the instruction and implements the requested action in the manner depicted by the remainder of FIG. 18, from FIG. 18(b) through 25(h). If the user input involved a decision box the command module branches to the right as illustrated at 109. If the input involved a maintenance or navigation icon, it branches to the left, as illustrated at 109.

Figure 18D:
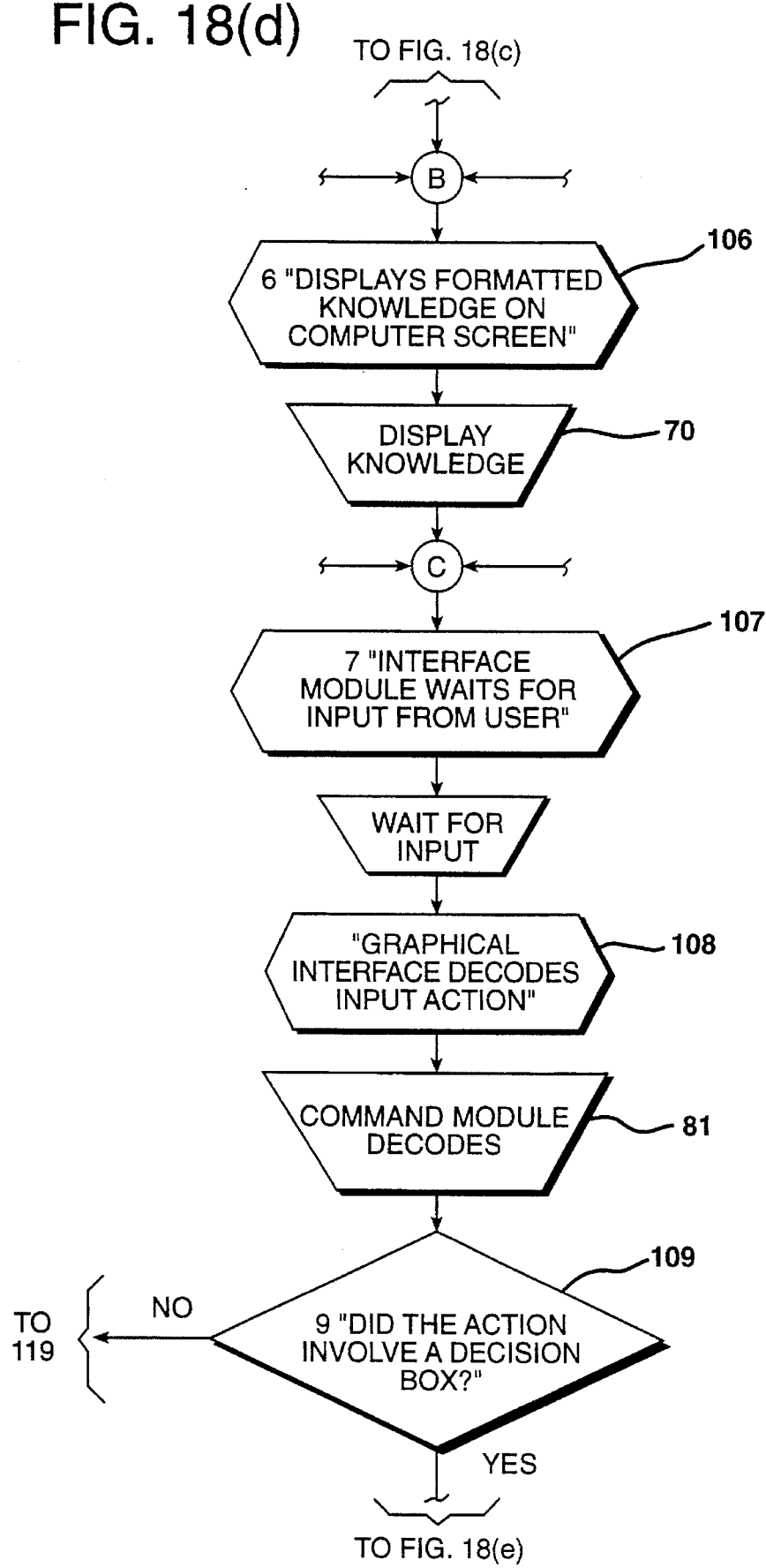
Figure 18E:
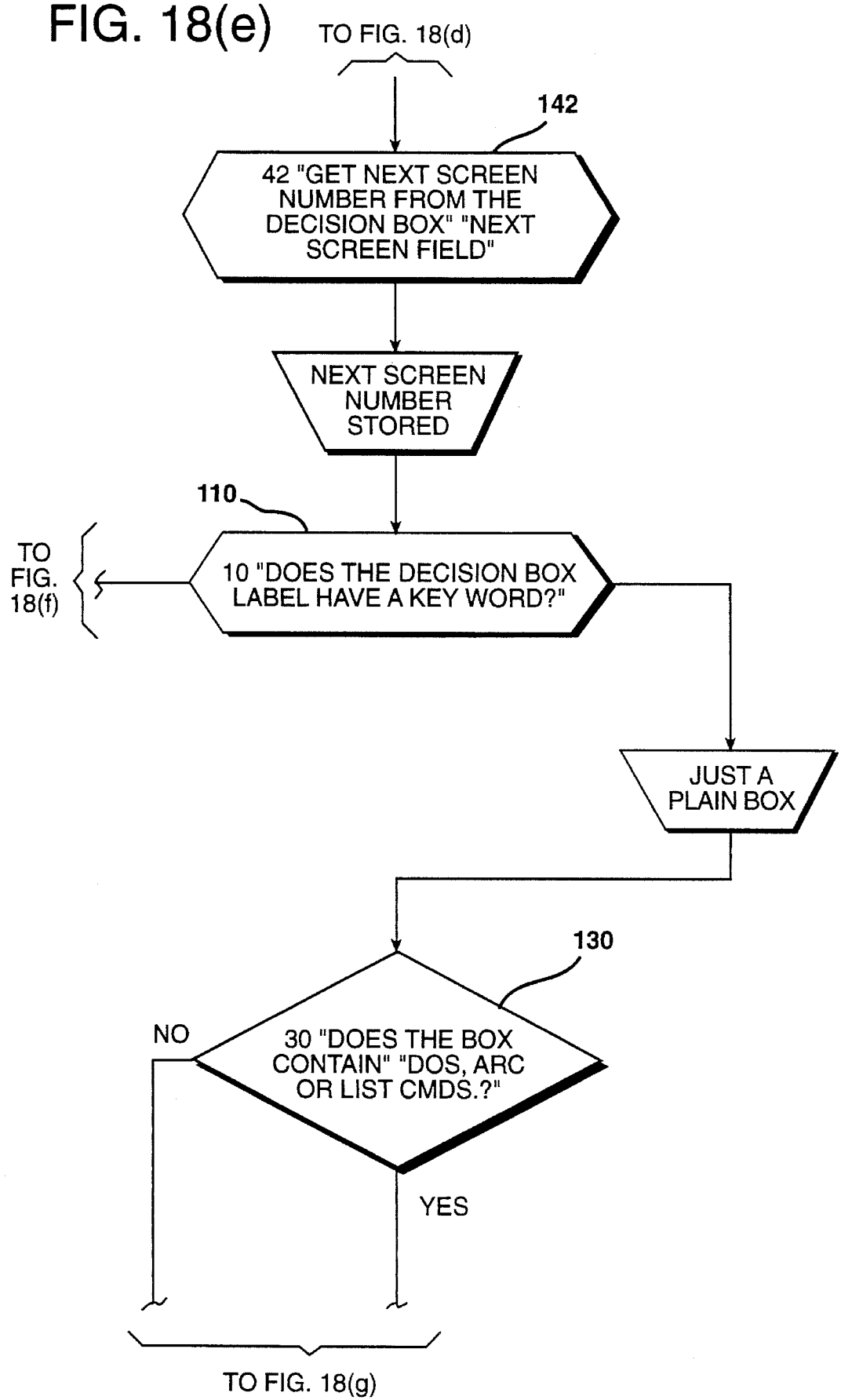
Figure 18F:
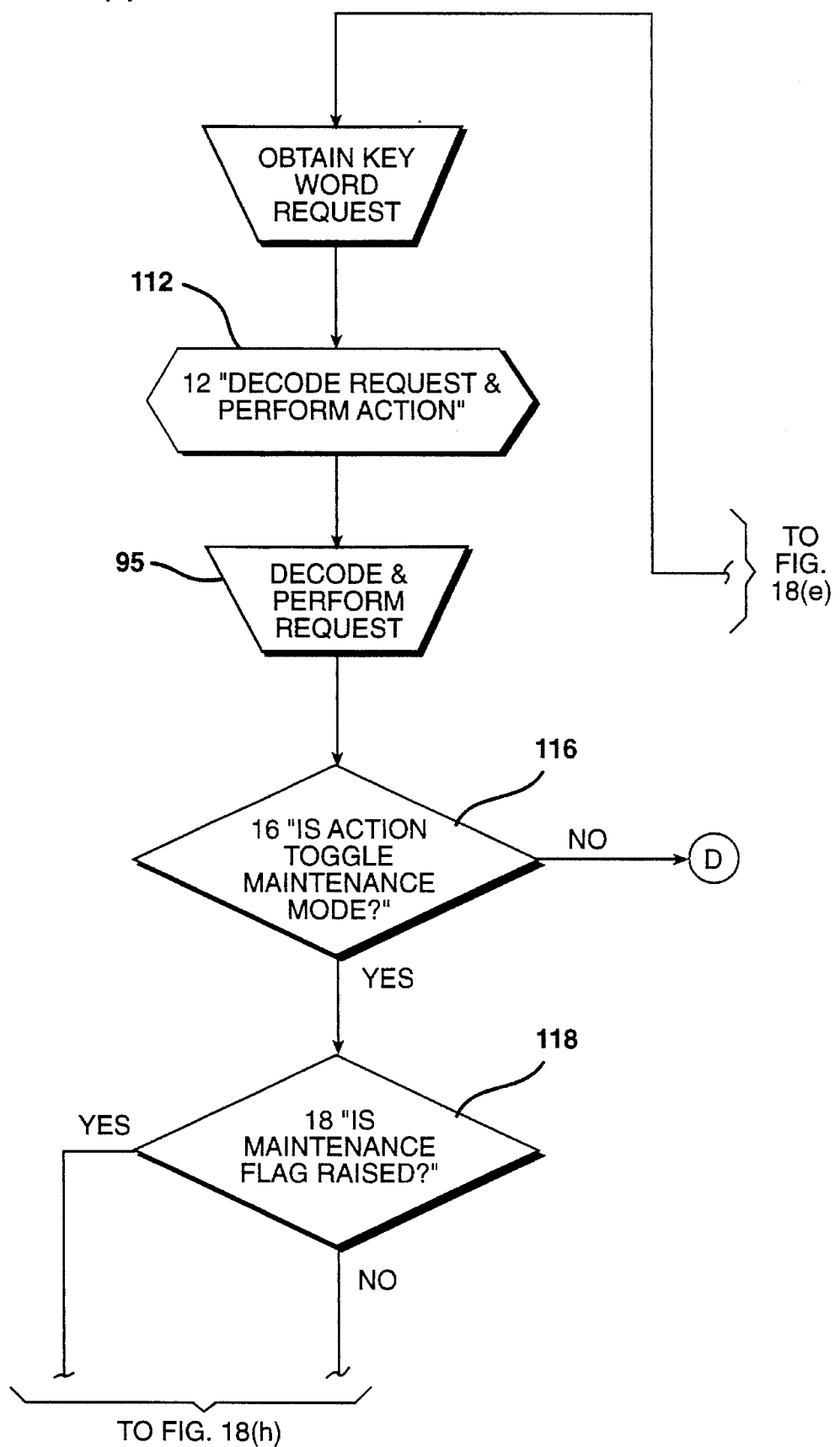
Figure 18G:
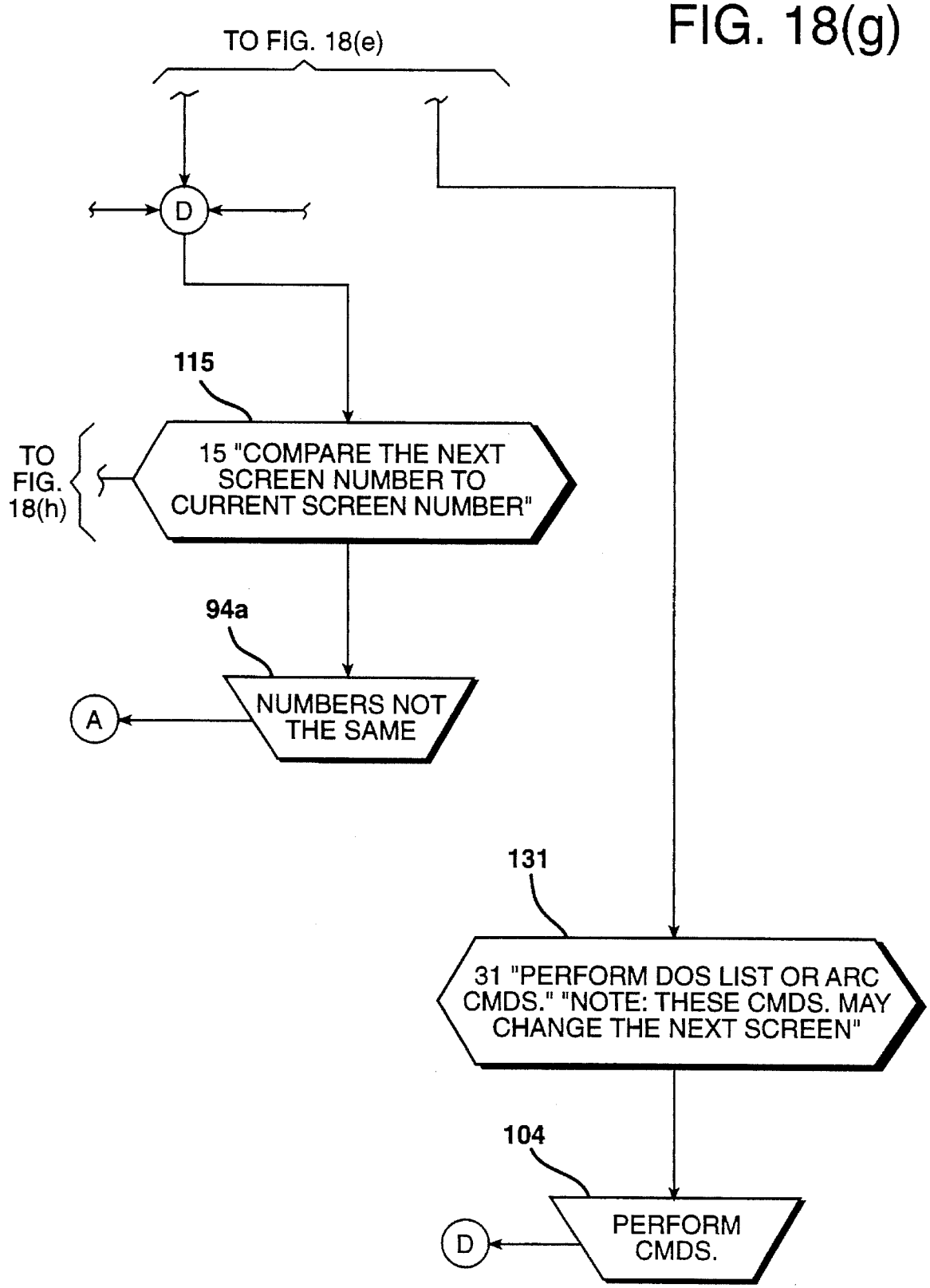
Figure 18H:
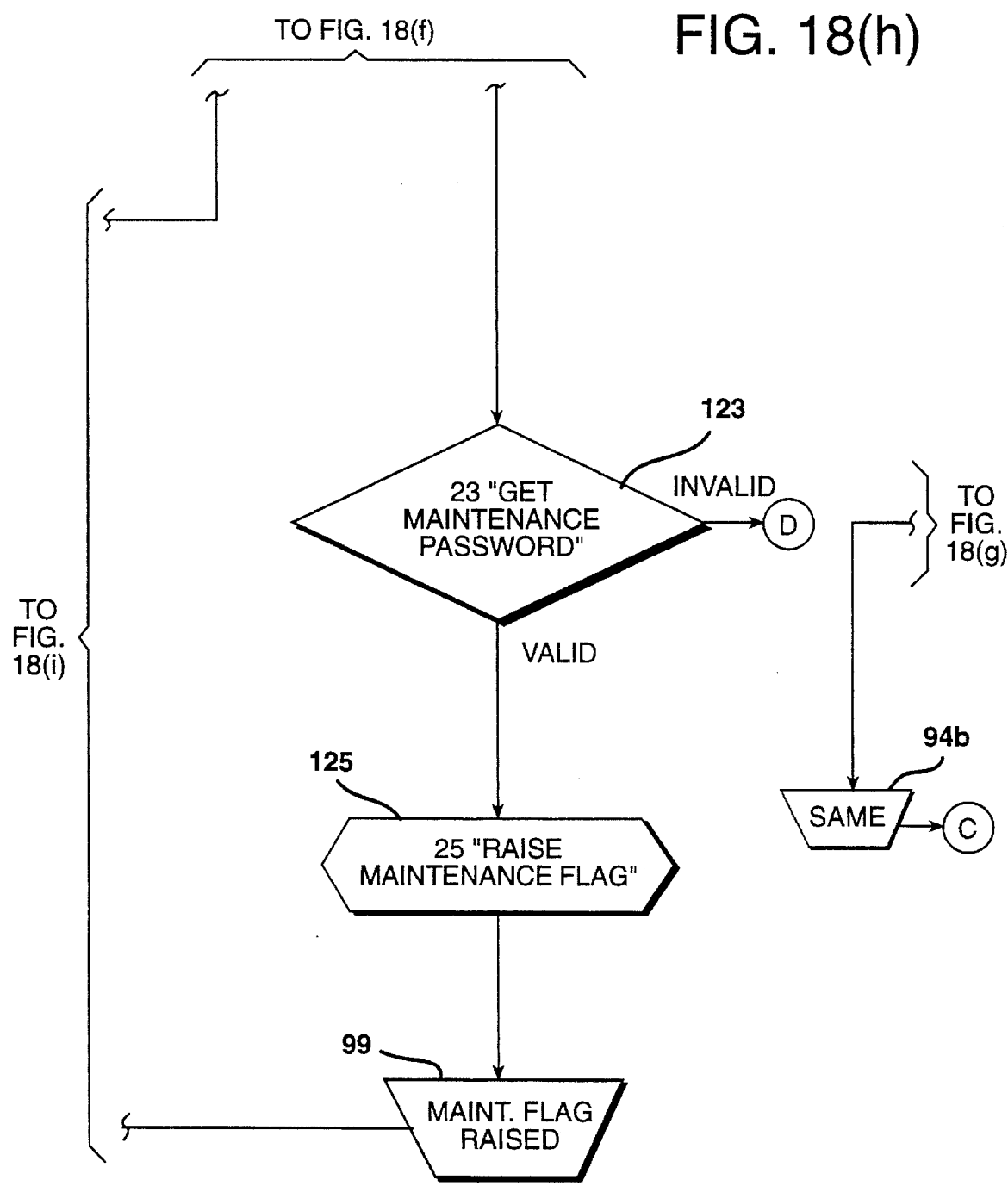
Figure 18I:
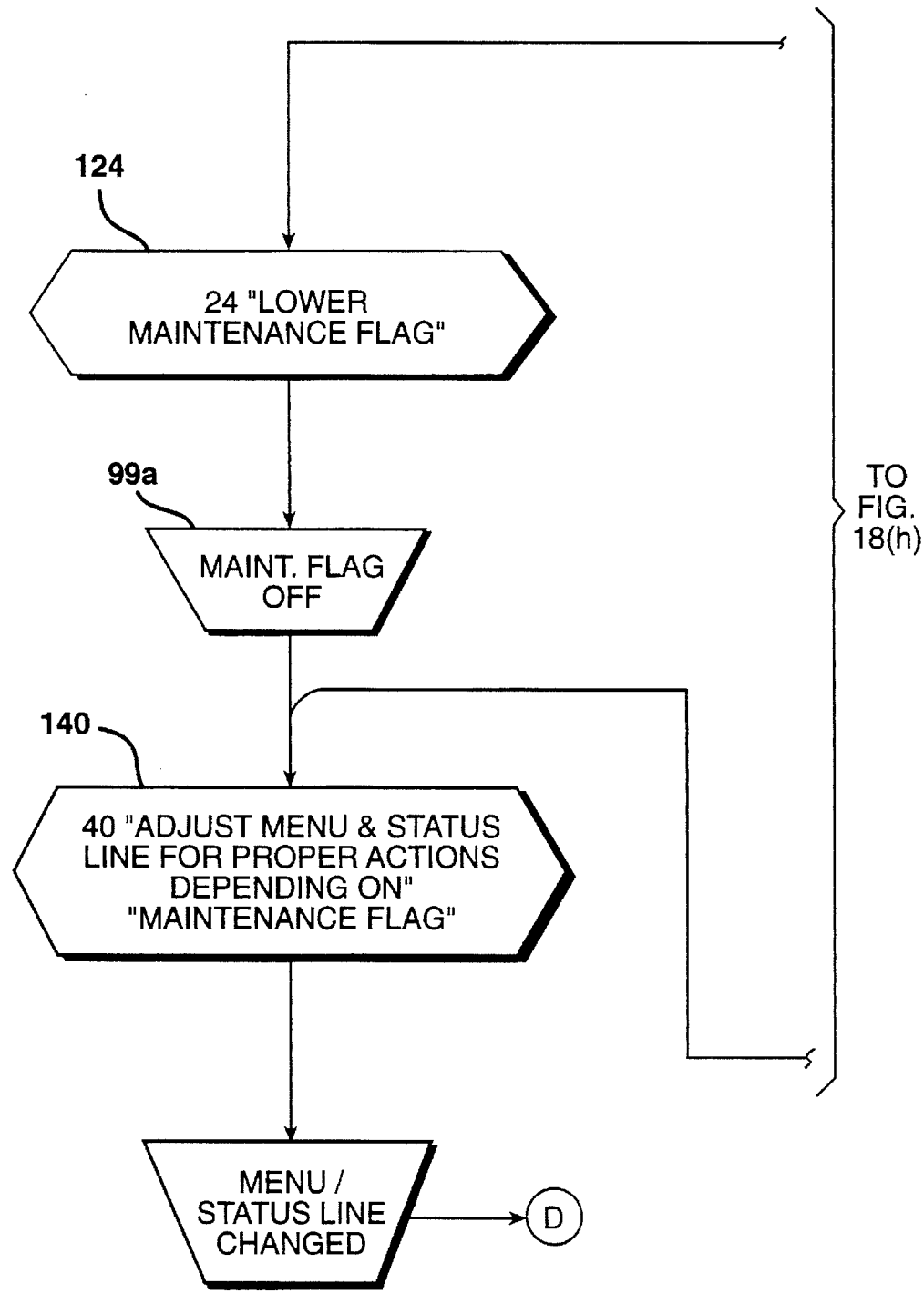
Figure 18J:
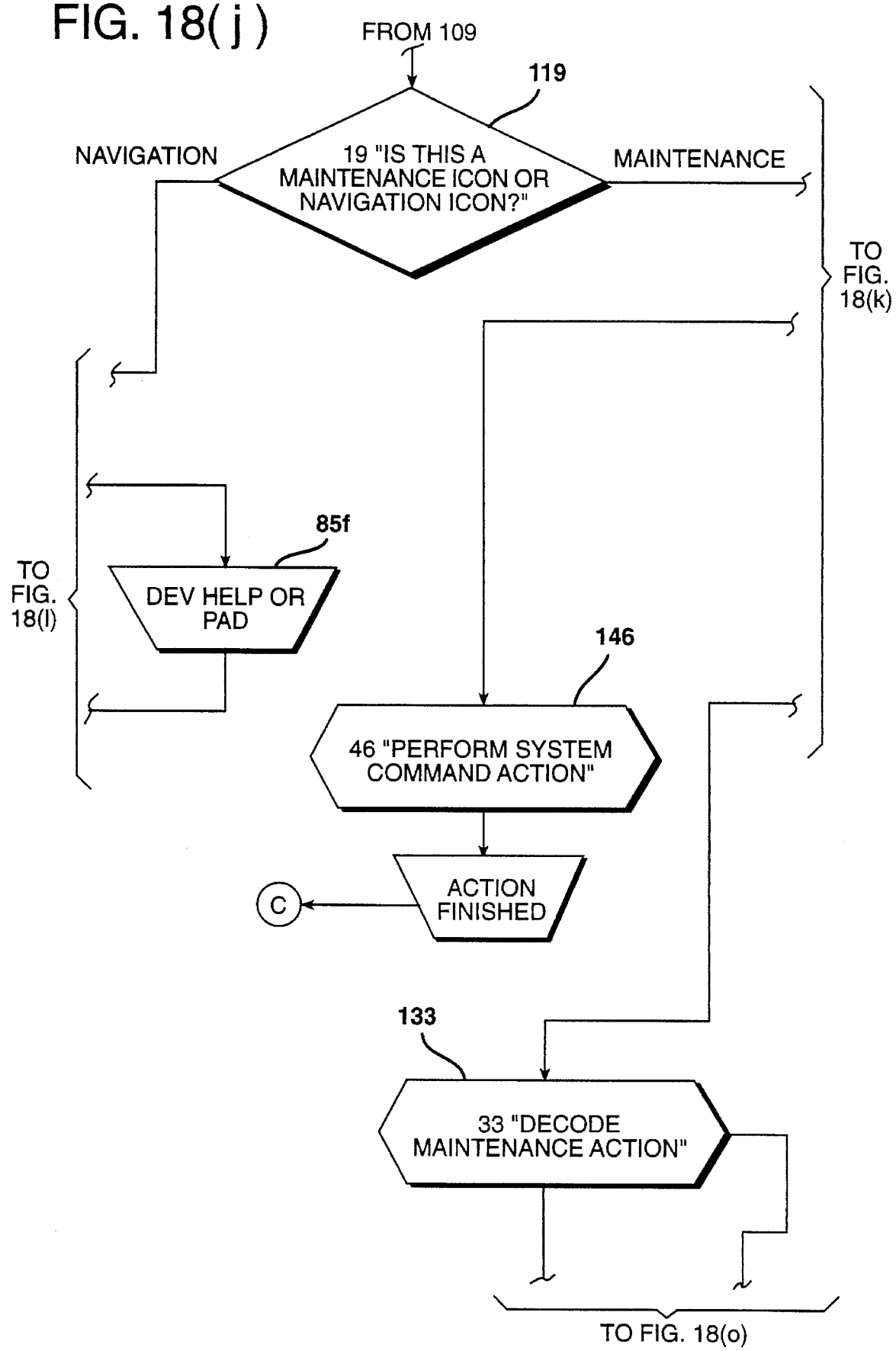
Figure 18K:
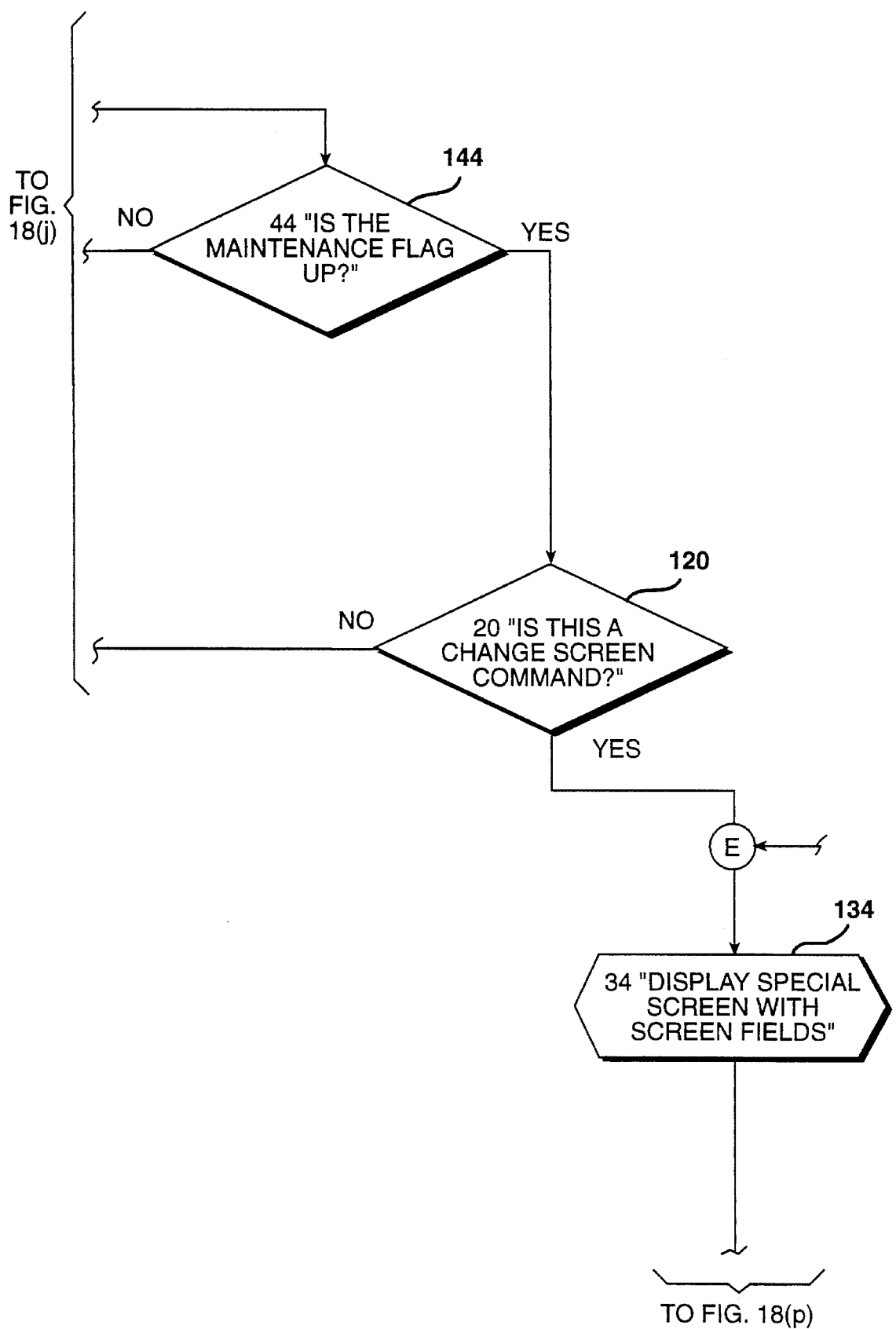
Figure 18I:
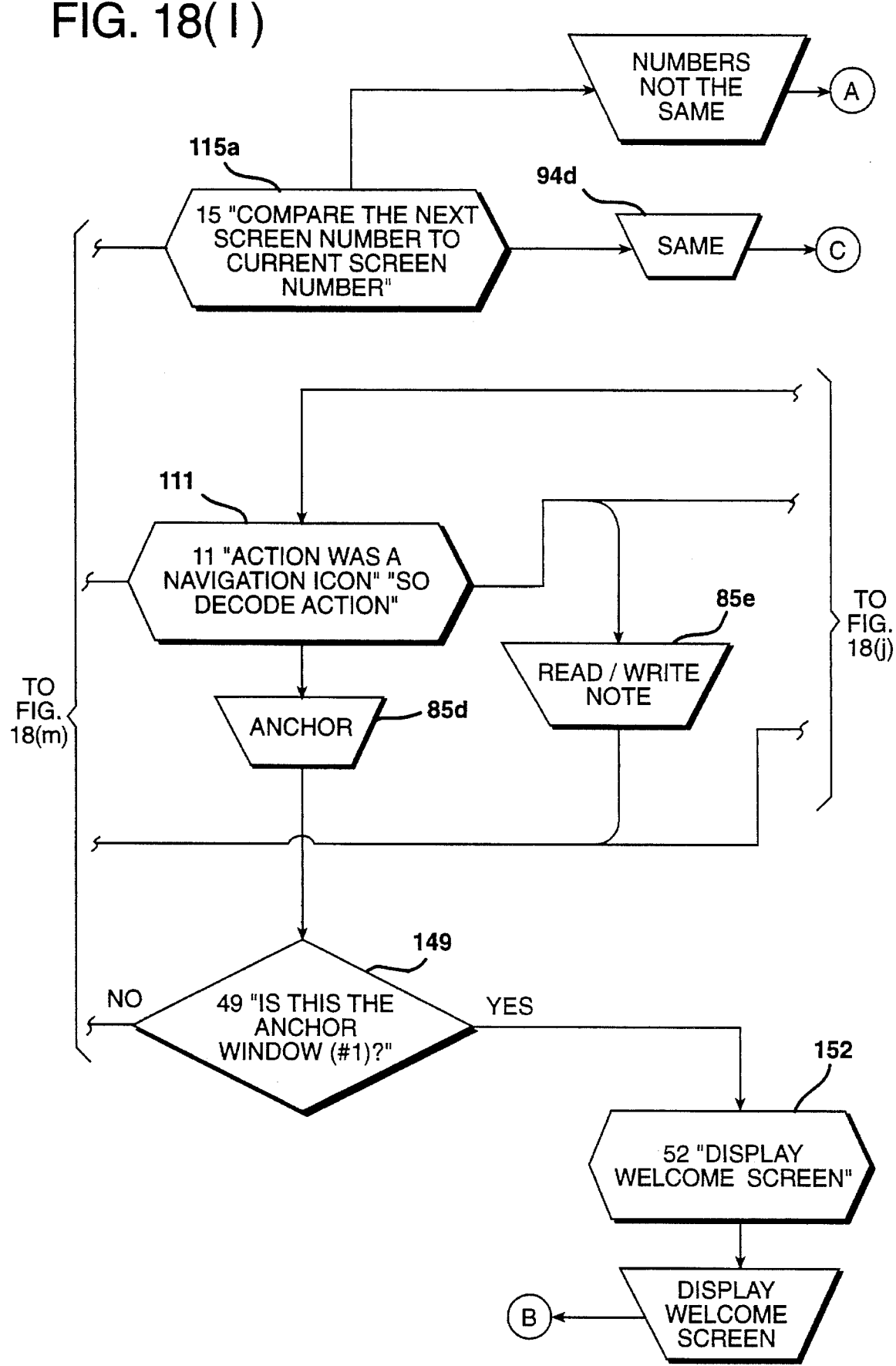
Figure 18M:
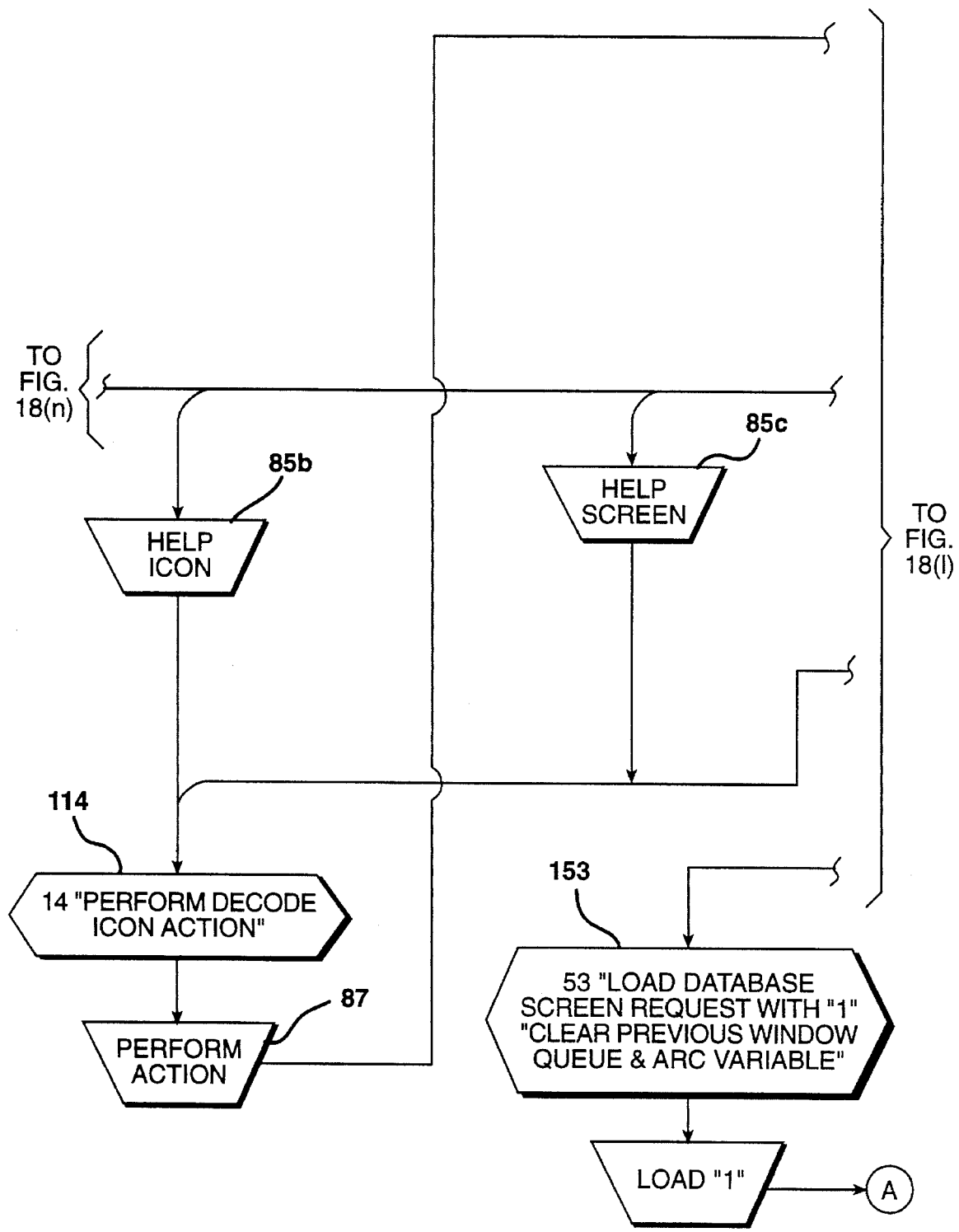
Figure 18N:
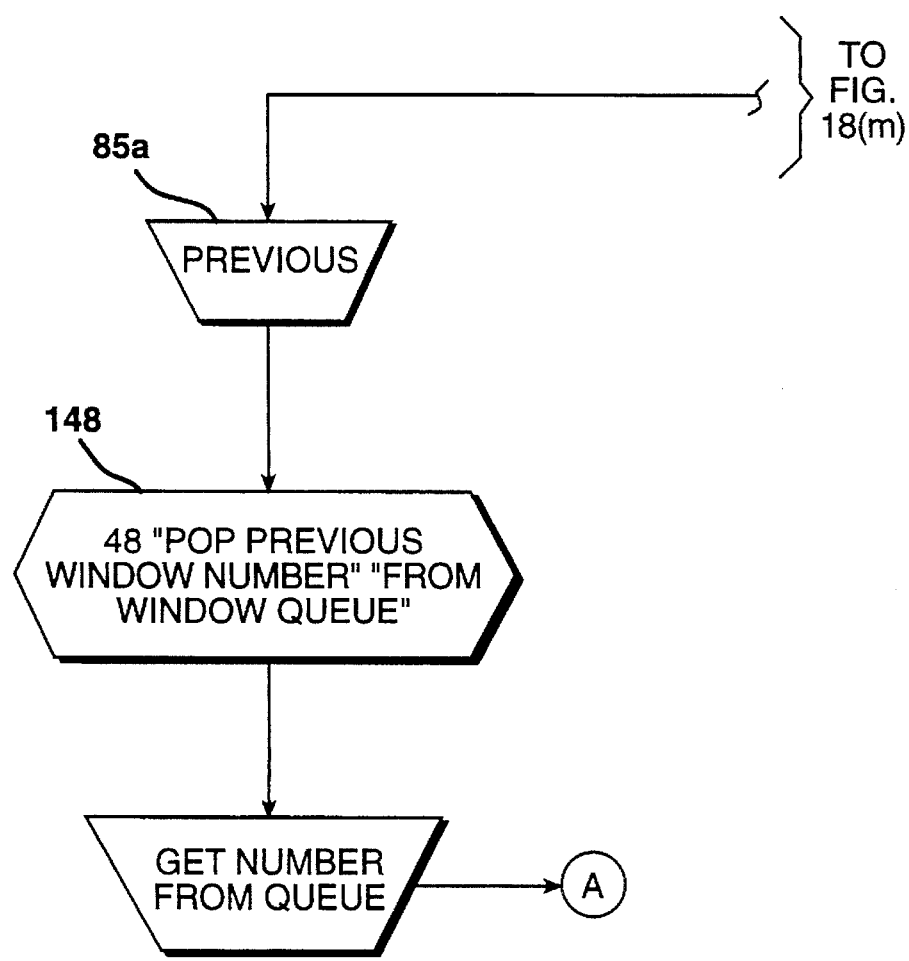
Figure 18P:
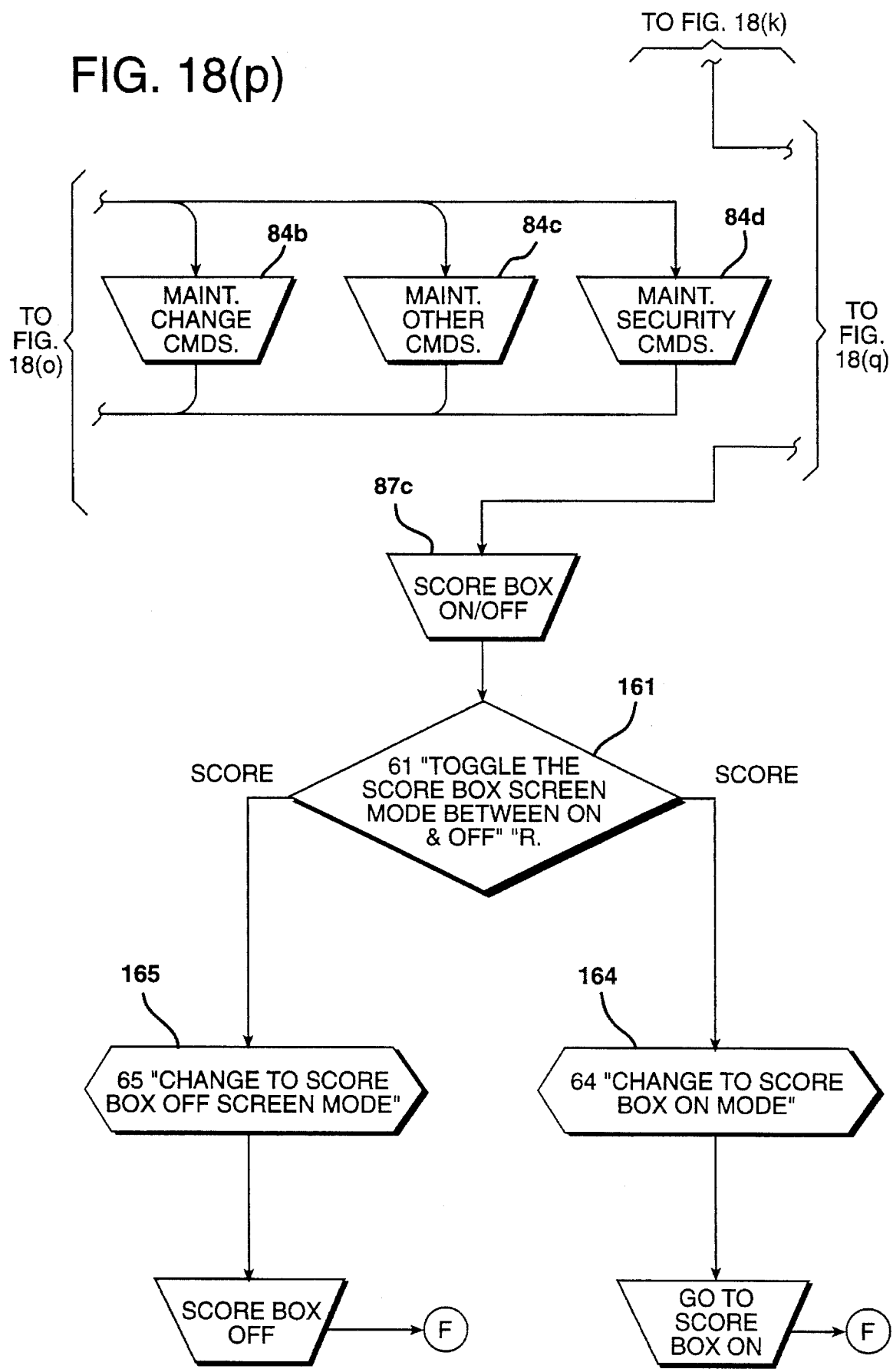
Figure 18Q:
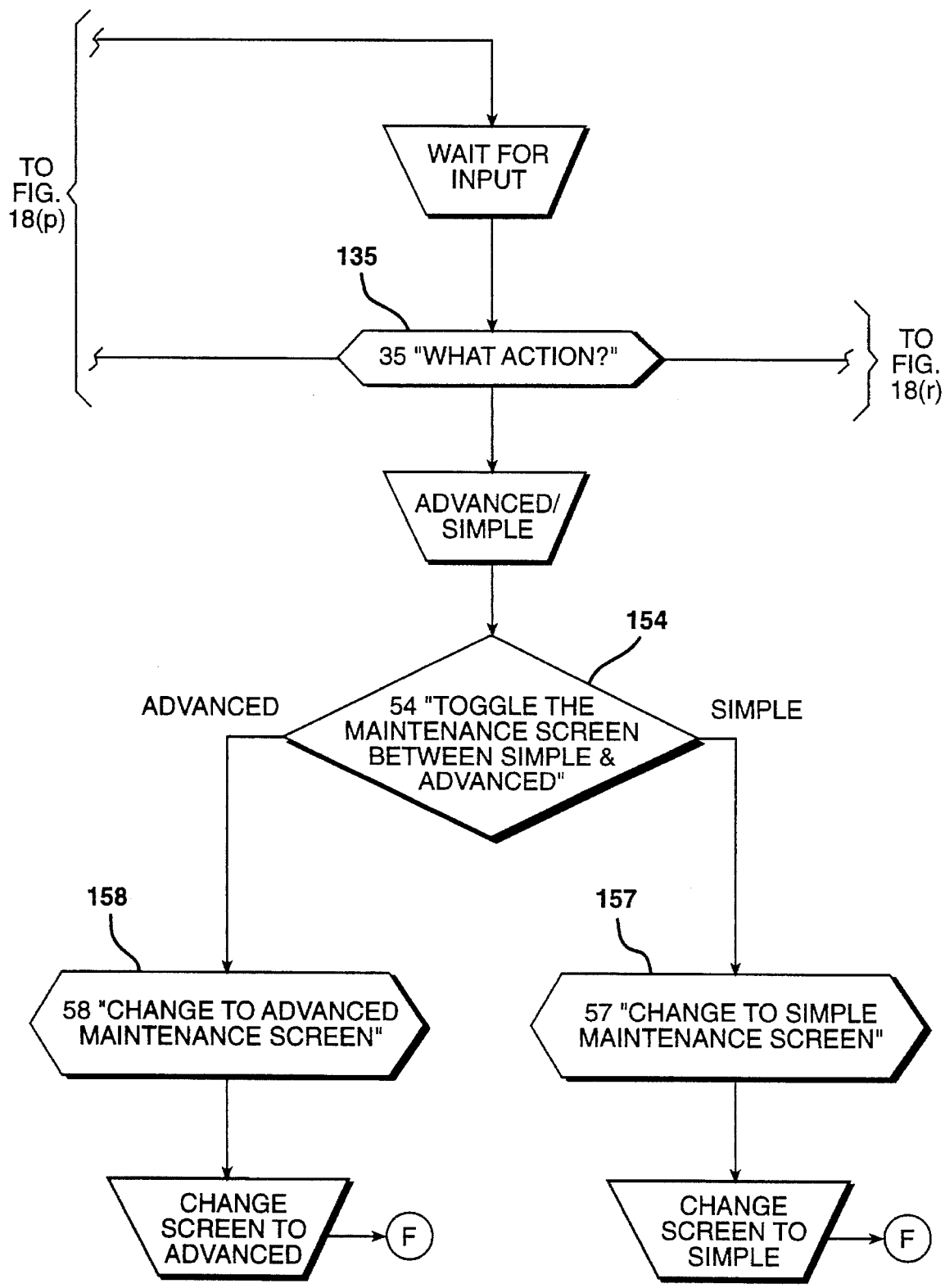
Figure 18R:
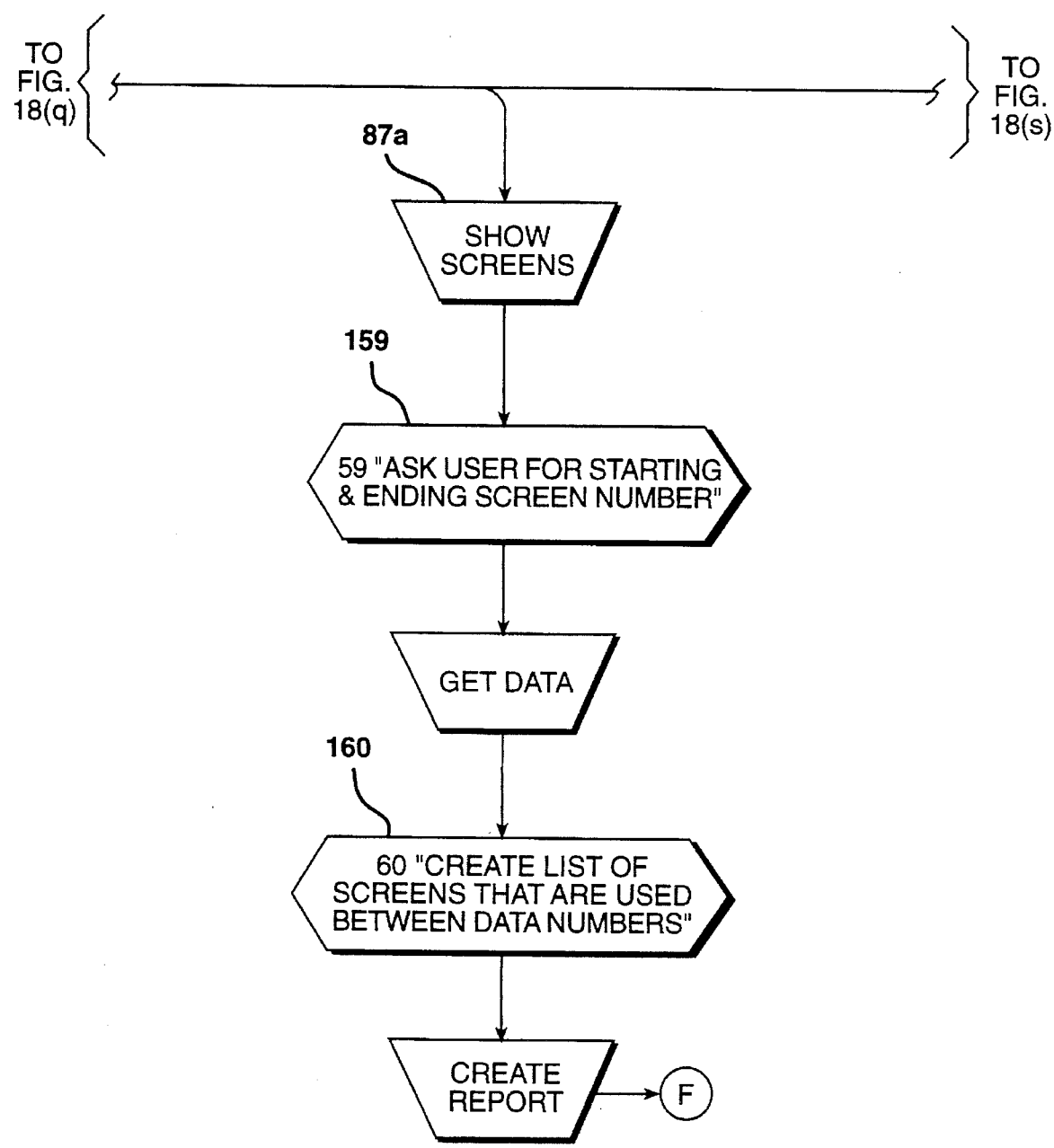
Figure 18S:
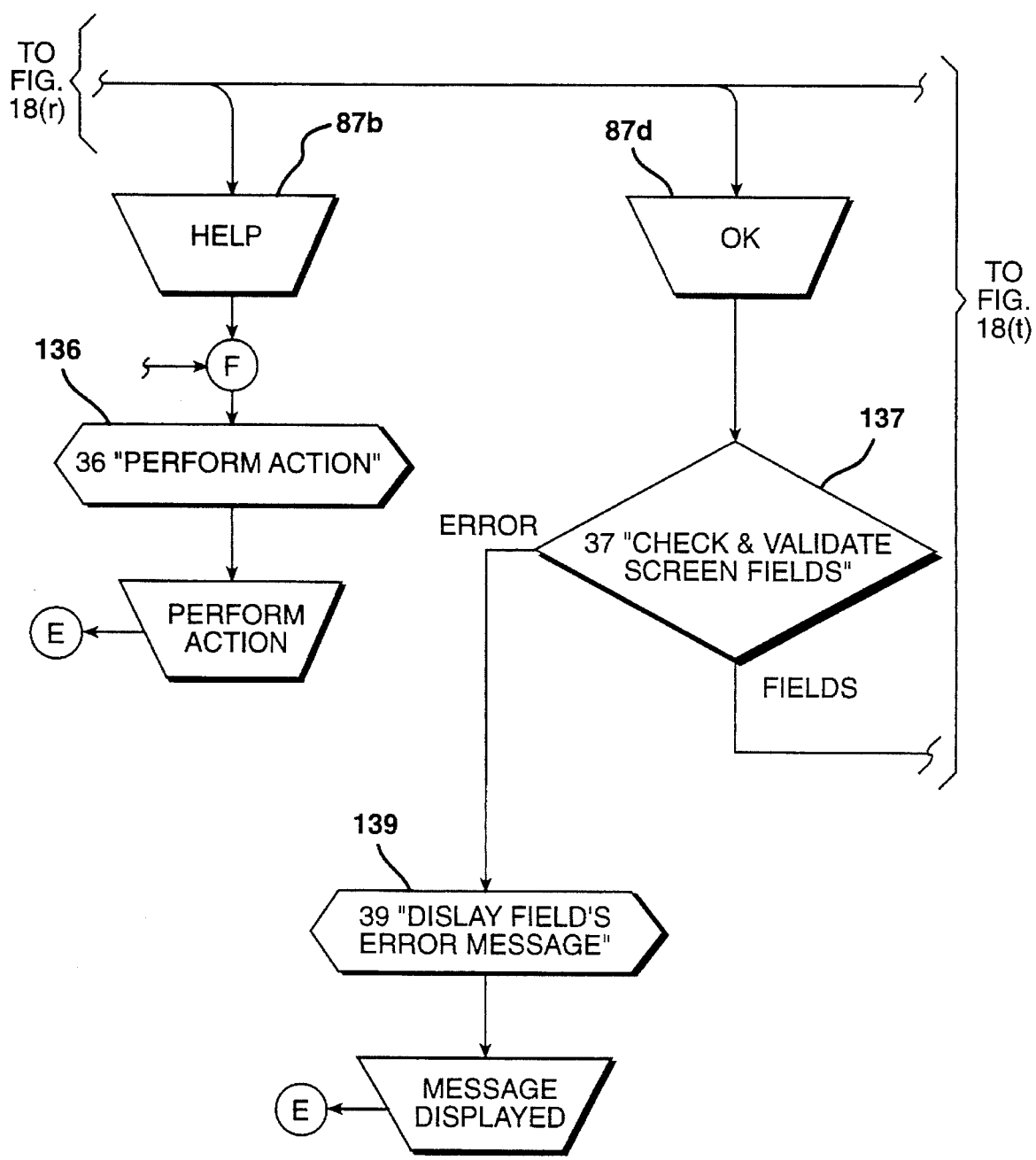
Figure 18T:
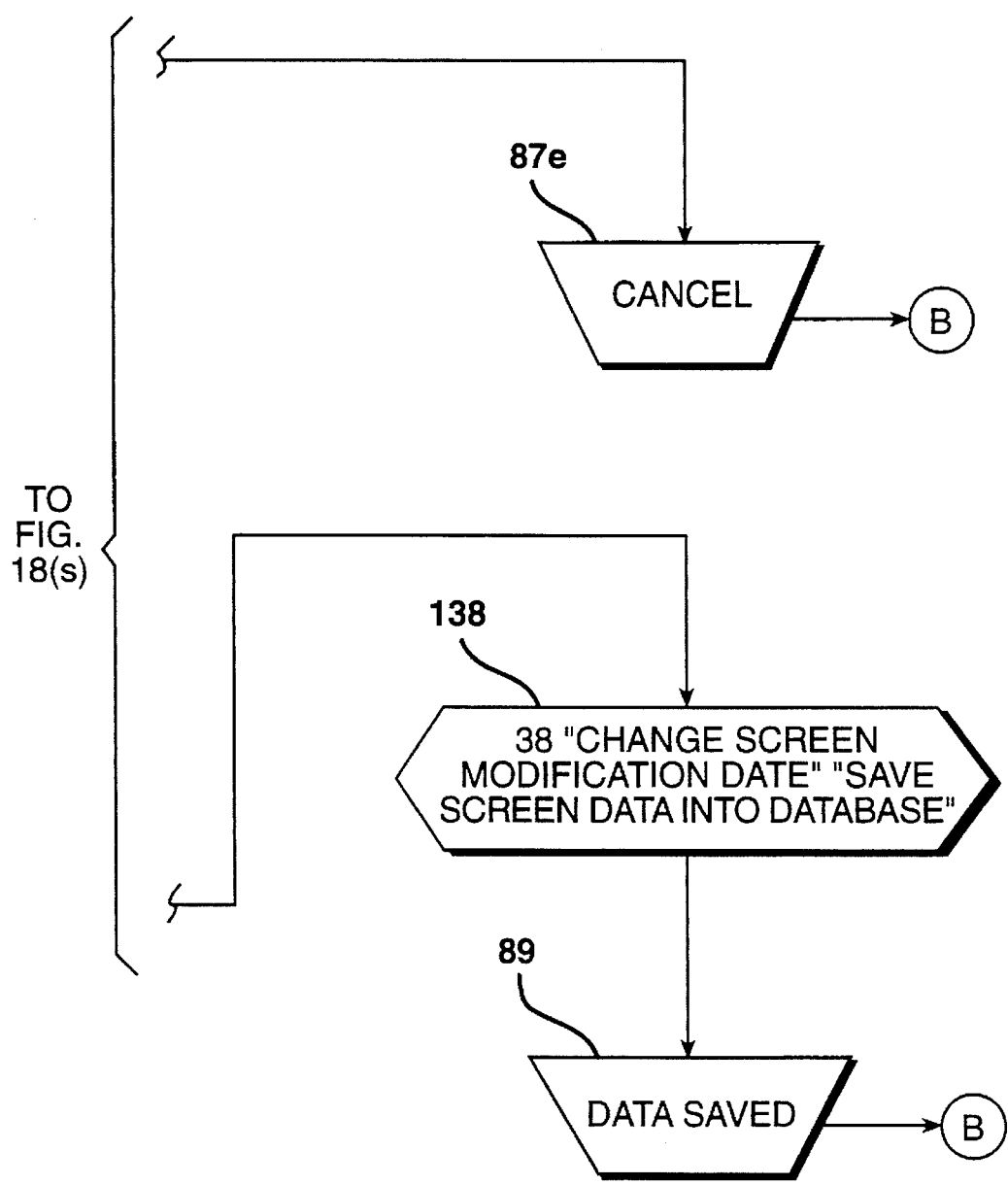
Figure 19A:
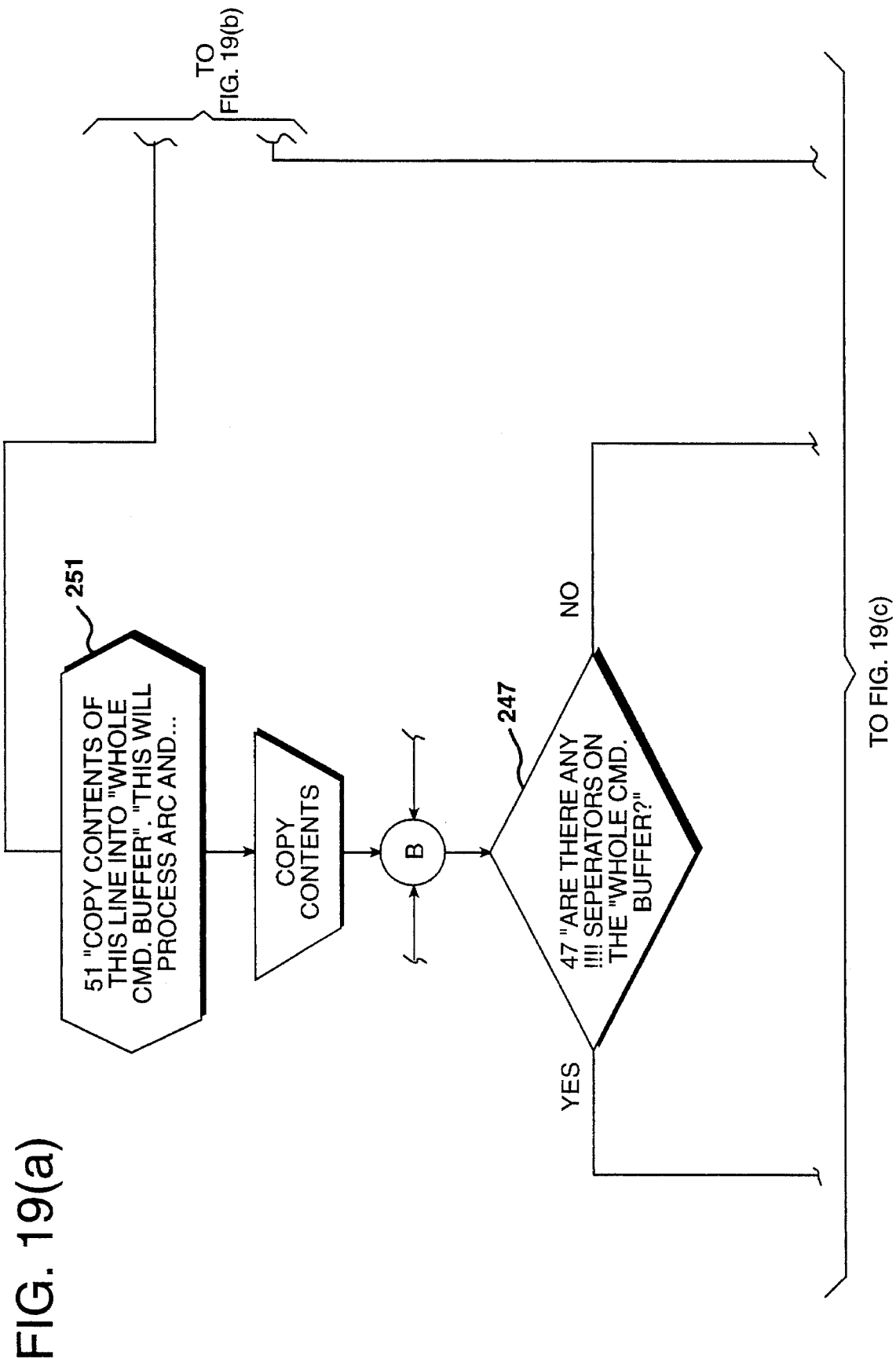
FIGS. 19(a)–(d) illustrate the modular components of a program flow chart, which illustrates in greater detail the program steps within step 130 illustrated in FIG. 18(e).
Figure 19B:
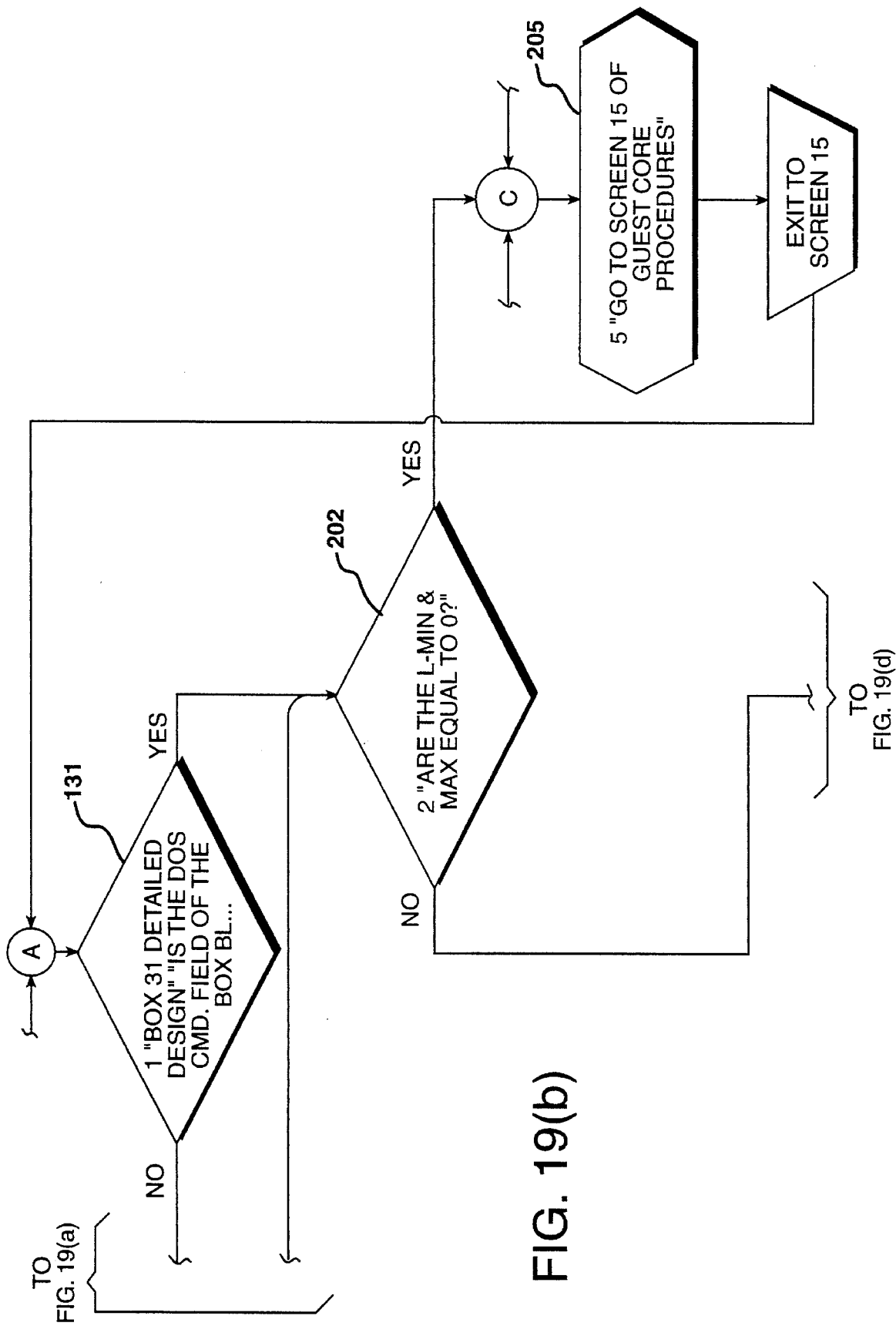
Figure 19D:
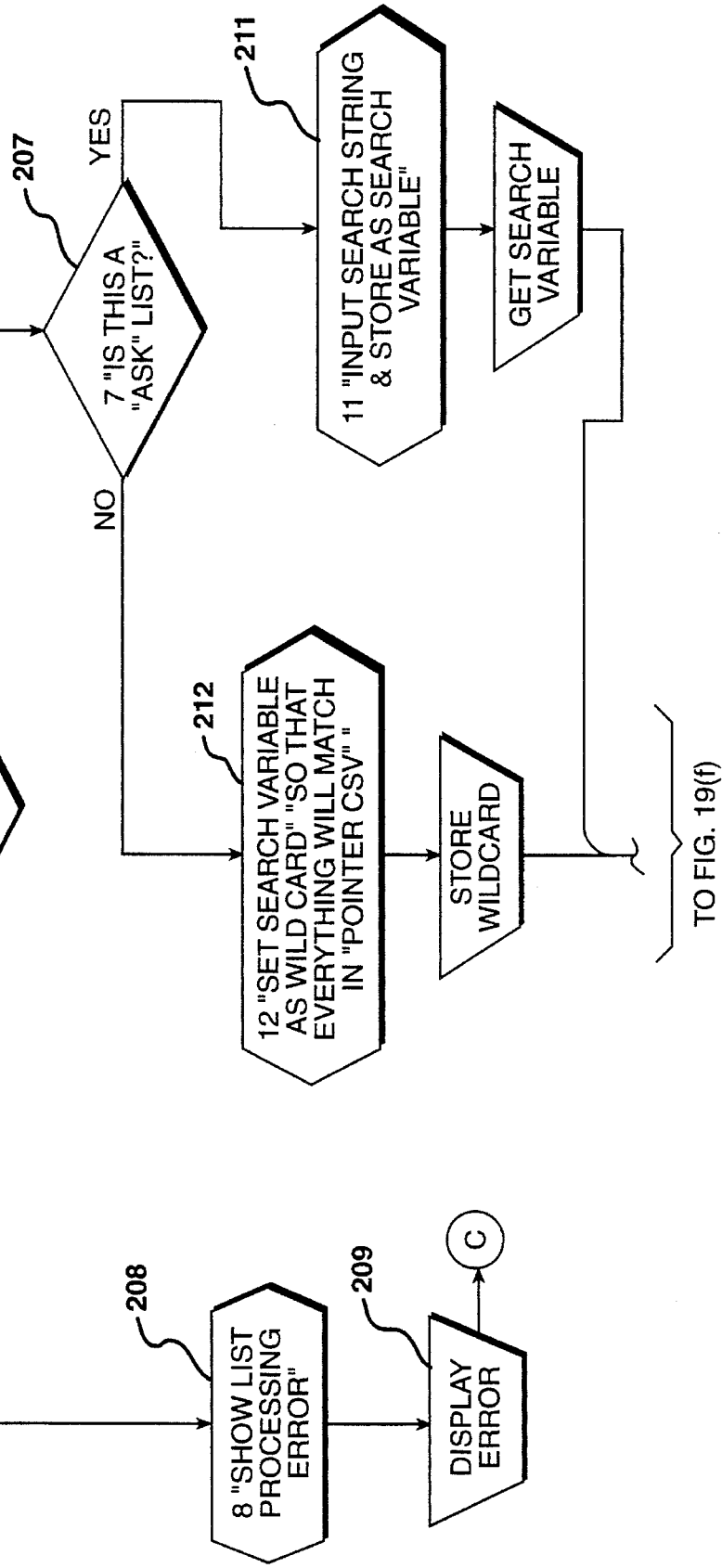
Figure 19E:
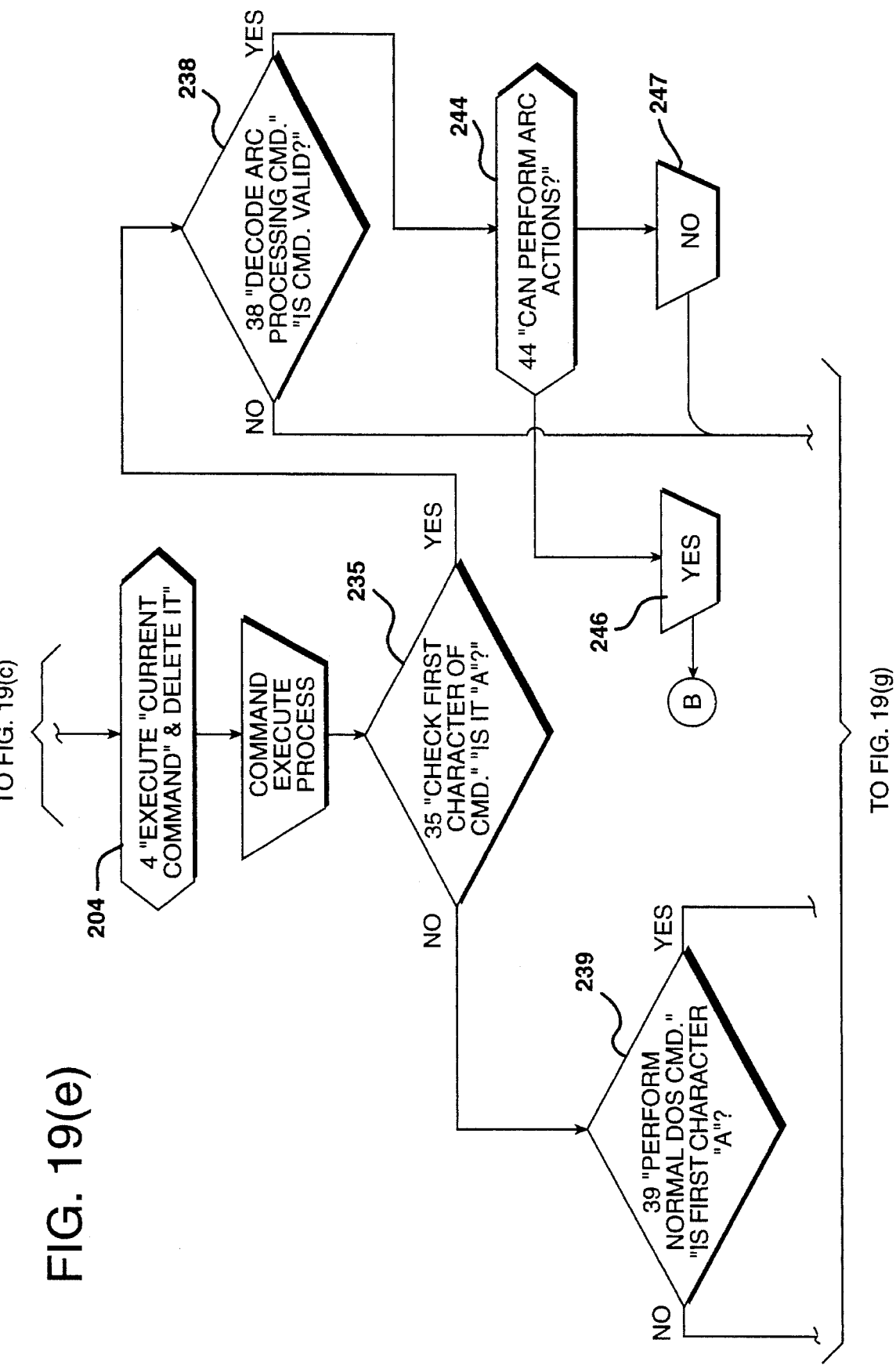
Figure 19H:
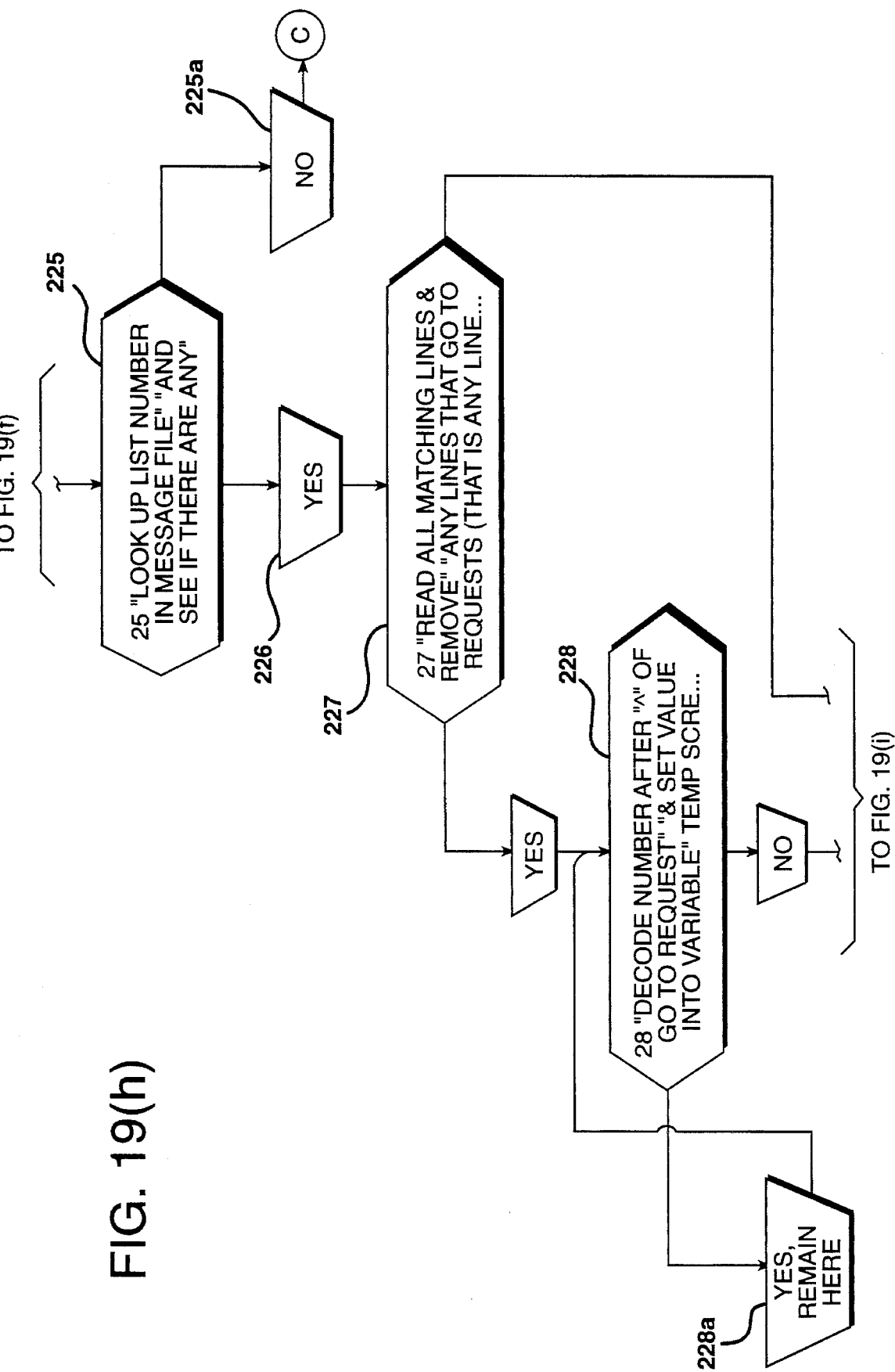

If the action involved a decision box, the data record, illustrated in FIG. 7, is checked to obtain the screen number of the next screen, as indicated at 142, (FIG. 18(d)). Before that record or screen number is handed off to the database manager for retrieval, a number of other interpretation steps are performed.

The guest program designates certain decision box labels as keywords or special labels, as for example, DATABASE MAINTENANCE or PASSWORD PROTECTED. Optionally, the developer of a GUEST application can also designate certain keywords for special handling by the command module. The software checks to see if the decision box has a keyword or special label as illustrated at 110 in FIG. 18(*d*). The label of the decision box 110 is checked against the keywords and the action is decoded at command box 112 in FIG. 18(*e*) and invoked at action step 95. If the requested action involves a maintenance step, the proposed action is passed to maintenance toggle 116. Maintenance toggle 116, relies on a maintenance flag which is checked at step 118. The depending steps 123–125 allow the developer to toggle maintenance on or off with a single click on a maintenance icon, with a password validation at step 123 each time maintenance is toggled on. The flag is raised at step 99 and dropped at step 99*a*.

When the password is valid, the maintenance flag is set, as indicated at 99, and the GUI display is updated to display the various maintenance options available, as indicated at step 140. In FIG. 18(*c*), if the maintenance flag was already set, the selection of the selected keyword will toggle maintenance off as indicated at 124, and the GUI is updated to remove the maintenance icons.

After the change to the maintenance icons has been made in the screen display, the program then returns to step 115 in FIG. 18(*e*) to compare the next screen number with the current screen number.

Alternately, if the step at 116 did not involve maintenance toggle, then the keyword "PASSWORD PROTECTION" is checked. If PASSWORD PROTECTION was deleted by step 95 the software requests a password from the user or developer. Once entered, the software performs a validity check. If VALID, the software proceeds to step 130. If INVALID, all processing stops and software returns to step 107, illustrated in FIG. 18(*b*). If neither "PASSWORD PROTECTION" or "DATABASE MAINTENANCE" was decoded, then the box had a plain label and program goes to step 130. If none of these commands (DOS, ARC or List) are detected, then the program uses the previously stored next screen from step 142 and returns to step 115 for processing to step 132.

The GUEST program contains several exit action options, available to the developer, above and beyond branch mode selection. As indicated at step 130 in FIG. 18(*e*) the decision box is checked to determine if it contains a DOS, ARC or List command. If any are present, they are invoked at step 131, and as further illustrated in FIGS. 19(*a*)–19(*d*). As will be hereinafter described in detail, FIGS. 19(*a*)–19(*d*) is a detailed flow chart of the program step at 131 in FIG. 18(*e*).

While FIG. 18(*e*) has illustrated the performance of the DOS, ARC or List command at 104 with a return to program node 115, it should be noted that many of the possible DOS, List or ARC commands will result in a completely new screen number as the command is executed. Alternately, the command could invoke the display of a text string from the list processor on the existing screen or could invite the user to enter an alphanumeric value via the keyboard which would then be used to invoke the next appropriate screen display, either by way of list or by calculated algorithm.

When the new screen number is determined, it is passed back to steps 115 and 94*a* for return to program step 132 for retrieval of the new record and display of the information contained therein as indicated at step 106. If the number of the next screen in the database record for that option is the same (as for example in toggling maintenance on or off) the program loop is returned to step 107 to await the next user input.

If the next screen number associated with the selected decision box is different, then the command module returns to step 132, to retrieve the new database record linked to the new screen number. After the database manager has retrieved the record, the GUI interface formats it for display on the screen as indicated at steps 105 and 106. These steps between 132 and 109 define the essential user operating loop, wherein, when a specific decision box is selected, and the database record (FIG. 7) contains a specific screen number for that decision box, the program retrieves the associated database record and creates the screen prepared by the developer for that selection.

Returning to step 109 in FIG. 18(*b*), if the user action does not involve a decision box, the program steps to step 119 to determine whether the user action invoked a maintenance icon or a navigation icon. If the icon is a navigation icon, the action is decoded and invoked at step 111, with the various user choices illustrated in FIG. 18(h). These choices are previous screen, 85*a*; help 85(*b*); display help screen 85(*c*); anchor screen 85(*d*); read/write note 85(*e*); display developer help or note pad 85(*f*). It should be noted that the help icon and read/write icon are both toggle icons, so that the step 114 of decoding the icon and the step 87 of preforming the action would necessarily involve the toggle sub-loop similar to the previously described following step 116 (in FIG. 18(*e*)) to toggle the maintenance mode on and off.

If the previous screen icon is selected, the command module will check the previous screen queue which stores the previously shown screen number from step 105 FIG. 18(*a*), and obtains the immediately previous screen from the queue, as indicated at 148. After the number is retrieved, the program loops back to step 132 to retrieve the associated database record, and to build the new screen display, as indicated at 105.

If the icon selection involves a new screen display, such as a help screen a developer help screen, a read/write note option, or a developer note pad option the command module checks to see if the screen number called for is the same as the existing screen, at step 115(*a*). If the next screen number is not the same, the action step is routed to step 132, where the appropriated database record is retrieved, formatted and displayed. If the screen number is the same, such as toggling help on and off, the command module loops back to step 107 to await further input from the user. As the help icon is toggled on, it is highlighted, or illuminated by the GUI, but the displayed screen remains the same until a topic is selected.

If the anchor screen is requested, the command module first checks at step 149 to see if the current screen data record is "1" in the anchor field (see FIG. 7). If it is, a "welcome" screen is displayed as indicated at step 152. If the current data record is not "1", then the program executes step 153 and clears the window queue temp file and any stored ARC variables, and loops back to step 132 to obtain the database record for the anchor screen, and format it for display as indicated at 106.

Returning to step 119, if the user action involves a maintenance icon, such as the menu selection items located at top and bottom of the Turbo® version screen illustrated in FIG. 4, (zones 42–45), or pull down maintenance items for the OS2® version illustrated in FIGS. 2 and 5, the program steps to 144, and determines if the maintenance flag is up. If not, the program accepts a system command, as indicated at 146, but does not switch into maintenance mode. If the maintenance flag is up, as for example in the developer mode, the program first looks to see if the proposed action involves a change of an existing screen, which step is indicated at step 120 in FIG. 18(*f*). If the command does not involve a change in the display screen, the program decodes the requested maintenance action from the GUI at step 133, and steps to the requested action, as set forth in steps 84(*a*)–84(*d*). If the command does require a change in screen display, a special screen, which may be similar to the screen displayed in FIG. 8 is displayed, which facilitates changing specific screen attributes or decision boxes. After receiving user input, as indicated at 135, the program determines at step 154 whether the developer desires the simple database screen, typlified by FIG. 9, or the advanced screen typlified by FIG. 10. If the simple screen is desired, the program displays the same at step 157. After receiving the desired change, the program performs the action, such as changing a text field or color of a decision box at step 136, and returns to 134 to await further input. At this point the change to the data record has not been made, only a change to the screen display.

If the developer desires the more advanced data screen, typlified by FIG. 10, the advanced developer screen is displayed as indicated at step 158.

If the requested action is more complex, such as adding a help record, adding or computing a score box, or making a change in the database record, adding or changing a DOS, ARC or List command, the action passes to action steps 87(*a*) through 87(*e*) as selected. If the requested action is to cancel maintenance, the user is returned to set 106, and the original screen is displayed. If the requested action involves a change to the database record, the requested change is first validated at step 137.

Figure 25:
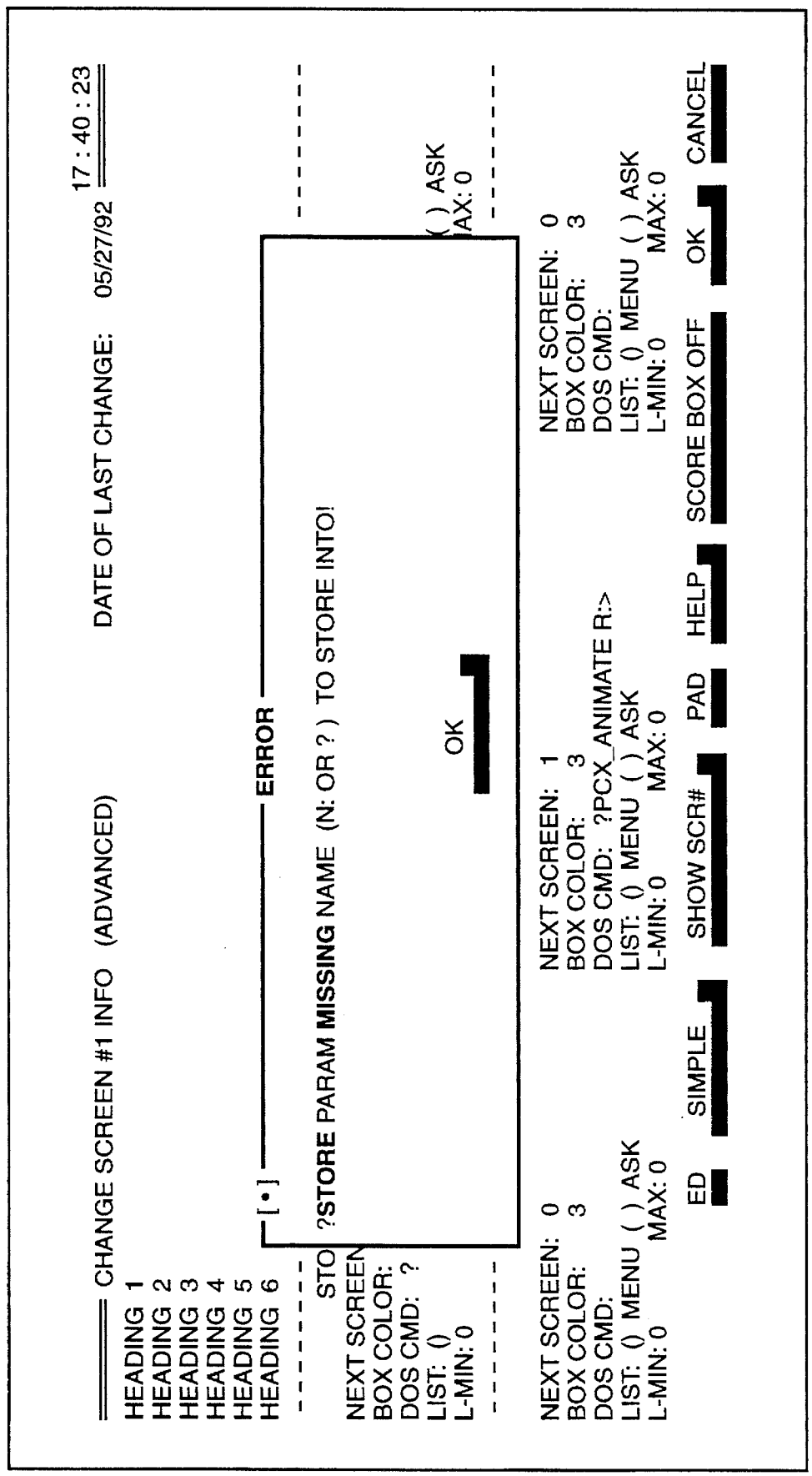
FIG. 25 is a representative example of an error screen that may be presented if an ARC processing command is incorrect or incomplete.

For example, if the developer has tried to enter an ARC processing command called "? STORE" incorrectly and then tries to update the database record by selecting "OK" in zone 74 of FIG. 9, an error message is displayed as indicated at step 139 illustrated in FIG. 25, and the developer is returned to step 134. If the requested change is valid, the screen data is saved into the database record as indicated at 138, the data is saved at 89 by the database manager and the system returns the user to step 106.

Alternatively a help screen can be created as was previously discussed with respect to FIGS. 6, 14 and 15. If the score box feature is to be enabled, as was discussed with respect to FIG. 16, that option is added as indicated at step 87(*c*). The score box is toggled off on through steps 161–165 as illustrated in FIG. 18(*a*).

Returning to step 120 in FIG. 18(*f*), if the requested user action involves a maintenance action to the screen the program goes to step 133 to determine the nature of the selected maintenance action.

It should be noted that some of the maintenance commands will inherently involve a screen change, but this change may not implemented immediately. The program first looks to see if the maintenance command is a system command 84(*a*), a maintenance command which involves a change to a database record 84(*b*), one of the remaining maintenance commands 84(*c*), or a change to a security feature 84*d*, such as adding or deleting a password.

The commands grouped as system commands generally include operating system commands, in addition to the GUEST commands for module 10, for example, with a version of GUEST running in DOS® 3.3 or higher, the system commands might include, among others, score card and bar graph implemented within GUEST, and calculate, date calendar, and DOS shell, implemented by the DOS® System, as illustrated in FIG. 4(*a*). The system command step 84(*a*) includes a sub-loop 143 which compares the requested screen number to the present screen number, which is implemented at step 115(*a*) and 94(*a*) and 94(*b*) as was previously described with respect to FIG. 18(*e*). For clarity of illustration, steps 115 and 94 are illustrated in both FIG. 18(*e*) and FIG. 18(*g*).

The maintenance change commands 84(*b*) for a version of GUEST running in DOS® might include: change current screen, copy and change screen, delete current screen, add/change/delete box help, add/change/delete screen help, add/change/delete developer help, delete this screen's notes, change box color globally, jump to screen number and quit maintenance mode, as illustrated in FIG. 4(*b*).

The maintenance other commands 84(*c*) include: print current screen to file, show used screens, show dead screens, show who calls screens, show changed screens (since) build knowledge map, build knowledge map (pruned), show ? stored variables, jump to screen # and quit maintenance mode, as illustrated in FIG. 4(*c*).

The security commands 84(*d*) are traditional commands to add or change passwords, including maintenance passwords, provisions for encrypting and decrypting data files, and for copy protection of the database. This option "locks" the database to the machine and prevents any copies of this database from running on another PC. A representative list of options for this selection is illustrated in FIG. 4(*d*).

The command decoded at step 133 is then executed at step 143, and if the execution of the command calls for a change in screen, i.e., jump to, from system command group 84(*a*), then the program passes the request to step 115(*a*), wherein the program compares the requested screen number with the existing screen number, as originally described with respect to step 115 in FIG. 18(*d*). If the command did not involve a change, such as a print screen to file command from 84(*c*) the program request is executed, and the program returns to step 107 to await further user instruction.

FIG. 19(*a*)–(*d*) is a program flow chart for the step 130 illustrated in FIG. 18(*d*) which illustrates the program methodology for implementing the functions set forth for step 130.

As indicated earlier, the program provides for several different exit actions for each decision box, wherein each action may invoke one or more of a plurality of functional program objects. The developer may route the user to the next screen or record in response to a selection by the user, as was previously described with respect to step 115, or the developer may invoke List, ARC or DOS processing steps as separate but integrated program objects.

To invoke these steps, the developer fills in the appropriate List, L-Min-L-Max and DOS-CMD lines for the appropriate decision box as was previously discussed with respect to FIGS. 9 and 10. At step 130, the program first checks to see if the DOS-CMD line for the selected decision box is blank. If there is data in this line, the program looks for command syntax at step 251, and copies it into a "whole command buffer" for sequential evaluation. The GUEST command module provides for plural mixed DOS and ARC processing by separating each command with ! ! ! ! and it handles each command sequentially. If there are no ! ! ! ! separators, the command is passed to step 155 where it is removed from the buffer and placed into the "current command" queue. The command is then executed as indicated at step 204, and deleted from the current command queue. If there are ! ! ! ! separators, each is passed sequentially at step 249, and executed sequentially at step 204. After the last command has been executed and the "whole command buffer" is empty, the command module loops to step 202 for further List processing, if any. As the program executes each command, it separates DOS commands from ARC commands by looking for the ARC ? prefix at step 235. If there is no "?" then the command is executed as indicated at step 239. The DOS commands are typical DOS commands, available in DOS®, which are executed at step 241. If the first character is a "A", then the system shells out under DOS operating system as indicated at 240, the GUI shrinks the GUEST screen as indicated at 243, and the DOS operating system executes the remainder of the command as indicated at 242.

If the DOS-CMD field begins with a "?" then the system utilizes the ARC processing syntax, which is based on the A1 theory of ARC variables, in which the internal command module 10 performs an action that may include a variable or static value embedded within the command. For example, the developer may request that the user enter the serial number of the machine being serviced. The ARC command ?STORE will then store the variable (the serial Number) for use in other ARC or database manager commands.

The ARC commands that are available in the preferred embodiment of the current version of GUEST, include:

| | |
|---|---|
| ?123 | Access Lotus 1-2-3 ® data. |
| ?ARC_BATCH | Run an file containing ARC/DOS commands. |
| ?B | Simulate pushing a button automatically. |
| ?CLEAR | Delete (erase) an ARC variable from memory. |
| ?CONCAT | Concatenate ARC Variables, strings, numbers together. |
| ?DATE | Remember/QueryFor/Convert date values. |
| ?EXIT | Simulate pushing ALT-X to leave GUEST. |
| ?EQUAL | Compare Arc Variables and/or values. |
| ?FILE | Perform various functions on ASCII (flat) files. |
| ?QUEST | Run (chain to) a SEPARATE GUEST expert system. |
| ?LIST_PROC | LIST PROCESSING files, with ability to STORE the choice. |
| ?MATH | Simple math functions (also on dates). |
| ?ON_GOTO | Jump to a 'pseudo' dynamic guest screen depending on value. |
| ?PCX_ANIMATE | Run the internal PCX graphic animator. |
| ?PCX_VIEW | Bring up the internal PCX graphical viewer. |
| ?QUOTE | Insert a pair of "" around a variable (for ?FILE W: N:) |
| ?REM | Comment/REMARK out part/all of a DOS/ARC command line. |
| ?SCREEN | Hide or force a refresh of the MAIN screen. |
| ?SEARCH | Search an ACSII file, and display+Store matching LINES. |
| ?SEARCH_S | Search an ACSII file, and display matching SECTIONS. |
| ?SHOW | Display ?STORED variables/or a message in a POP-UP window. |
| ?STORE | Remember/Assign/QueryFor values (int,real,str,filename). |
| ?STR_FORM | Perform various insert, change case, trim, on strings. |
| ?STR_SPLIT | Perform various splitting/parsing functions on strings. |
| ?VIEW | Bring up the internal TURBO-GUEST file viewer. |

Returning to the flow chart illustration of FIG. 9(a), step 238 determines if the ARC processing command syntax is valid, and if there is an error, the type of error is displayed at step 245 and the command module awaits further input from the user at step 221 and step 107.

If the ARC command can be performed, it is performed at step 244 and returned to step 247 for execution of the next ARC command if any. If there are no additional commands, the program steps to the List processing module as indicated at step 202. If should be noted that sequentially looping back to step 204 at each ! ! ! ! enables the command module to perform mixed ARC and DOS commands, and to insert ARC variables into a DOS command string.

If for some reason the module is not able to process the ARC command, as indicated at 247, it steps to the ARC processing error sub-routine indicated at step 245, and the error screen is displayed. It should be noted that the DOS-CMD line allows for only 80 characters of input. If more are needed, then the developer can use the ?ARC-BATCH (file name) command. This allows the developer to type all of DOS and/or ARC commands in a file which is then submitted for processing. Note that a new line in the file serves as a ! ! ! ! separator. When first entered as a DOS-CMD entry, the program will review the entire file using a system similar to the 238 loop in FIGS. 19(a) and 19(d) without executing the command, but only checking for correctness.

Returning to step 131, if the DOS-CMD line for the selected decision box is empty, the program then checks the L-Min and L-Max valves associated with the selected box. If the fields are blank, the program steps to 205 and loops to step 115, previously described with respect to FIG. 18(c).

If the L-Min and L-Max entries contain data, the program first checks to make sure the L-Min and L-Max values are valid at step 206. If the values are not valid, a list processing error sub-routine is invoked at step 208, and the error is displayed at step 209.

If the L-Min and L-Max values are valid, the program then checks to see whether this decision box is a menu box or an ask box as indicated at step 207.

If the decision box is an ask box, a question is displayed on the screen, which asks the user to input a user variable. This variable is the input as a search string and stored as a search variable as indicated at step 211, and the program steps to search step 213.

Alternatively, if the decision box is a menu box a menu of selections will be displayed for the user. This menu is obtained by searching the ASCII flat file for all items between the L-Min and L-Max numbers as indicated at step 212. The L-Min and L-Max numbers are pointers maintained in a pointer file, which are linked to a message file.

The developer can provide for a plurality of menu items to choose from, and different exit actions for each choice through the use of list processing. At step 212, the program module sets the search variable as a wild card, so that all pointers between L-Min and L-Max will be displayed. The List processing module then searches the pointer file as indicated at step 213(a). If there are no matches, a list processing error sub-routine 220 is invoked, the error displayed and the program loops to step 107 via step 221 to await further user input.

If a match is found at step 215, the program then displays all pointer file text lines associated with the retrieval pointer value. These text lines may be used to form a menu for the user to select from, as indicated at step 214 and 217.

The program module then waits for user input, as indicated at 218. If the user cancels the request at step 218, the program removes the menu sub-display, and loops back to step 107 via step 221 as previously described.

If the user selects one of the menu items, as for example a double mouse click, or by moving a highlighting bar with the cursor control keys and entering a carriage return, the program will then retrieve a message file that is linked to the selected pointer as indicated at step 225. If there is no message associated with the pointer, the program will then retrieve the "next screen" number associated with the selected decision box, and retrieve the same as indicated at 225(*a*) and step 205, which loops to step 115 previously described with respect to FIG. 18(*e*).

If there is a message associated with the pointer, as noted at step 226, the entire message is reviewed and any "go to" requests are removed and processed first, as indicated at step 227.

The number after the "Λ" of the go to request is then removed and stored as a temporary screen number as indicated at step 228, and 228(*a*). After the next screen number has set as a temp variable or if there were no go to commands, the program step to step 229, where the command module looks to see if there are any lines left to display. If there is additional data, the message is displayed at step 232, and the program awaits any further input, as indicated at 232(*a*). If the user selects "OK" in response to the message, at step 234 the program goes to step 233 where it temporarily replaces the "next screen" number associated with that decision box, with the stored temp screen number, and the screens are changed at step 233(*a*) by looping to step 115 as indicated at 205.

If the user does not select "OK", but requests to review the menu again, the program loop from step 234 back to step 214 to display the menu items. In this manner, a short explanation of the effect of making a particular selection can be added for the user, before the new routine is invoked. This enables the user to return to the menu for a second look, if the first choice was inappropriate.

It should be noted that the foregoing list processing concept is also implemented as an ARC command known as ?LIST-PROC. This command can perform the same actions as previously described not only to printer and message files but to any set of specially prepared flat data files. There are several benefits to using ?List-PROC over the standard list process such as access to any specially prepared flat data file sets, various display options and ability to access this data to create ARC variables.

Further, it should be noted that List processing can also invoke other system commands or ARC commands by placing them in the message file. In this manner, when the new screen is retrieved at 233 and 233(*a*) the ARC variable, such as ? B3 will be parsed out to have the same affect as pushing button 3 at the next retrieved screen.

While the present invention is primarily directed to a simple "developer-friendly" program that will enable a non-computer literate expert to develop an expert system without any prior knowledge of computer syntax or commands, the ARC, LIST and DOS command capabilities give the more experienced developer a set of powerful tools that may be used to implement relatively complex procedures without extensive code writing and debugging. Further, in the hands of a skilled expert developer, a relatively deep and complex expert system can be made quite compact, enabling it to be used on laptops, and immediately portable across a wide variety of platforms and operating systems.

User Mode Example

Figure 20:
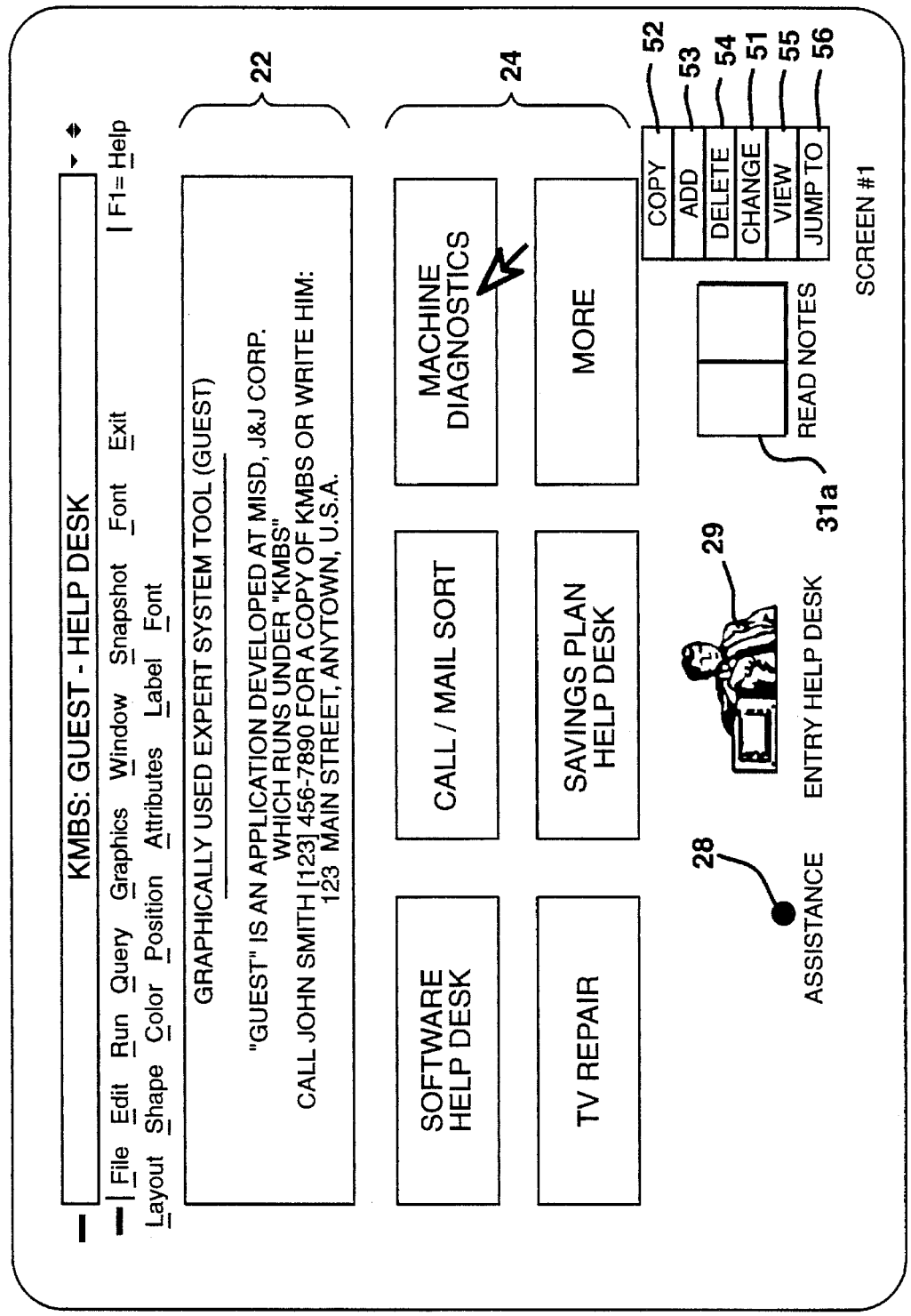
FIG. 20 is a representative example of an anchor screen for a typical expert system for the developer mode.
Figure 21:
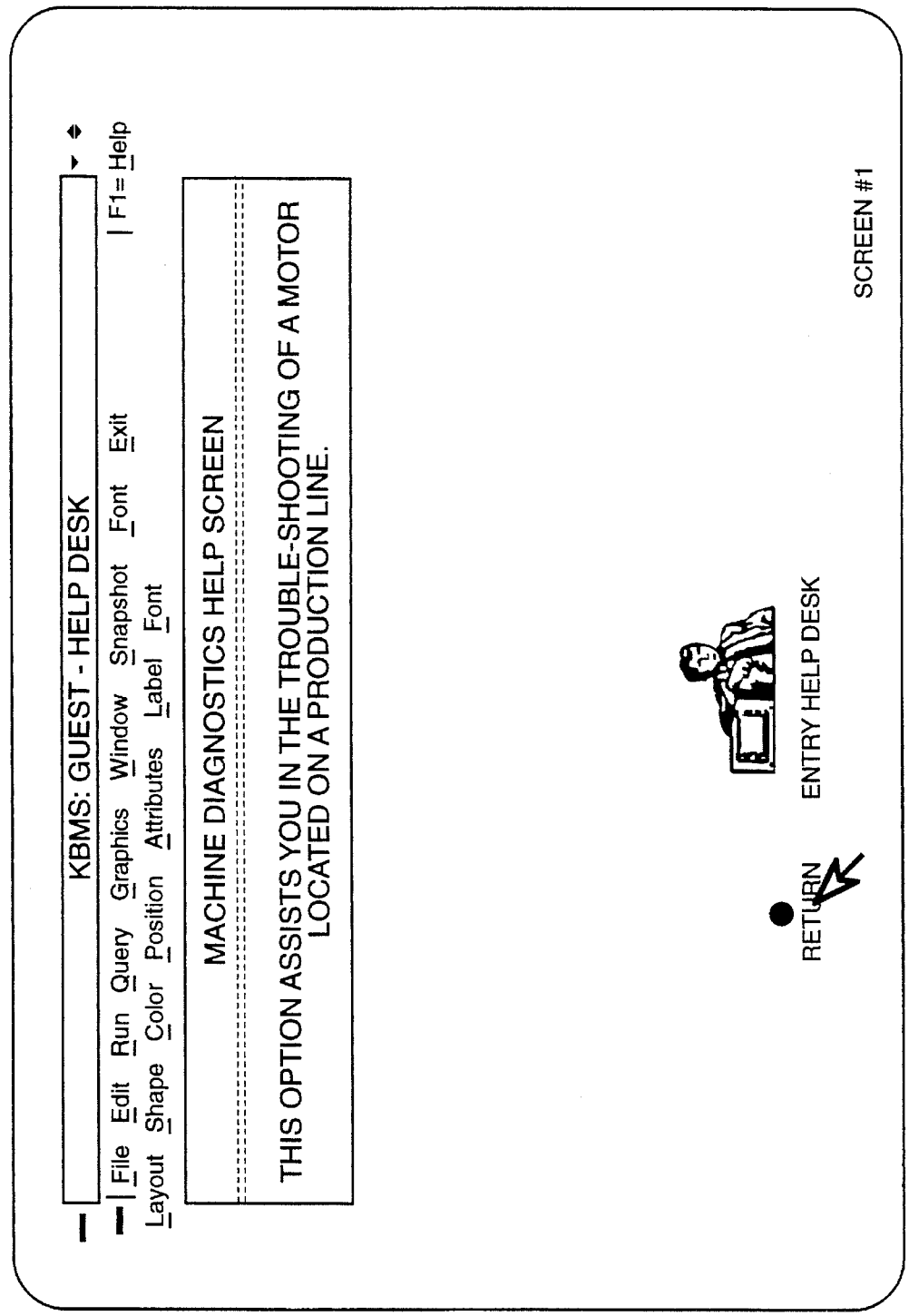
FIG. 21 is a representative example of a help screen for the option box labeled "Machine Diagnostics" in FIG. 20.
Figure 22:
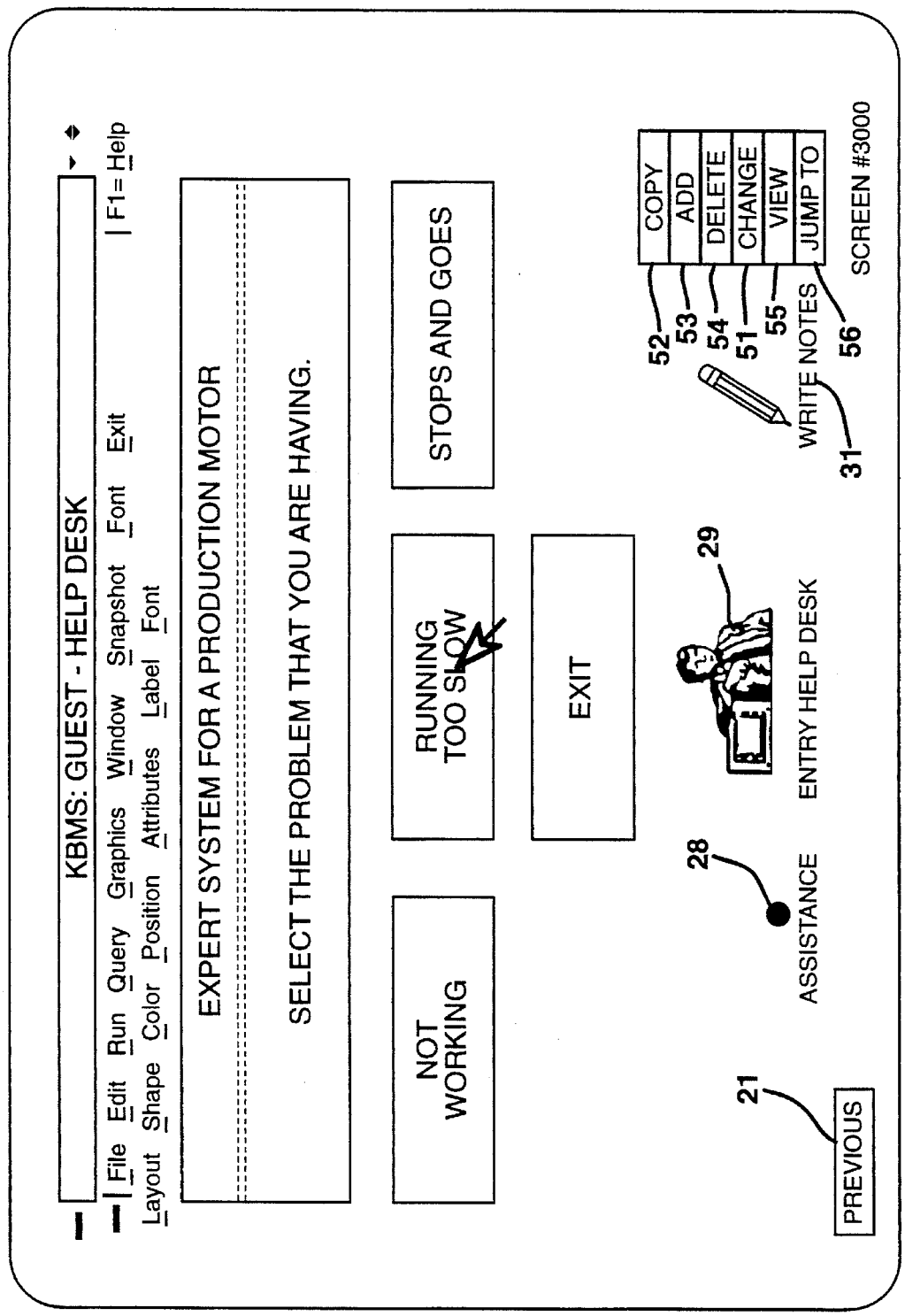
FIG. 22 is a representative example of a typical branch node of the expert system depicted in FIG. 20.
Figure 23:
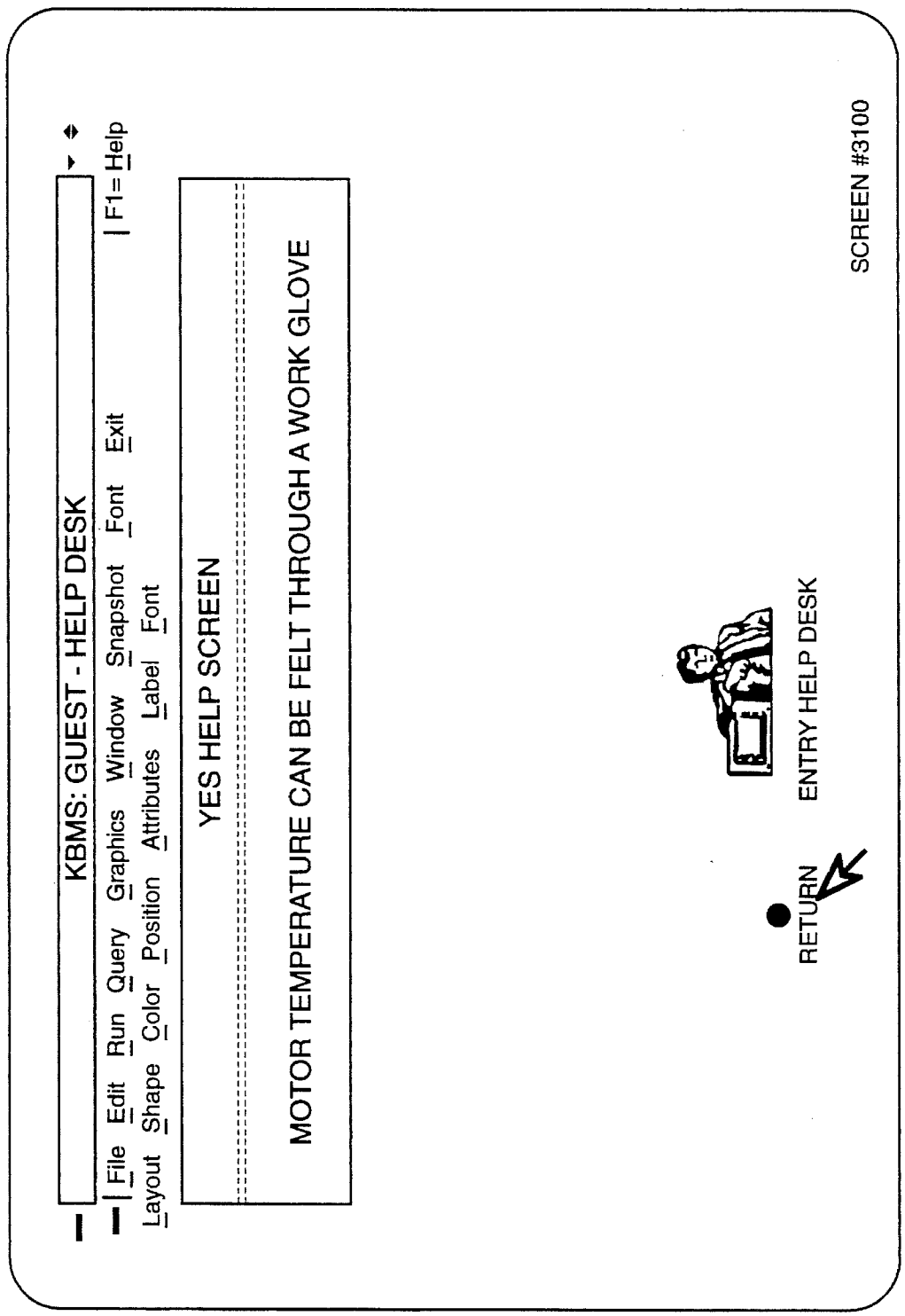
FIG. 23 is a representative example of a help screen, with a recommendation, for the expert system illustrated in FIG. 20.

An abbreviated example is provided to show how a user would run a particular application from the Graphically Used Expert System Tool of the present invention. With reference to FIG. 20, there is shown an example of an anchor screen (i.e., the first screen displayed) showing the six application object boxes. As a preliminary matter, if the user, for e.g., an assemblyline worker at a production plant, wants to determine if his machine has an electric motor problem, he might use the assistance icon 28 to obtain a help screen corresponding to the application box labeled MACHINE DIAGNOSTICS. FIG. 21 shows the help screen that had been created by a developer to explain what the machine diagnostics expert system application will do. Note, that no help information will appear if a help screen was not previously created.

The user then decides to run the machine diagnostic's expert system so he places the mouse pointer at the "MACHINE DIAGNOSTICS" option and makes the selection as shown in FIG. 20. The linked knowledge record displayed as a screen in FIG. 22, prompts the user to select the problem he is having. For the case of a motor that runs slow, the user will place the cursor at the option box labeled "RUNNING TOO SLOW" and make the selection. The expert system may want to identify why the motor is running too slowly, so the next screen (not shown) may prompt the user to answer the question "DOES THE MOTOR FEEL HOT." This screen may also provide the two option boxes labelled "YES" and "NO". If the user does not know what the expert system means by the options displayed, the user may, again, first select the assistance icon 28 and then select the "YES" option to see what the expert system means. The help screen shown in FIG. 23 will be displayed.

Figure 17:
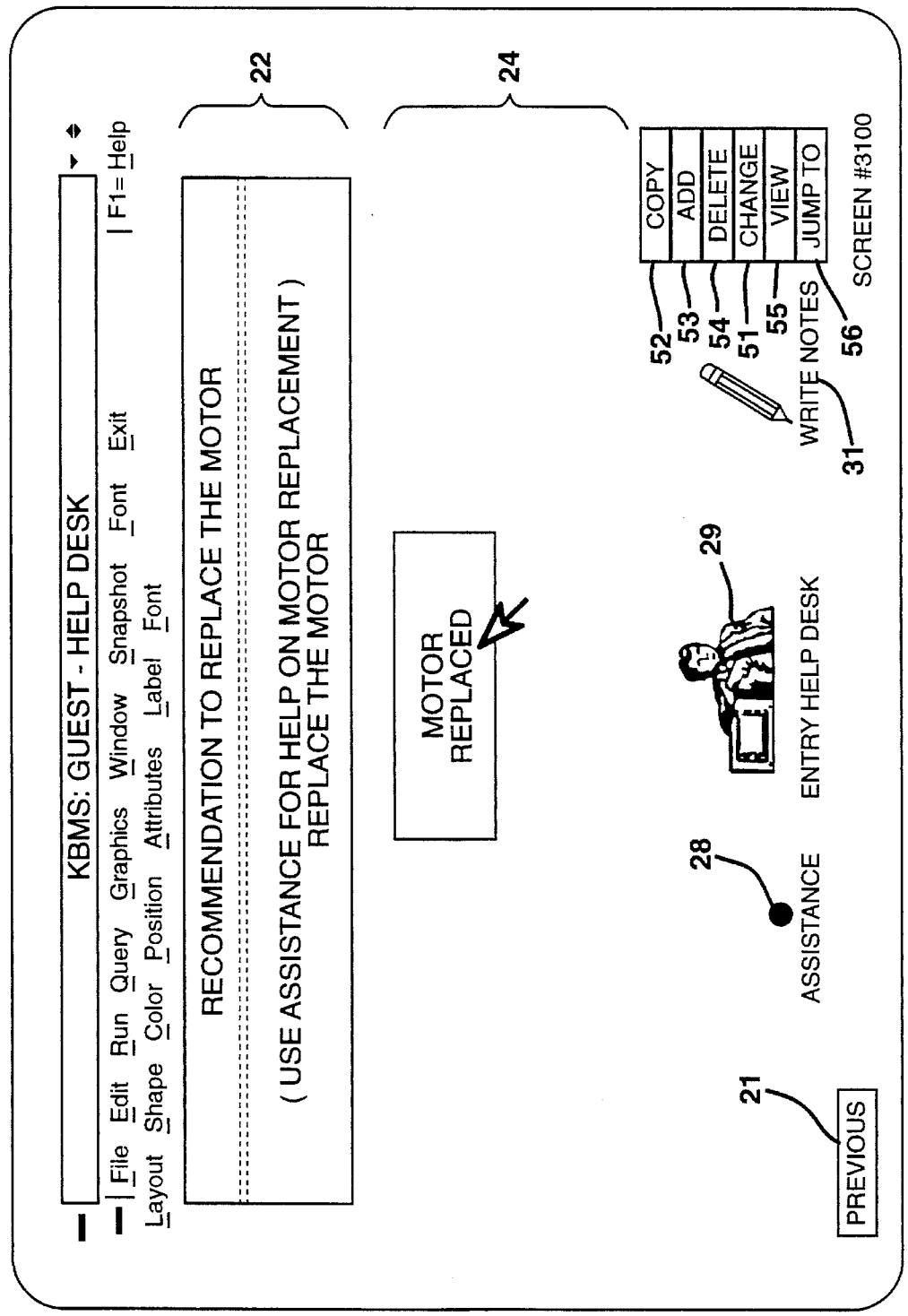
FIG. 17 is representative of a recommendation screen having a user action option.
Figure 24:
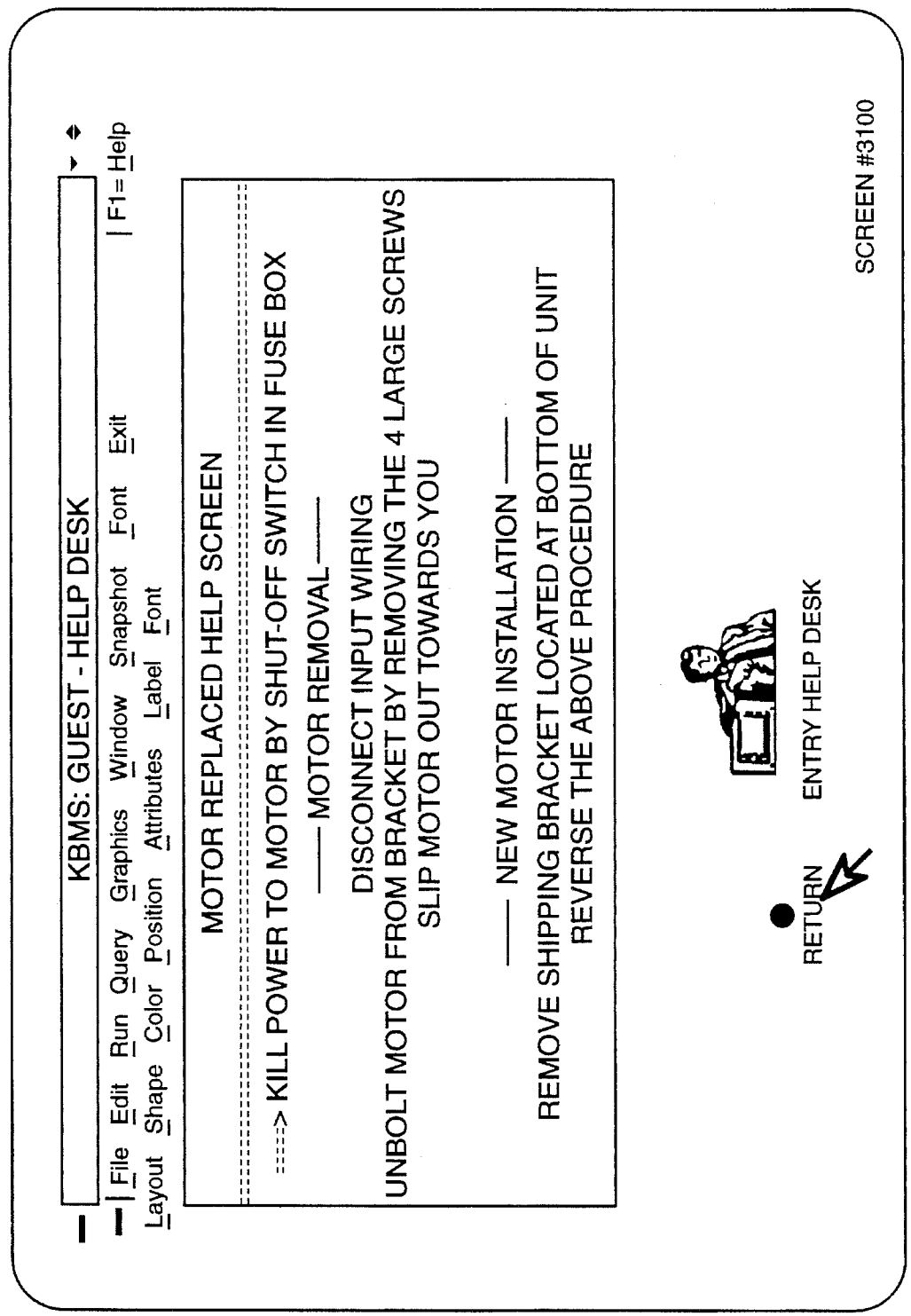
FIG. 24 is a representative example of a help screen setting forth a motor replacement procedure for the expert system illustrated in FIG. 20.

The last screen displayed for the system, as described above, is the Recommendation screen, previously illustrated as FIG. 17. This screen recommends to the user that he replace the motor. If the user needs additional information on how to replace the motor, he may use the assistance icon 28 to select the "REPLACE THE MOTOR" option box. The help screen associated with this option may display a brief motor replacement procedure, as shown in FIG. 24. Once the user follows the procedure and replaces the motor, the "MOTOR REPLACED" screen illustrated in FIG. 17 is again presented. The next linked screen to be displayed may ask the question of whether the replaced motor is running. The user response to this screen is then used in the score box functions as previously described.

We claim:

1. An information processing system for enabling a non computer-literature expert having knowledge (developer) to develop an expert system for computer assisted instructions for a use, said information processing system comprising:

(a) a decision network having a plurality of interconnected knowledge records, each of said inter-connected knowledge records including at least one alphanumeric display area for displaying questions or instructions entered by the developer, and a plurality of options which are entered by the developer to be selected by the user in response to said questions or instructions;

(b) a Graphical User Interface for displaying said plurality of inter-connected knowledge records, each record representing a decision node in the expert system, said Graphical User Interface reporting an option selection when an option is selected by the user of said information processing system;

(c) a first means for managing said knowledge records;

(d) a command module for receiving said option selection from the Graphical User Interface in response to a selection by the user at the displayed knowledge record, and generating an instruction command for the first means in response thereto, said command module generating instructions for said Graphical User Interface to generate a screen display in response to said option selection;

whereby knowledge is entered by the developer on a plurality of knowledge records in the form of alphanumeric text and sequential user options in which the decision network of knowledge records represents the knowledge of the developer.

2. The information processing system according to claim 1, wherein said interconnected knowledge records each contain a pointer to at least one other knowledge record, and a plurality of selected options form a plurality of disjoin logic branches which form said decision network representative of the developer's knowledge.

3. The information processing system according to claim 2, in which said plurality of selected options include a plurality of exit option actions at each interconnected knowledge record.

4. The information processing system according to claim 3, in which said plurality of exit option actions include operating system commands, internal system commands and list processing commands.

5. The information processing system according to claim 3, wherein any interconnected knowledge record of said decision network may include a maintenance option object, the selection of which by the developer enables a plurality of maintenance options to be displayed in a designated area of said Graphical User Interface.

6. The information processing system according to claim 5, further including means for automatically duplicating the contents of the interconnected knowledge record being displayed by said Graphical User Interface into a developer specified interconnected knowledge record corresponding to a specified pointer in response to selection of a first maintenance option.

7. The information processing system according to claim 5, further including means for enabling said developer to change the contents of the interconnected knowledge record being displayed by said Graphical User Interface in response to selection of a second maintenance option.

8. The information processing system according to claim 5, further including means for automatically deleting the knowledge record being displayed by said Graphical User Interface and for displaying a previously displayed knowledge record in response to selection of a third maintenance option.

9. The information processing system according to claim 5, wherein said first means automatically retrieves for display thereof the alphanumeric text knowledge contained in any selected interconnected knowledge record in response to the selection of a fourth maintenance option.

10. The information processing system according to claim 5, further including a means for creating a help data base record to be linked to an option box of a currently displayed interconnected knowledge record being displayed by said Graphical User Interface in response to the selection of a fifth maintenance option.

11. The information processing system according to claim 5, further including a means for creating a developer note pad data base record to be linked to the interconnected knowledge record being displayed by the Graphical User Interface in response to the selection of a sixth maintenance option.

12. The information processing system according to claim 2, wherein a plurality of said interconnected knowledge records form a plurality of disjoin modes that are representative of the developers knowledge.

13. The information processing system according to claim 12, wherein said plurality of disjoin nodes are interconnected for forward and backward linking by forward and backward pointers.

14. The information processing system according to claim 13, wherein each of said interconnected knowledge records includes pointers for from 2 to 6 other interconnected knowledge records, at least one of which forms an additional disjoin node.

15. The information processing system as claimed in claim 13, further including means for determining when a knowledge record is not interconnected by a forward or backward pointer.

16. The information processing system as claimed in claim 12, wherein the developer's knowledge entered is variable that is used to transmit information between any two disjoin nodes.

17. The information processing system according to claim 2, wherein the pointer that links said other record to the interconnected knowledge record being displayed by the Graphical User Interface is an integer number.

18. The information processing system as claimed in claim 2, further including means for determining when an interconnected knowledge record contains a pointer that does not point to another existing interconnected knowledge record.

19. The information processing system as claimed in claim 2, further including means for creating for display a list or partial list of all the interconnected knowledge records developed in said expert system.

20. The information processing system according to claim 1, wherein each of said options is displayed by said Graphical User Interface as a simplified option box having developer designated color attributes and developer entered text strings.

21. The information processing system according to claim 1, which further includes means for creating a note data base record to be linked to a currently displayed decision node in the expert system in response to the selection of a write representative icon displayed by said Graphical User Interface.

22. The information processing system according to claim 21, which further includes means to add a read representative icon to said Graphical User Interface display whenever one of said note data base records has been linked to the decision node of the knowledge record then being displayed.

23. The information processing system according to claim 22, wherein selection of said write representative icon enables the user to enter alphanumeric text in said note data base record, and selection of a representative read icon enables said first means to retrieve for display thereof the text of said note data base record.

24. The information processing system according to claim 1, wherein said Graphical User Interface includes means for displaying a scanned bit-mapped picture.

25. The information processing system as claimed in claim 1, wherein said first means includes means for retrieving separately created ASCII data base filed for display.

26. The information processing system according to claim 1, in which said plurality of interconnected knowledge further includes an encryption algorithm to encrypt and decrypt said interconnected knowledge records to protect the developer's knowledge.

27. The information processing system as claimed in claim 1, which further includes a multilevel password protection routine which prevents unauthorized users/developers from modifying said interconnected knowledge records.

28. An information processing system as claimed in claim 1 wherein said first means is selected from the group of: a relational database, a B-tree database, a network database, a hierarchal database, a series of seeks, or a flat file database.

29. An information processing system as claimed in claim 1 wherein said command module is an object oriented command means with a plurality of system objects.

30. An information processing system as claimed in claim 1 wherein the screen display generated by the Graphical User Interface in response to said option selection is the same screen display from which the option selection was made.

31. An information processing system as claimed in claim 1 wherein the screen display generated by the Graphical User Interface in response to said option selection is a new screen display which is partially identical to the screen display from which the option selection was made.

32. An information processing system as claimed in claim 1 wherein the screen display generated by the Graphical User Interface in response to said option selection is a new screen display which displays a portion of a new interconnected knowledge record.

33. An information processing system as claimed in claim 1 wherein the screen display generated includes a portion of the interconnected knowledge record.

34. An information processing system for enabling a non-computer literate expert having knowledge (developer) to develop a computer assisted expert system for a user; said information processing system comprising:

(a) a first means for generating a plurality of interconnected knowledge records, each of said records being linked to at least one other record by a pointer, wherein said plurality of knowledge records represent a plurality of decision nodes in an expert system;

(b) A second means to enable a developer to enter knowledge in said knowledge records as alphanumeric statements, including questions, in a series of interconnected knowledge records, and a plurality of option actions for said records, wherein each action invokes one or more of a plurality of functional commands to link each record with at least one other record with forward and backward chaining pointers to form an option linkage, said records and said option linkages defining an interconnected decision network representative of the developers knowledge for said expert system;

(c) display means for displaying said alphanumeric statements, including questions, and said options for said user;

(d) third means for retrieving selectively a linked knowledge record in response to an option choice by said user.

35. An information processing system as claimed in claim 34, wherein said second means includes a Graphical User Interface having a simplified screen display, said simplified screen display having a first display portion for displaying said alphanumeric statements and a second display portion for displaying said plurality of option actions as a plurality of simplified decision boxes to be selected by the user.

36. An information processing system as claimed in claim 35, which further includes a list file with pointers to selected option actions in one or more of said knowledge records.

37. An information processing system as claimed in claim 36, in which said list file contains one or more lines of executable system code to be executed upon selection of a linked option action by the user.

38. The information processing system as claimed in claim 36, wherein said display means includes means for displaying a scanned bitmapped picture.

39. An information processing system as claimed in claim 35, wherein said Graphical User Interface further includes a third display portion for displaying a plurality of standardized navigation icons.

40. An information processing system as claimed in claim 35, wherein said second display portion includes from 2 to 6 option icons, and wherein the selection of one of said options forms one or more disjoin logic branches in said decision network when selected by the developer.

41. An information processing system as claimed in claim 40, wherein a selected graphical icon is used throughout the expert system to denote a consistent function for the user.

42. An information processing system as claimed in claim 40, wherein said interconnected decision network includes plural logic branches, and said option linkages are linked to one or more other records in one or more separate logic branches.

43. The information processing system according to claim 42, wherein at least one of said plural logic branches terminates with a final interconnected knowledge record having a recommendation display that recommends a solution to said user based upon the logic branch chosen.

44. The information processing System according to claim 43, where said final interconnected knowledge record display includes means for recording whether or not said recommendation display did or did not bring about a successful solution.

45. The information processing system according to claim 44, further including means for determining the efficiency of a logic branch by tallying the number of successful solutions brought about by said recommendation display.

46. The information processing system according to claim 45, further including means for displaying the efficiency of each logic branch having a recommendation display.

47. An information processing system as claimed in claim 34, wherein said first means includes a data base manager for generating said knowledge records and linking said records in response to option selections entered by the developer.

48. An information processing system as claimed in claim 47, wherein said second means includes an object oriented command module which responds to selections of options by the developer to generate command statements for said data base manager.

49. The information processing system as claimed in claim 48, wherein said command statements include executable computer operating system commands.

50. An information processing system as claimed in claim 34, wherein said interconnected decision network begins with a single anchor knowledge record, to which all knowledge records are linked.

51. A method of authoring an information processing system which enables a non-computer literate expert having knowledge (the developer) to develop a computer assisted expert system for a user, said method comprising:

(a) generating a plurality of knowledge records;

(b) displaying a blank record with a Graphical User Interface to enable the developers to interactively enter knowledge as segments of alphanumeric text and user options in each of said plurality of knowledge records;

(c) linking a plurality of knowledge records to at least two other records to form a plurality of disjoin logic nodes such that the arrangement of knowledge segments and said user options form a decision network of disjoin logic nodes representative of the developer's knowledge;

(d) sequentially displaying said interconnected knowledge records with a Graphical User Interface to form a plurality of simplified screen displays to enable the user to selectively choose an option at each disjoin logic node.

52. A method of authoring an information processing system as claimed in claim 51, which further includes the step of graphing the decision network of disjoin logic nodes of the developer's knowledge into a cognitive map.

53. A method of authoring an information processing system as claimed in claim 51 which further includes the step of assigning predetermined colors to portions of said simplified screen displays.

54. A method of authoring an information processing system as claimed in claim 53, which further includes the step of assigning predetermined colors to preselected classes of user options.

55. A method of authoring an information processing system as claimed in claim 53, which further includes the step of globally changing the color of a preselected portion of said simplified screen displays.

56. A method of authoring an information processing system as claimed in claim 53, which further includes the step of logging each user selection in a preselected data file when said computing assisted expert system is used by a user.

57. A method as claimed in claim 51, which further includes the step of checking a pre-existing password to prevent an unauthorized user from accessing said interconnected knowledge records.

58. A method as claimed in claim 57, which further includes the step of encrypting said interconnected knowledge records by means of an encryption algorithm for the purpose of preventing unauthorized access to the knowledge in said interconnected knowledge records.

59. A method of authoring an information processing system as claimed in claim 51, which further includes the step of selectively intermixing system commands and record pointers at each disjoin logic node to provide a plurality of exit actions at each node.

60. A method of authoring an information processing system as claimed in claim 59, which includes the step of linking from two to six other interconnected knowledge records at each of said disjoin nodes.

61. A method of authoring an information processing system as claimed in claim 60 which further includes the step of modifying a preselected interconnected knowledge record to remove a linkage to one of said interconnected knowledge records.

62. A method of authoring an information processing system as claimed in claim 59, wherein the developer selectively chooses between knowledge record pointers, operating system commands, internal system commands and a list of options at each logic node.

63. A method of authoring an information processing system as claimed in claim 62, which further includes the step of comparing a user entered alphanumeric text string with a range of alphanumeric text values maintained in a list file when said computes assisted expert system is used by a user.

64. A method of authoring an information processing system as claimed in claim 51, which further includes the step of generating a screen queue log file to record the user's choices at each logic node, and enable forward and backward chaining of said interconnected knowledge records.

65. A method of authoring an information processing system as claimed in claim 51, which further includes the step of dividing each simplified screen display into at least two areas, with a first area displaying alphanumeric text statements or questions and a second area having a plurality of decision boxes to be selected by said user.

66. A method of authoring an information processing system as claimed in claim 65, which further includes the step of generating a plurality of standardized navigation icons at each simplified screen display to enable the user to selectively move from one logic node to another.

67. A method of authoring an information processing system as claimed in claim 51, which further includes the step of reinitializing the information processing system at the point where the system was last terminated.

\* \* \* \* \*